United States Patent
van Eikeren et al.

(10) Patent No.: US 6,618,852 B1
(45) Date of Patent: Sep. 9, 2003

(54) OBJECT-ORIENTED FRAMEWORK FOR CHEMICAL-PROCESS-DEVELOPMENT DECISION-SUPPORT APPLICATIONS

(75) Inventors: Paul van Eikeren, Bend, OR (US); Joshua S. van Eikeren, Bend, OR (US)

(73) Assignee: Intellichem, Inc., Bend, OR (US)

( * ) Notice: Subject to any disclaimer, the term of this patent is extended or adjusted under 35 U.S.C. 154(b) by 0 days.

(21) Appl. No.: 09/394,746

(22) Filed: Sep. 13, 1999

Related U.S. Application Data

(60) Provisional application No. 60/100,118, filed on Sep. 14, 1998.

(51) Int. Cl.[7] .................................................. G06F 9/44
(52) U.S. Cl. ........................................ 717/108; 717/102
(58) Field of Search ........................ 717/1, 4, 100–118; 709/200; 345/764; 707/3

(56) References Cited

U.S. PATENT DOCUMENTS

| | | | |
|---|---|---|---|
| 5,398,336 A | 3/1995 | Tantry et al. | |
| 5,446,842 A | 8/1995 | Schaeffer et al. | |
| 5,544,297 A | 8/1996 | Milne et al. | |
| 5,604,892 A | 2/1997 | Nuttall et al. | |
| 5,634,129 A | 5/1997 | Dickinson | |
| 5,717,877 A | 2/1998 | Orton et al. | |
| 5,732,229 A | 3/1998 | Dickinson | |
| 5,740,425 A | 4/1998 | Povilus | |
| 5,764,897 A | 6/1998 | Khalidi | |
| 5,768,505 A | 6/1998 | Gilchrist et al. | |
| 5,778,378 A | 7/1998 | Rubin | |
| 5,781,732 A | 7/1998 | Adams | |
| 5,787,283 A | 7/1998 | Chin et al. | |
| 5,787,425 A | 7/1998 | Bigus | |
| 5,794,001 A | 8/1998 | Malone et al. | |
| 5,878,432 A | 3/1999 | Misheski et al. | |
| 5,913,205 A | * 6/1999 | Jain et al. | 707/2 |
| 5,930,154 A | * 7/1999 | Thalhammer et al. | 345/764 |
| 5,936,860 A | 8/1999 | Arnold et al. | |
| 6,083,276 A | * 7/2000 | Davidson et al. | 717/1 |
| 6,220,743 B1 | * 4/2001 | Campestre et al. | 717/107 |
| 6,266,805 B1 | * 7/2001 | Nwana et al. | 717/4 |
| 6,314,555 B1 | * 11/2001 | Ndumu et al. | 707/108 |

* cited by examiner

*Primary Examiner*—Gregory Morse
*Assistant Examiner*—Chuck Kendall
(74) *Attorney, Agent, or Firm*—Chernoff, Vilhauer, McClung & Stenzel, LLP

(57) ABSTRACT

An object oriented framework provides a set of objects that perform chemical-process-development decision-support functioning and that permit a framework user to add extensions for specific processing features, thereby producing an application program that supports decision-making during chemical development activities. The framework includes a Chemical Process Definition Document category of classes for defining the chemical process, an Entity Creation category of classes for creating entities in the Chemical Process Definition Document, an Entity Validation category of classes for validating entities in the Chemical Process Definition, a Control category of classes for providing document control of the Chemical Process Definition Document, an Experimental Design category of classes for creating experimental designs, a Statistical Analysis category of classes for analyzing the results of designed experiments, and a Reporting category of classes for creating reports and analyses from the Chemical Process Definition Document. These classes provide the base framework upon which chemical-process-development decision-support application program is developed by the framework user.

36 Claims, 47 Drawing Sheets

OBJECT-ORIENTED FRAMEWORK FOR CHEMICAL-PROCESS-DEVELOPMENT DECISION-SUPPORT APPLICATIONS

CROSS-REFERENCE TO RELATED APPLICATIONS

This application claims the benefit of U.S. Provisional Application No. 60/100,118, filed Sep. 14, 1998.

BACKGROUND OF THE INVENTION

1. Field of the Invention

This invention relates generally to data processing systems and, more particularly, to object oriented programming systems and processes.

2. Description of the Related Art

Computer programs have typically been developed using procedural programming techniques. Procedural programming techniques emphasize structuring the data processing procedures to which data values are subjected. Efforts to reduce long software development times and high software maintenance costs have resulted in structured programming techniques that attempt to reuse blocks of programming code. For example, tasks or processes that must be repeated can be written as system programming routines or program library functions. Program developers then provide an application program to accomplish a desired result using calls to the system routines and library functions.

System routines and library functions provide only a limited reduction in software development time and maintenance costs. Once a procedural application program is written, it is relatively difficult to incorporate new features or additional data types. There are many processes in an application program that cannot be easily extracted from program code and reused. Additional data types often cannot be inserted into procedural program code without extensive rewriting of the original program code. Thus, even if new features in a program can be implemented using processes similar to those already in the application, the programming for such processes must be largely duplicated, with slight modifications, to provide the new features. This increases program development time. Moreover, if such programs must operate with other applications, it can be difficult to ensure that the changes will interface properly.

Another problem confronting program developers is that of providing program versions capable of operating with the various platforms used by customers. The different platforms encompass different operating systems as well as different companion applications with which the application must interface. With respect to operating systems, for example, a program developer might have to write different versions for satisfactory operation under the "Windows 95" operating system by Microsoft Corp., the UNIX system, the "Macintosh" operating system by Apple Computer Corp., or the "OS/2" operating system by International Business Machines Corporation (IBM Corporation). In a similar fashion, a program developer might want to provide the ability to interface with application programs such as word processor programs, spreadsheet programs, and the like, meaning that the program developer must provide the ability to accept files (and produce files) in different file formats. Different platforms use different data formats and procedural operations, so program developers must provide different program versions or routines for each platform.

Object oriented programming (OOP) techniques encapsulate, or bind together, data and the methods that operate on them. This permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of application developers and limit program reuse among different classes.

OOP frameworks have been developed in an effort to further reduce program development costs. For example, U.S. Pat. No. 5,398,336 discloses an object oriented architecture for factory floor management; U.S. Pat. No. 5,787,425 discloses an object oriented data mining framework mechanism; U.S. Pat. No. 5,878,432 discloses an object oriented framework mechanism for source code repository; and U.S. Pat. No. 5,936,860 discloses an object oriented framework for warehouse control. A framework is a set of OOP classes that embodies a predetermined set of attributes and methods for providing a common group of behaviors. An application program developer utilizes the framework and builds upon it, adding subclasses and attributes and modifying methods depending on the problem to be solved. Such changes to the framework are typically referred to as framework extensions, and are made possible by the OOP notions of inheritance and polymorphism. The challenge confronting framework developers, then, is to arrive at a set of classes and methods that will best provide the desired problem solution and will accept the most likely framework extensions. Thus, the designer of a framework must carefully assess what framework users will most likely need in the way of classes and attributes.

One area in which there is a great need for application program development is in the chemical-process development decision-support domain. In particular, many businesses are aiming to computerize the functions of chemical-process development. Representative applications, for example, include computer-assisted definition, optimization, management, and execution of synthetic procedures for the production of chemical entities. Many company-specific features are needed to perform these functions, all of which are continually changing, so that program development and software maintenance of applications are critical. Thus, a great deal of cost and effort are devoted to developing and maintaining application programs that perform chemical-development decision-support functions.

From the discussion above, it should be apparent that there is a need for development tools that permits application program developers to more quickly develop and more easily maintain chemical-development decision-support applications. The present invention fulfills this need.

BRIEF SUMMARY OF THE INVENTION

In accordance with the present invention, a reusable object oriented (OO) framework for use with object oriented programming systems comprises a chemical-development decision-support shell that permits a framework adopter to use a set of chemical-process-development definition and a set of decision-support-type objects that provide chemical-process recording, characterization and reporting capability, and to then add framework extensions for specific processing features, thereby producing a chemical-process-development decision-support application. Such a decision support application assists the user in the recording, document management, characterization and optimization, and reporting of chemical processes. In this way, the chemical-process-development decision-support framework of the invention provides an OO base on which application program developers can build to add specific data types and processing features they deem important.

The framework includes classes for which it is anticipated extension sub-classing with new attributes and methods will occur. An application program developer can customize the extension classes to meet the needs of application users and create all user interfaces with the application program, permitting the developer to more quickly complete program development and more easily perform software maintenance. The end-user interface establishes a means for the end-user to communicate with the application program to receive, process, and view data. The framework frees the program developer to concentrate on application program features, which can easily be implemented by extending the OO classes and methods of the OO framework. The framework thereby provides a base from which a variety of chemical-process-development decision-support systems can be quickly and efficiently produced.

The framework includes object oriented classes that specify object data attributes and methods. The framework adopter is free to incorporate extensions to the framework to provide a unique suite of functions and operations, resulting in the production of an application that is then utilized by an end user. For example, a single object provides a data object location for maintaining and accessing properties, methodologies, and attributes that are defined for the chemical process undergoing development. Using OOP principles, the framework adopter can add chemical process attributes not present in the framework to support chemical process types desired by a customers. In this way, the framework adopter maximizes the exploitation of program commonality and the reuse of programming efforts, thereby reducing program development time and software maintenance costs.

Other features and advantages of the present invention should be apparent from the following description of the preferred embodiment, which illustrates, by way of example, the principles of the invention.

DETAILED DESCRIPTION OF THE INVENTION

Application Development

Figure 1:
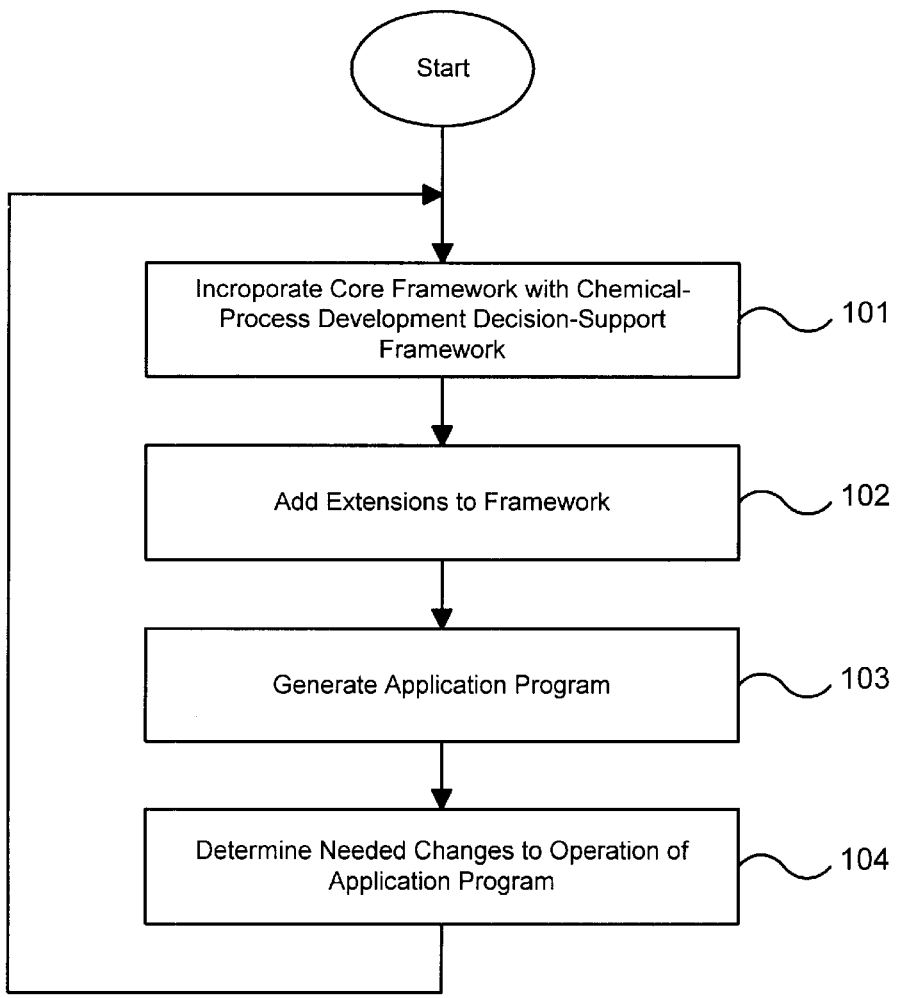
FIG. 1 is a flow diagram representation of the application development process that utilizes the framework of the invention to provide a chemical-process-development decision-support application program.

FIG. 1 is a flow diagram representation of the steps performed with a computer system to produce a Chemical-Process-Development decision-support application program using the framework of the present invention. The chemical-process-development decision-support application program of the preferred embodiment is designed to obtain certain info information from objects of related core classes. Such information will include chemical and business information concerning the chemical process for which decision-support is needed during development, as well as other information needed to carry out operations in a computer system. These core classes can be organized into a core framework (CF) that is complementary to the framework of the present invention. The application developer provides a user interface and combines operating interface features of the core object classes with the structure and functionality of the chemical-process-development decision-support OOP framework constructed in accordance with the present invention, and also adds particular framework extensions as needed, to generate an application program. The resulting application program can be used by customers, such as research and development groups at pharmaceutical, agrochemical, and fine chemical businesses, to carry out chemical-process-development functions and other tasks in the chemical development domain. In the following description, "framework" will refer to the framework illustrated in the drawing figures and "application" will refer to an application program that comprises an implementation of the extended framework, produced by an application developer who uses the framework.

In the FIG. 1 flow diagram, the first step is to incorporate the core framework with the chemical-process-development decision-support framework of the invention, as represented by the flow diagram box numbered 101. This step includes the incorporation of any object classes necessary for the system on which the application will run. For example, the preferred embodiment achieves operating platform independence and application program inter-operability by extending classes from the core framework (CF) a set of base business classes. In this first step, the application developer will incorporate object classes necessary for achieving operating system independence and program inter-operability by extending and sub-classing from the CF classes. In this way, the chemical-process-development decision-support application can interface with multiple operating systems because only the CF extensions need change to accommodate new operating systems, while the chemical-process-development decision-support application can remain the same. In a similar way, companion application programs can more easily interface with the extended application program because the core, common set of CF classes will be known and will form a common interface.

The next step of application program development is to add desired extensions to the chemical-process-development decision-support framework, including the user interface. To implement this part of the program development process, the application developer framework user must decide upon the particular extensions needed for the desired Chemical-Process-Development Decision-Support operations and user interface, including any modifications or extensions to the class attributes and behaviors. The framework extensions are performed by a framework user in a manner dependent on the particular computer system on which the framework is received and manipulated. Such processing is represented in FIG. 1 by the flow diagram box numbered 102.

After the framework extensions are decided upon, the next step is to generate the application program. This step is represented by the flow diagram box numbered 103. The generation of an application program is generally referred to as program compilation. This step also will depend on the particular computer system on which the framework is used. Changes to the compiled program might be desired, both as part of the initial program debug and as part of revisions due to comments received from actual use. The process of determining such desired changes is represented by the flow diagram box numbered 104. When such changes are determined, they must be implemented into the program structure in the form of modified classes, attributes, and methods, which comprise further extensions to the framework. This is represented by the flow diagram path from the "determine changes" step at box 104 back to the "add extensions" step at box 102.

Thus, the design of the framework provides base classes on which application program developers can build to add specific features they deem important. With the core business classes, the framework classes can remain platform independent so that framework extensions are simplified. The application is easily modified without need for writing multiple versions of the program code because the revision of framework classes, attributes, and methods in accordance with the invention is platform independent. Easier development of new code, and seamless operation with applications using the same core classes, is ensured.

Operational Structure

Figure 2:
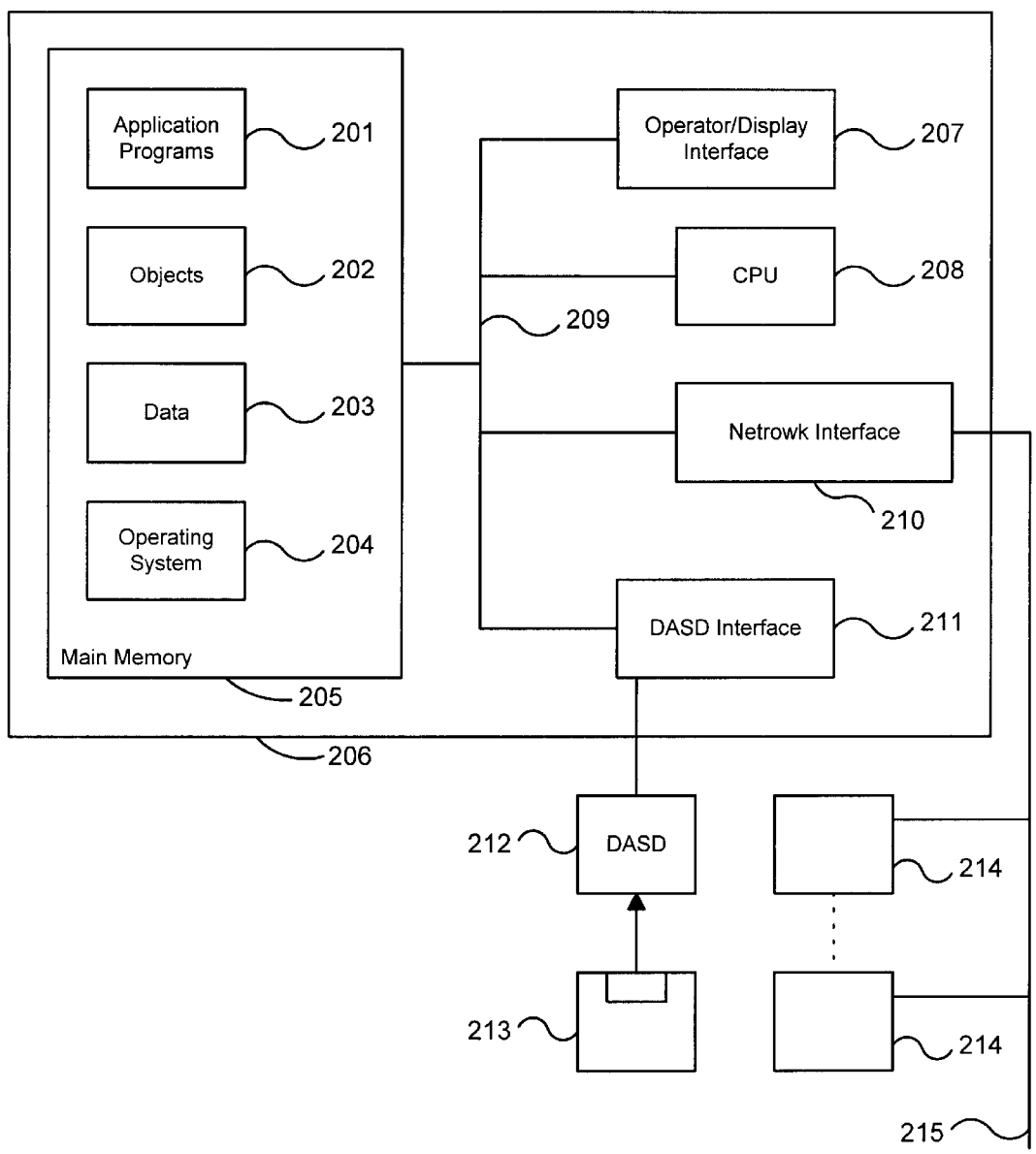
FIG. 2 is a block diagram of a computer system constructed in accordance with the invention.

FIG. 2 is a block diagram of a computer system 206 constructed in accordance with the present invention. The computer system is suitable for utilizing the framework of the invention to develop an application program, and for using the extended framework application program. The computer system 206 includes a central processing unit (CPU) 208 that operates in response to operator commands, which it receives from an operator/display interface 207 to which it is connected by a system bus 209. The CPU also communicates over the system bus with a main memory 205. The main memory is illustrated containing a variety of data structures, including application programs 201, objects 202, data 203, and an operating system 204. The main memory 205 is represented as a single entity, but those skilled in the art will appreciate that the main memory can comprise a combination of random access memory (RAM), hard disk drives, optical disk drives, and other storage devices containing logically segmented storage locations.

The operating system 204 preferably supports an object oriented programming environment such as that provided, for example, by the C++, Java and Visual Basic programming languages. The application programs 201 are invoked, or launched, by a user through the operator/display interface 207. The application programs can be written in a variety of languages, including C++, Java and Visual Basic. The objects 202 are data or software structures of an object oriented programming language, such as C++, Java, Visual Basic or XML (for data structures).

The computer system 206 also includes a direct access storage device (DASD) interface 211 that is connected to the system bus 209 and also is connected to a DASD 212. Those skilled in the art will appreciate that the DASD 212 can receive and read from program products comprising machine-readable storage devices 213, such as magnetic media disks on which are recorded program instructions whose execution implements the framework of the present invention. The storage devices 213 also can comprise, for example, media such as optical disks and other machine readable storage devices. The computer system 206 also includes a network interface 210 that permits communication between the CPU 208 and other computer systems 214 over a network 215. The other computer systems 214 can comprise, for example, computer systems similar in construction to the exemplary computer system 206. In that way, the computer system 206 can receive data into the main memory 205 over the network 215 after communication between the computer systems has been established by well-known methods that will be understood by those skilled in the art without further explanation.

System Modules

In the preferred embodiment of the invention, the object oriented framework includes system modules comprised of a Chemical Process Definition (CPD) mechanism, which defines the chemical process undergoing chemical development, a Chemical Process Recording mechanism, which manages the recording and control of CPD Document object instances, a Chemical Process Characterization mechanism, which manages the optimization and characterization of chemical processes, and a Chemical Process Reporting mechanism, which supports the reporting of chemical process information.

The Chemical Process Definition module contains object categories that contain methods and attributes for defining the chemical process, which includes background information, materials and resources used in the chemical process, the structures and attributes of the chemical entities involved in the chemical process, the sequence of events involved in performing the chemical process, the results of running the chemical process, pertinent references, and the results of experiments run as variations of the chemical process. Other categories provide additional features that improve the ability of the framework to accommodate user defined data types and features, as desired.

The Chemical Process Recording module contains object categories that contain methods and attributes for creating, assembling, validating and controlling the information contained in the Chemical Definition object. The Chemical Process Characterization module contains object categories that contain methods and attributes for creating and analyzing statistical experimental designs directed at screening and optimizing chemical process factors. And the Chemical Process Reporting module contains object categories that contain methods and attributtes for unit conversions, cost estimation, creating report objects, transforming the report objects to HyperText Markup Language for rendering in a browser object, and, generally, for creating data objects which can be used by other objects.

Figure 3:
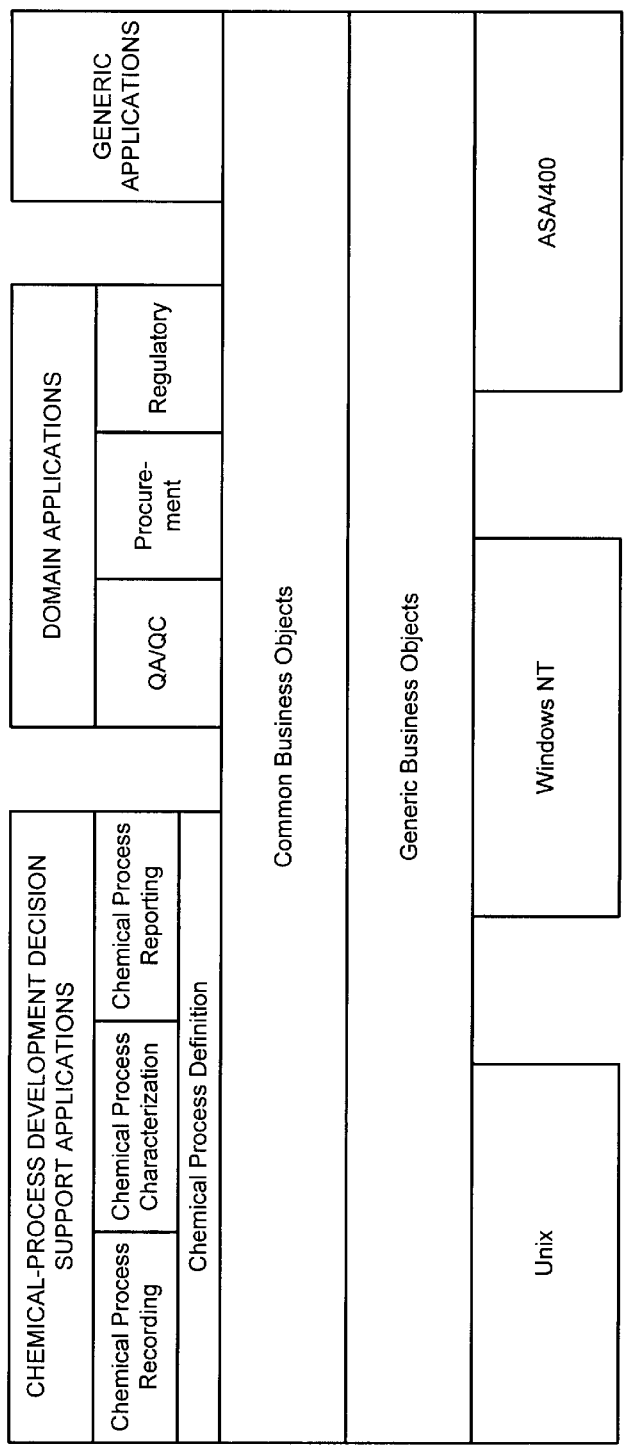
FIG. 3 is a representation of the computer system of FIG. 2, showing the underlying Chemical Process Definition (CPD) mechanism, the Chemical Process Recording mechanism, the Chemical Process Characterization mechanism and the Chemical Process Reporting mechanisms that comprise the framework, and also showing related common and generic business objects utilized by the extended chemical-process-development decision-support framework of the invention.

FIG. 3 is a representation of the framework that operates in the system of FIG. 2, showing the CPD, Chemical Process Recording, Chemical Process Characterization, and Chemical Process Recording modules that comprise the chemical-process-development decision-support system that is the subject of this description. The Chemical Process Recording, Chemical Process Characterization, and Chemical Process Reporting mechanisms are shown attached to the CPD mechanism. The CPD mechanism provides an interface and common functionality to permit communication among the Chemical Process Recording, Chemical Process Characterization and Chemical Process Reporting mechanisms. The Chemical Process Definition is also shown attached to the Common Business Objects Framework (CBOF) and the Generic Business Objects framework (GBOF), which together comprise a core framework (CF) utilized by the framework of the invention. The CF provides common functionality to permit communication between application mechanisms (such as Chemical-Process- Development Decision Support) and different operating platforms, which are indicated in FIG. 3 by the modules indicated as "Unix", "AS/400", and "Windows NT" attached to CF. The CF also provides common functionality to permit communication between framework classes of the present invention and other mechanism, for example, the domain and generic application shown on FIG. 3.

Application developers will add sub-classing to the classes of which CBOF and GBOF are comprised. The classes of CBOF, for example, will include "scheduling" classes that can serve as base classes for defining scheduling activities to multiple application programs. A CBOF scheduling class might contain general methods for managing scheduling, while the chemical-process-development decision-support framework of the invention might extend from the CBOF and include "scheduling" classes that allow the application developer to implement resource scheduling for tracking the status, availability and use of equipment defined in CPD data objects. The GBOF classes are more directly related to the operating system and computer system side of the operating environment. That is, the GBOF classes are responsible for object persistence according to the operating system and object environment being supported, so that a chemical-process-development decision-support object that wants to maintain an object in persistent data storage must interface with GBOF classes. All application programs in related "business object" subject areas, or domains, should be able to make use of the common object classes specified by the CBOF and GBOF classes.

In FIG. 3, a mechanism called Chemical-Process-Development Decision-Support applications (comprising Chemical Process Definition, Chemical Process Recording, Chemical Process Characterization and Chemical Process Execution) is shown attached to the CF (CBOF/GBOF) combination with a module identified as "Domain Applications" and a module identified as "Generic Applications". All of these mechanisms are shown attached to the CF to indicate that other modules may be developed to communicate with the chemical-process-development decision-support framework. In this way, other domain and generic applications may communicate with the chemical-process-development decision-support application and similarly interface with different operating platforms. It should be understood that the application mechanisms shown interfacing with the CF and interfacing with the alternative operating systems are exemplary only. That is, it is contemplated that additional domain applications may interface with the chemical-process-development decision-support mechanism, and it is contemplated that additional operating platforms may interface with the chemical-process-development decision-support application.

The CF interface, however, does not form a part of the invention described herein. As noted above, those skilled in the art should be able to produce, without further explanation, a framework that provide the common functionality between operating systems and application domains that are provided by CF.

The Chemical Process Definition, Chemical Process Recording, Chemical Process Characterization and Chemical Process Reporting mechanisms of the chemical-process-development decision-support framework function in a computer system that includes project management categories, sourcing/planning categories, production/manufacturing categories, regulatory compliance categories, supply management categories, quality assurance categories, quality control categories, analytical services categories, purchasing categories, accounting categories, and business model categories. After a framework adopter has extended the framework so as to produce a chemical-process-development decision-support application, the end user of the application provides data and commands to the chemical-process-development decision-support application through the appropriate supporting application. For example, a user might supply task and duration input through the project management categories, supply purchasing input through purchasing categories, and receive delivery and cost schedule information through supply management and accounting categories, respectively.

The categories of the Chemical Process Definition will be described next, followed by a description of the classes that comprise the Chemical Process Definition categories. The categories of the Chemical Process Recording, Chemical Process Characterization and Chemical Process Execution will be described thereafter, followed by descriptions of the corresponding classes that comprise these categories. The processing of the extended framework will then be described, in accordance with accompanying flow diagrams of the processing.

Chemical Process Definition Category

The inventors of the present framework have identified a set of OOP classes most likely to be desired by developers of chemical-process-development decision-support application programs and have defined the relationships between such classes. These framework categories provide a base of information and executable software that can be used by program developers and from which extensions can be developed. Those skilled in the art will recognize that such classes can be overridden by users of the framework in that framework users who are developing applications can incorporate extensions and additions that suit the purposes of the user.

The categories of the Chemical Process Definition portion of the framework will be referred to with a preceding "CPD"; the categories of the Chemical Process Recording portion of the framework will be referred to with a preceding "CPR"; the categories of the Chemical Process Characterization portion of the framework will be referred to with a preceding "CPC"; and the categories of the Chemical Process Reporting portion of the framework will be referred to with a preceding "CPE".

Figure 4:
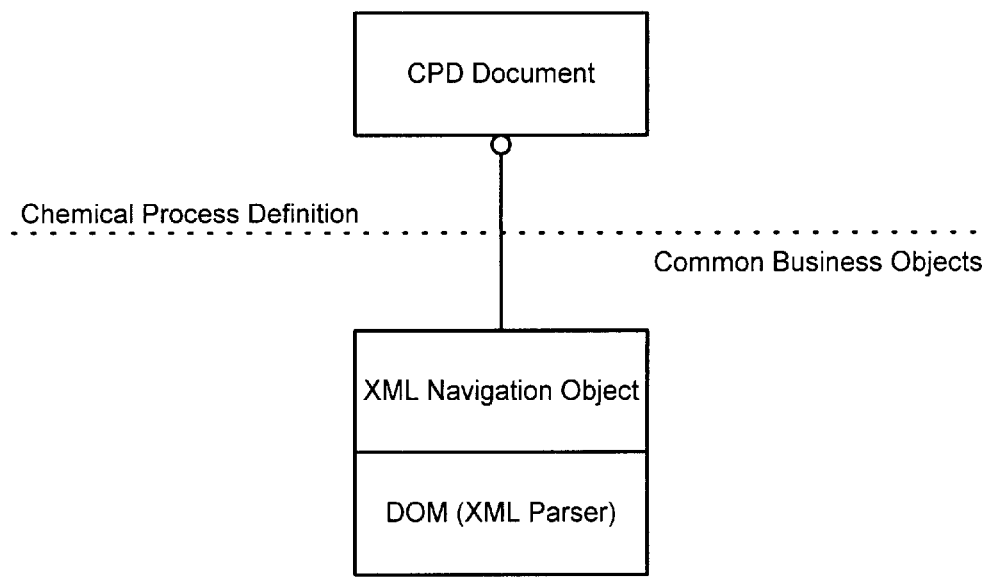
FIG. 4 is a category diagram representation of Chemical Process Definition categories, showing a single CPD Document object class and how this class interacts with the underlying layer of Common Business Objects.

FIG. 4 is a category diagram for the Chemical Process Definition mechanism of the framework implemented in the computer system of FIG. 2, which shows one category, namely CPD Document. Those skilled in the art will appreciate that a category, like the one illustrated in FIG. 4 contain groups of OOP classes that encapsulate data attributes and behaviors, and are stored in the memory of the computer system. Such classes can be implemented, for example, in a computer system operating environment that supports an object oriented computer programming language like C++, Java or Visual Basic, or XML (for support of data objects). It should be understood that a category as used in this description refers to describing the classes that make up the framework in terms of categories for purposes of easier explanation. Categories do not necessarily represent a structure that is reflected in any programming implementation of the framework. Those skilled in the art will appreciate the OO classes specify characteristics of the objects that will be instantiated at run time and will cooperate to perform the program functions.

The Chemical Process Definition category includes a CPD Document category of classes that contains the information concerning the properties, behavior, and attributes of the chemical process of interest to the end user. That is, the chemical process that the end user is developing with the assistance of the chemical-process-development decision-support application developed with this framework is identified by the data contained in the CPD Document category of classes.

A preferred embodiment of the present invention involves implementing the CPD Document as a data object using the XML Document Object model. XML (eXtensible Markup Language) is a subset of Standard Generalized Markup Language (SGML) that provides a data standard that can encode the content, semantics, and schemata for a wide variety of cases ranging from simple to complex. XML has been approved as a standard by the World Wide Web Consortium. XML is described in a number of books including Goldfarb et al [Goldfarb, Charles F. and Prescod, Paul, The XML Handbook, Prentice Hall, (1998)], Meggison [Meggison, David, Structuring XML Documents, Prentice Hall (1998)], Leventhal et al [Leventhal, Michael; Lewis, David; and Fuchs, Matthew, Designing XML Internet Applications, Prentice Hall (1998)], St. Laurent [St. Laurent, Simon, XML: A Primer, IDG Books Worldwide (1998)], McGrath et al [McGrath, Sean, XML by Example: Building E-Commerce Applications, Prentice Hall (1998)], and Jelliffe [Jelliffe, Rick, The XML and SGML Cookbook: Recipies for Structured Information, Prentice Hall Press (1998)].

XML consists of a tree-structured hierarchical set of tags that can be defined by the framework developer. XML provides an object oriented data format that can be manipulated using the XML Document object model. XML data objects can be self-describing with either Document Type Definitions (DTD) or, alternatively, with XML-Data Schemas. DTD and Schemas are formal specification of the rules of an XML document, namely the element names and which elements are allowed in a document and in what combinations. Schema, as defined in the XML-Data proposal submitted to the W3C, provide the same functionality as a Document Type Definition (DTD). However, because schemas are written in XML and, through the capabilities defined in the XML-Data specification, are extensible, developers can augment schemas with additional information, such as data types, inheritance, and presentation rules.

With XML-Data, the proposing body has proposed a Document Type Definition syntax for expressing the schema for an XML document directly within XML itself. This would allow XML data to describe its own structure. Expressing schemata within XML adds great power to the XML format, because it is then possible for software examining certain data to understand its structure without having any prior built-in descriptions of the data's structure.

XML data objects are accessed and manipulated through an XML parser. An XML parser parses an XML object, validates that document against a DTD, and exposes an object model that can be accessed from an object oriented programming language like C++, Java or Visual Basic. The XML parsers preferably conforms to the XML specification that has been approved by the World Wide Web Consortium. Parsers are available for most computer platforms. Parsers are typically written in C++ or Java, although they can be written in any programming language. Use of an XML parser is illustrated in FIG. 4. This figure shows that the CPD Document object interfaces to the Common Business Objects illustrated in FIG. 3 through the XML Navigator objects creates an instance of the Document Object Model by employing the an instance of the XML parser.

The XML parser exposes an object model and the objects corresponding to the nodes within an XML tree can be accesses, preferably using an object oriented computer language like C++, Java or Visual Basic. The object model is accesses through an API (Application Programming Interface) for programmatic manipulation of data. Preferably, a standard API, the XML DOM (Document Object Model) is used to access and manipulate XML data. The DOM provides a standard set of properties, methods, and events for program developers to use. This set of standards, the object model, provides a simple means of reading and writing data to and from an XML tree structure.

It should be understood that implementing the CPD Document classes of objects as XML data objects is intended to be exemplary only. That is, it is contemplated that the CPD Document class can also be implemented as object classes using object oriented languages like C++, Java or Visual Basic.

Chemical Process Definition Document Class Diagrams

Figure 5:
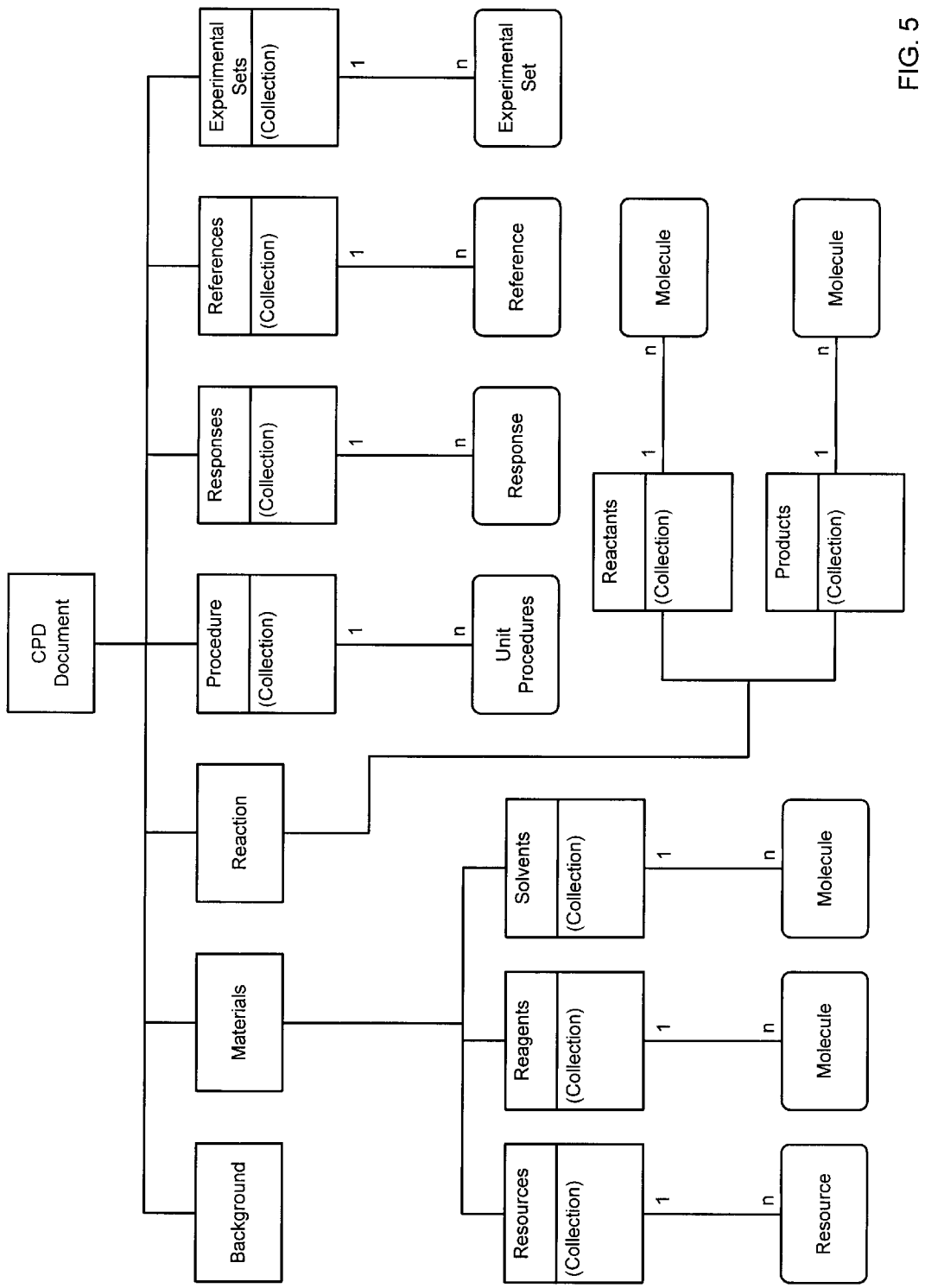
FIG. 5 is a class diagram of the CPD Document category illustrated in FIG. 4, showing the Background, Materials, Reaction, Procedure, Responses, References and Experimental Sets classes of objects.

The following section will describe the framework of the present invention in terms of object class diagrams for the Chemical Process Definition Document categories. We will use the widely followed convention that class names comprise descriptive words whose initial letters are upper case. FIG. 5. is an object class diagram that illustrates the characteristics of the category called CPD Document. A CPD Document category comprises container objects classes that contains information specified by the CPD Document. The class definition describes the chemical process that is the subject of the chemical-process-development decision-support application. That is, the CPD Document defines and describes the chemical process that is undergoing development and the results of experiments during the development process. FIG. 5. shows that the CPD Document has, or contains, relationships with several classes including Background, Materials, Reaction, Experimental, Responses, References, and Experimental Sets.

Background Class

The Background class defines the background information on the chemical process. It includes, for example, the following: its identity with attributes such as project name, synthesis name, notebook source, investigator, and department, and company; document control properties such as creation date and last modified date; textual descriptions; and a collection of user fields.

Material Class

Figure 6:
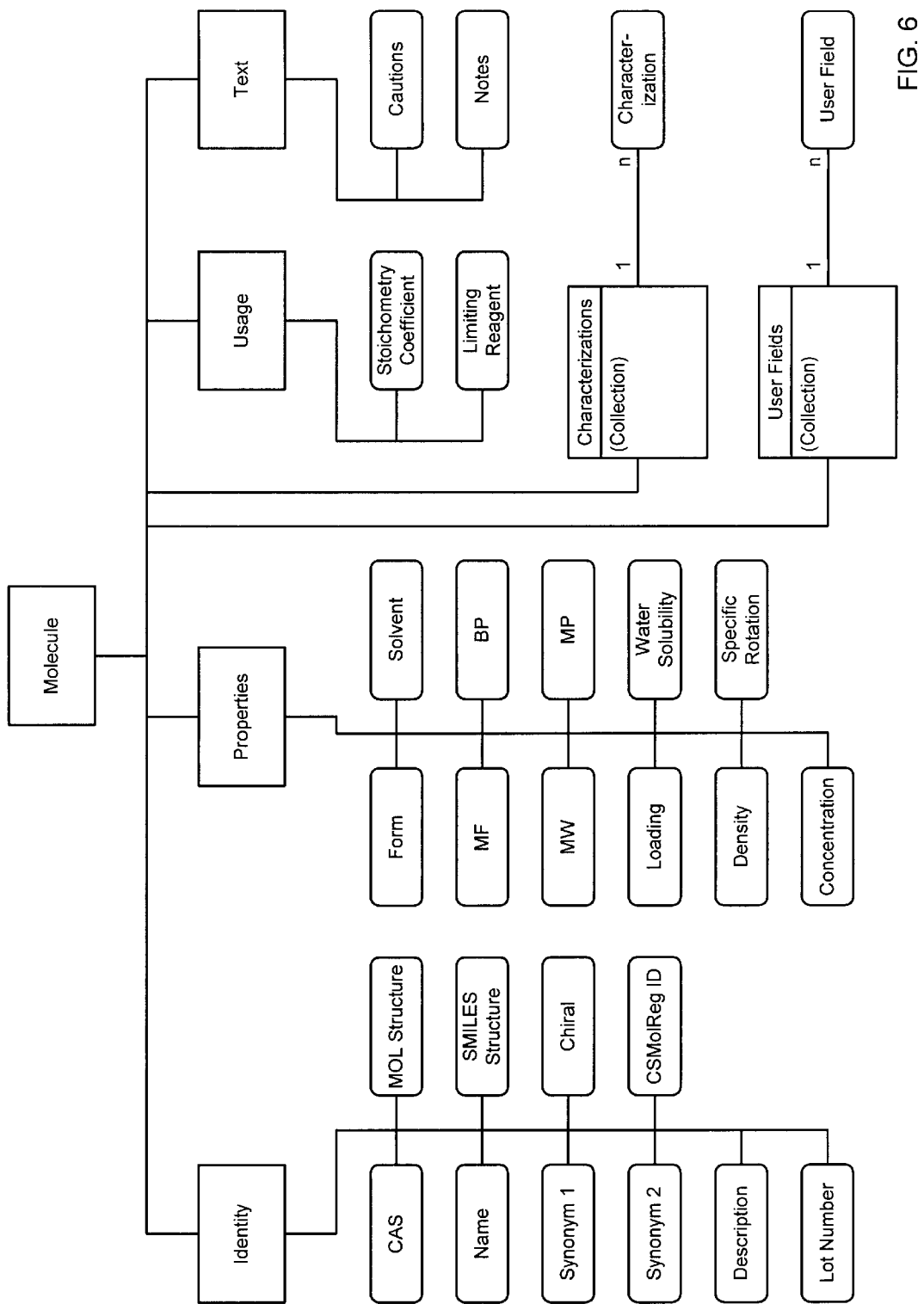
FIG. 6 is class diagram of the Molecule class illustrated in FIG. 5 that contains information on the Identity, Properties, Characterization, Usage and Description classes of objects which describe chemical molecules used in the chemical process of the present invention.

The Materials class defines the resources and chemical materials used in the chemical process. Preferably, a Materials class defines Resources, Reagents, and Solvents as object collections. The Resources class contains information on equipment used in the chemical process and identifies it on the basis of its ID, name, type, description and properties, which might include the volume as well as the maximum and minimum operating volume. The Reagents and Solvent classes consist of an object collection that is composed of members of the Molecule class. The Molecule class of objects contains the information that identifies and characterizes a molecule. FIG. 6 illustrates a class diagram of the Molecule class that contains information on the identity, properties, characterization, usage and description of chemical molecules used in the chemical process undergoing development using the present invention. Those skilled in the art will recognize that Molecule Identity information can include the Chemical Abstract Number (CAS), name, synonyms, description, lot number, the molecular structure encapsulated in a chemical structure connection table (MOL structure), the molecular structure encapsulated in a molecular line notation (SMILES string), an indication whether the structure is chiral, and an internal registration number. Molecule Property information includes molecular form (e.g., solid, liquid, solution, mixture, gas, resin), molecular formula, molecular weight, the loading (moles/unit mass), density, concentration, solvent used to make a solution, boiling point, melting point, water solubility, and specific rotation if the molecule is chiral. Molecule Characterization consists of a collection of subclasses which contain chemical characterization information on the molecule like gas and HPLC traces, mass spectra, NMR spectra, UV/Vis spectra and IR spectra.

Reaction Class

The Reaction class defines the chemical process that is the subject of the chemical-process-development decision-support application in terms of the chemical equation (compositions, structures, and stoichiometry) involved in transforming reactants to products. The Reaction class is comprised of an object collection of Reactants and an object collection of Products. Similar to the Materials class, the Reactants and Products collections are composed of members of the Molecule class.

Procedure Class

Figure 7:
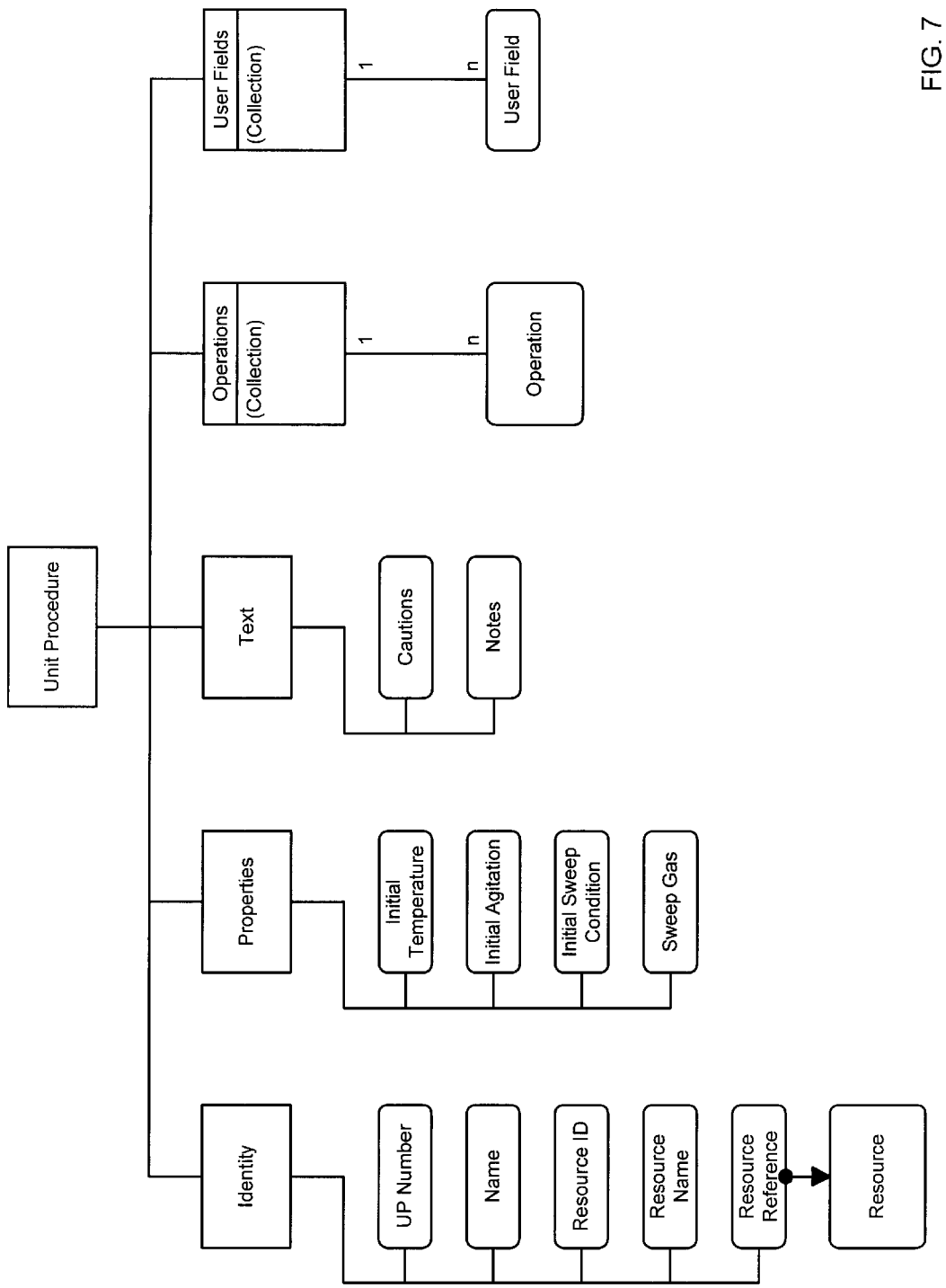
FIG. 7 is a class diagram of the Unit Procedure class illustrated in FIG. 5 consisting of Identity information, Properties, Text information, Operations and User classes of objects.

The Procedure class defines the sequence of chemical process activities needed to convert a reactant to a product. The Procedure class is comprised of an object collection of Unit Procedures. FIG. 7 illustrates an object diagram of the Unit Procedure class and related classes. FIG. 7 shows that a Unit Procedure contains identity information, properties and text information about a Unit Procedure.

Figure 8:
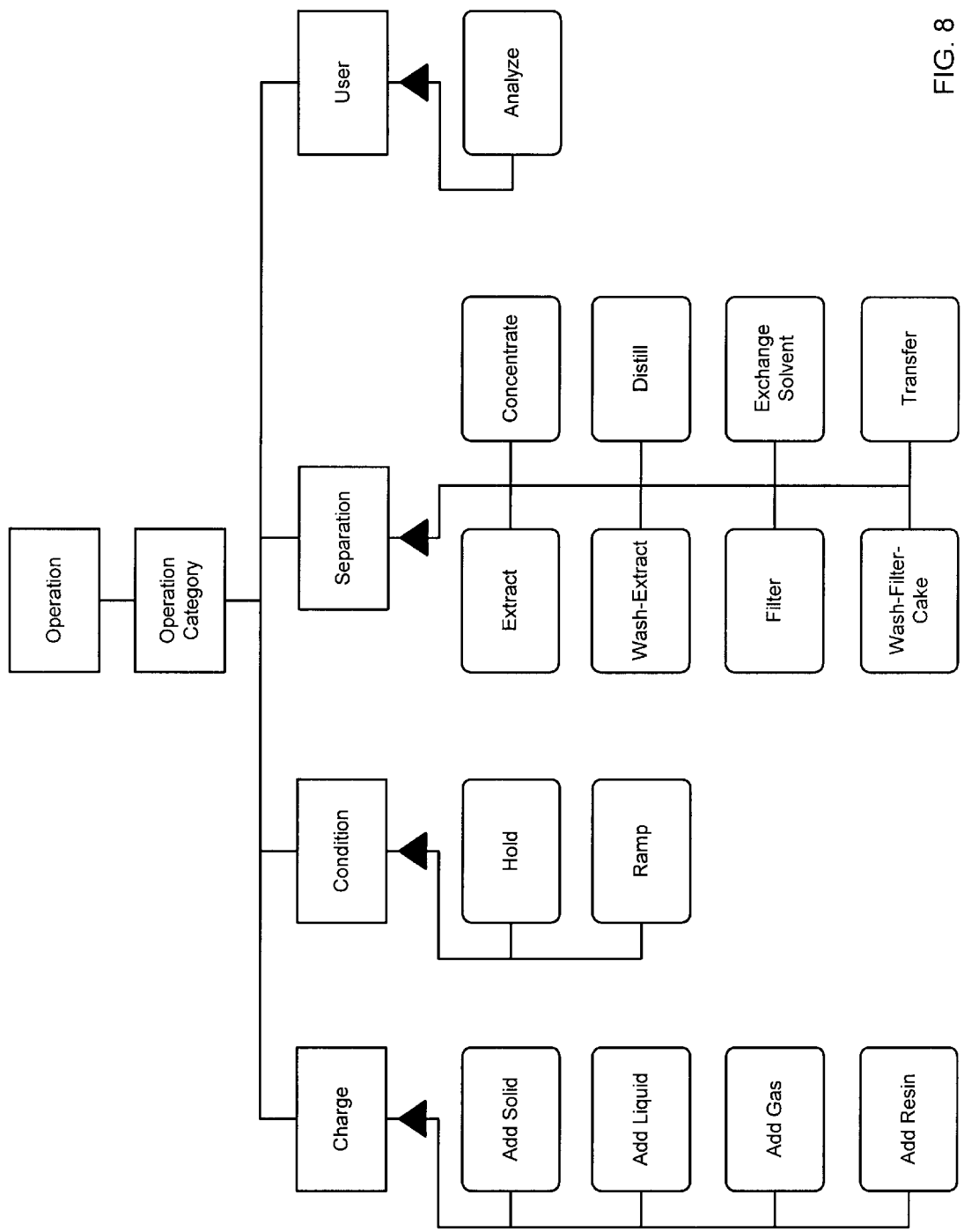
FIG. 8 is a class diagram of the Operation class illustrated in FIG. 7 that contains the Operation Categories of Charge, Condition, Separation and User classes of objects.
Figure 9:
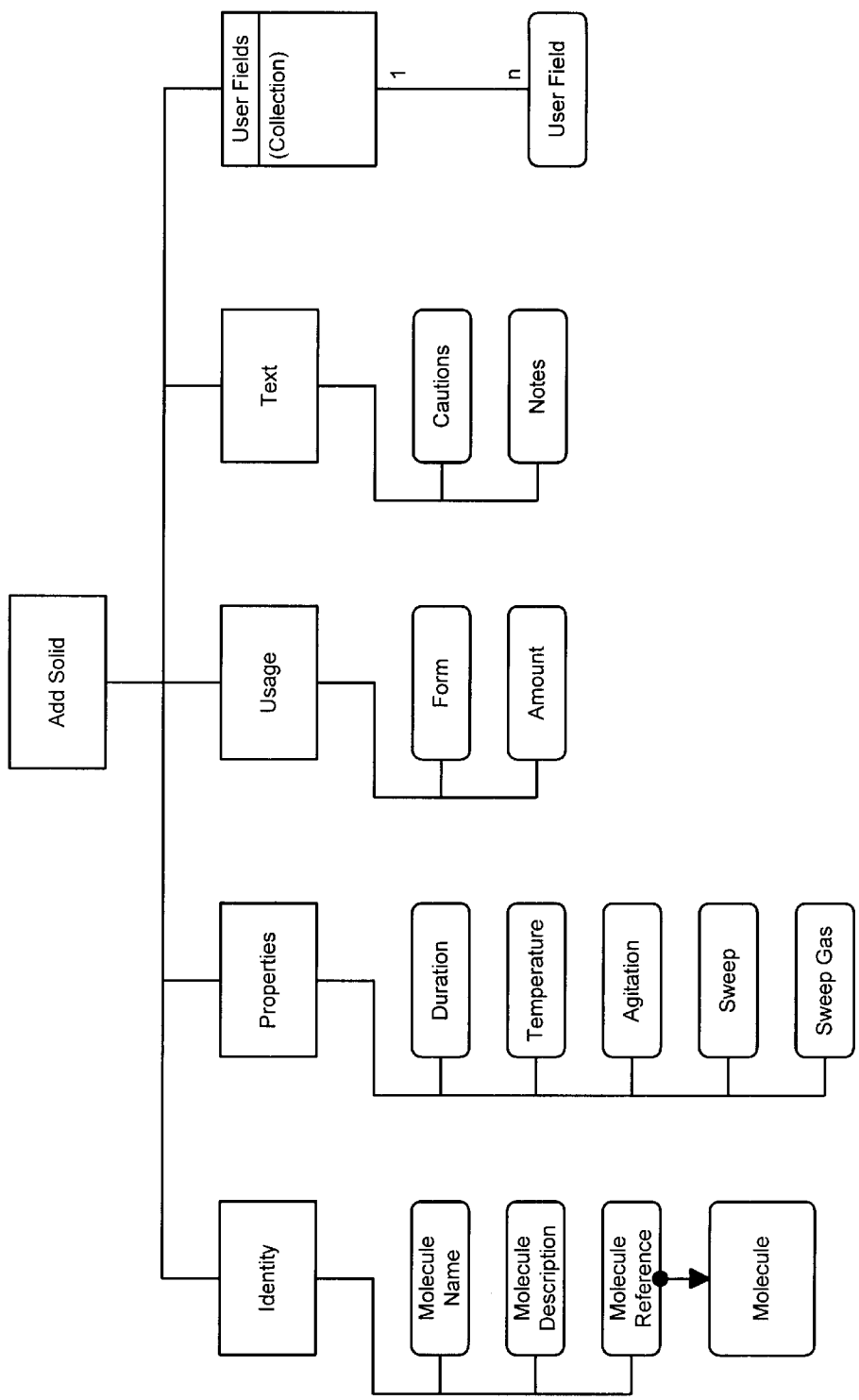
FIG. 9 is a class diagram of the Add Solid class illustrated in FIG. 8.
Figure 10:
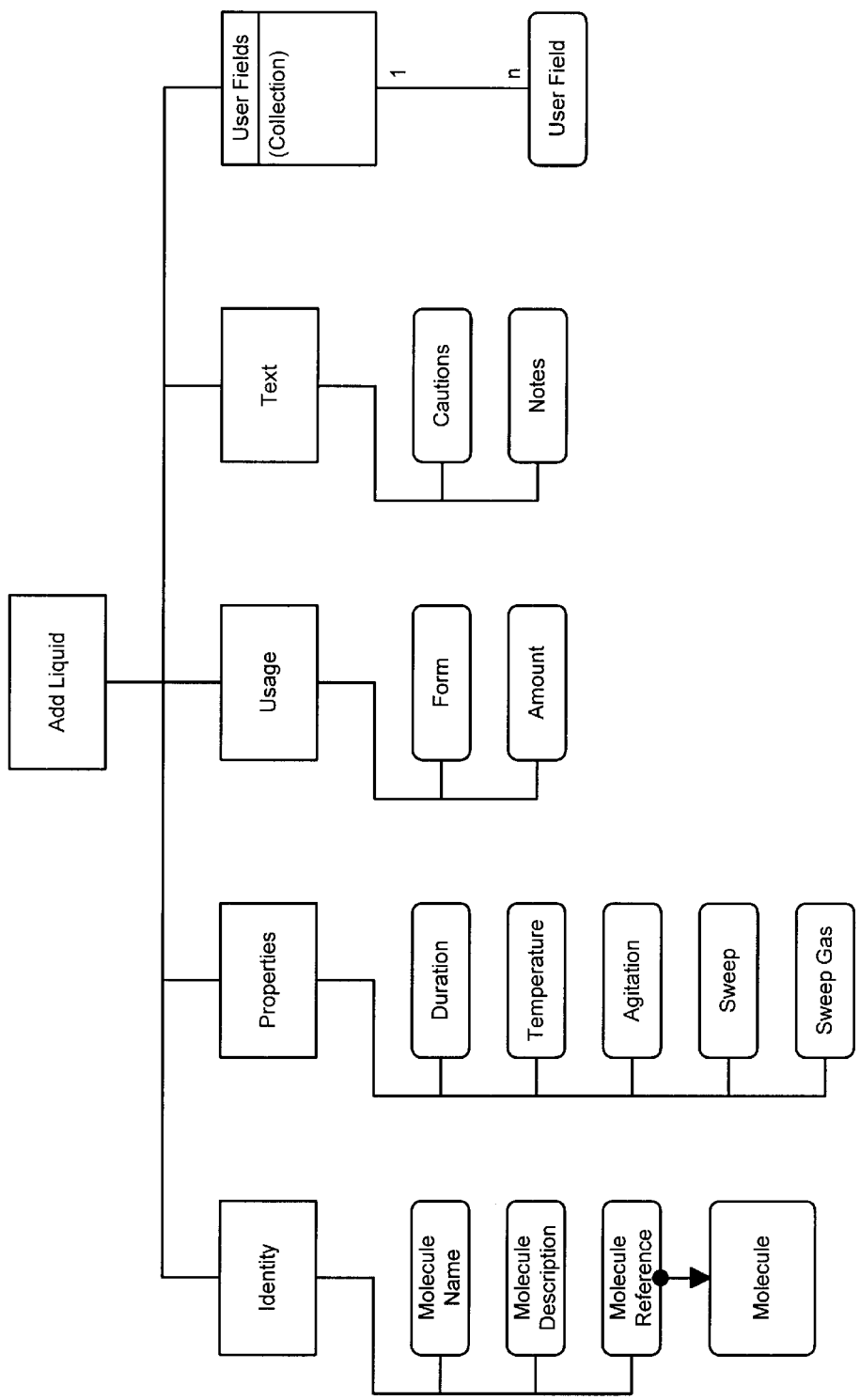
FIG. 10 is a class diagram of the Add Liquid class illustrated in FIG. 8.
Figure 11:
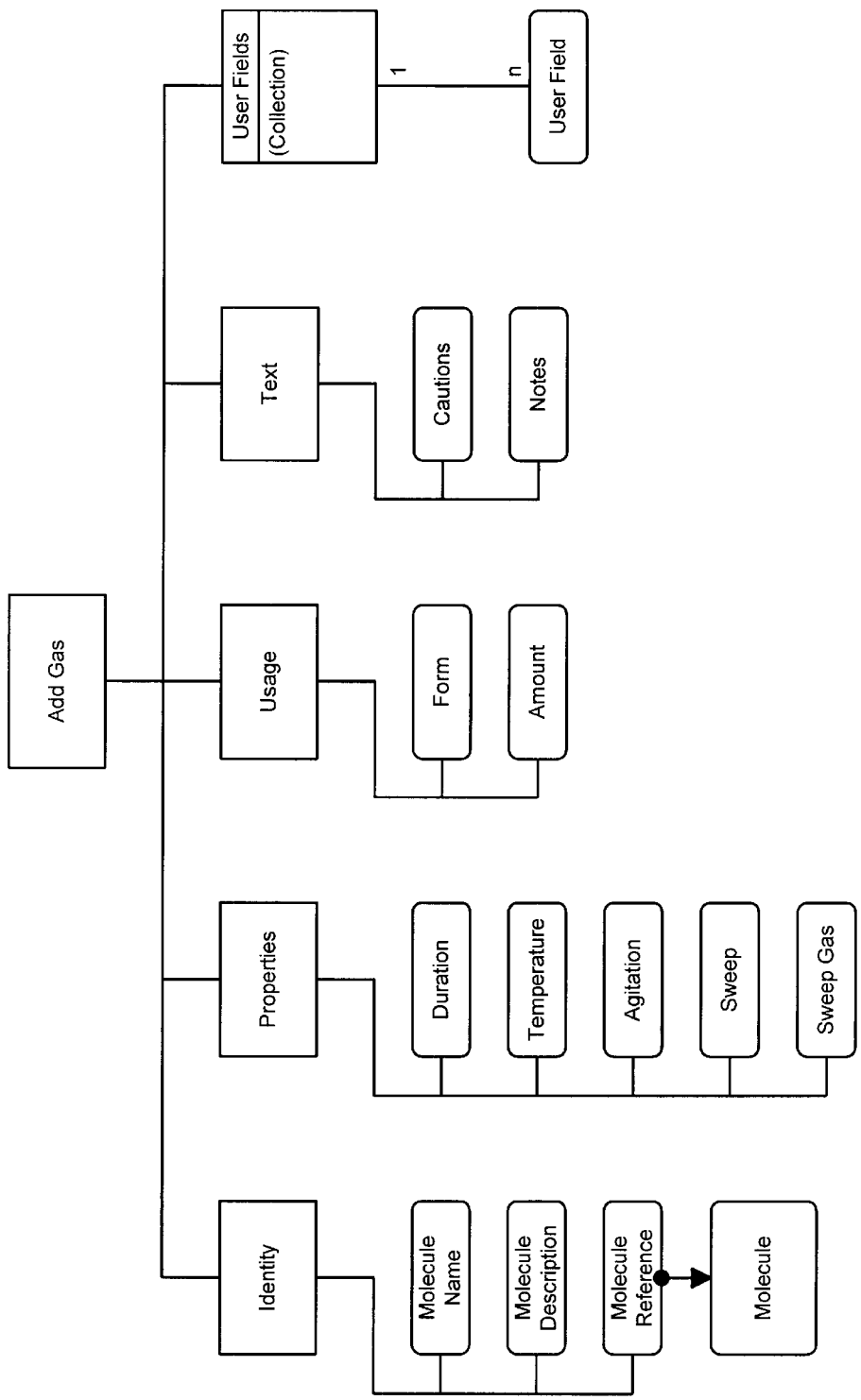
FIG. 11 is a class diagram of the Add Gas class illustrated in FIG. 8.
Figure 12:
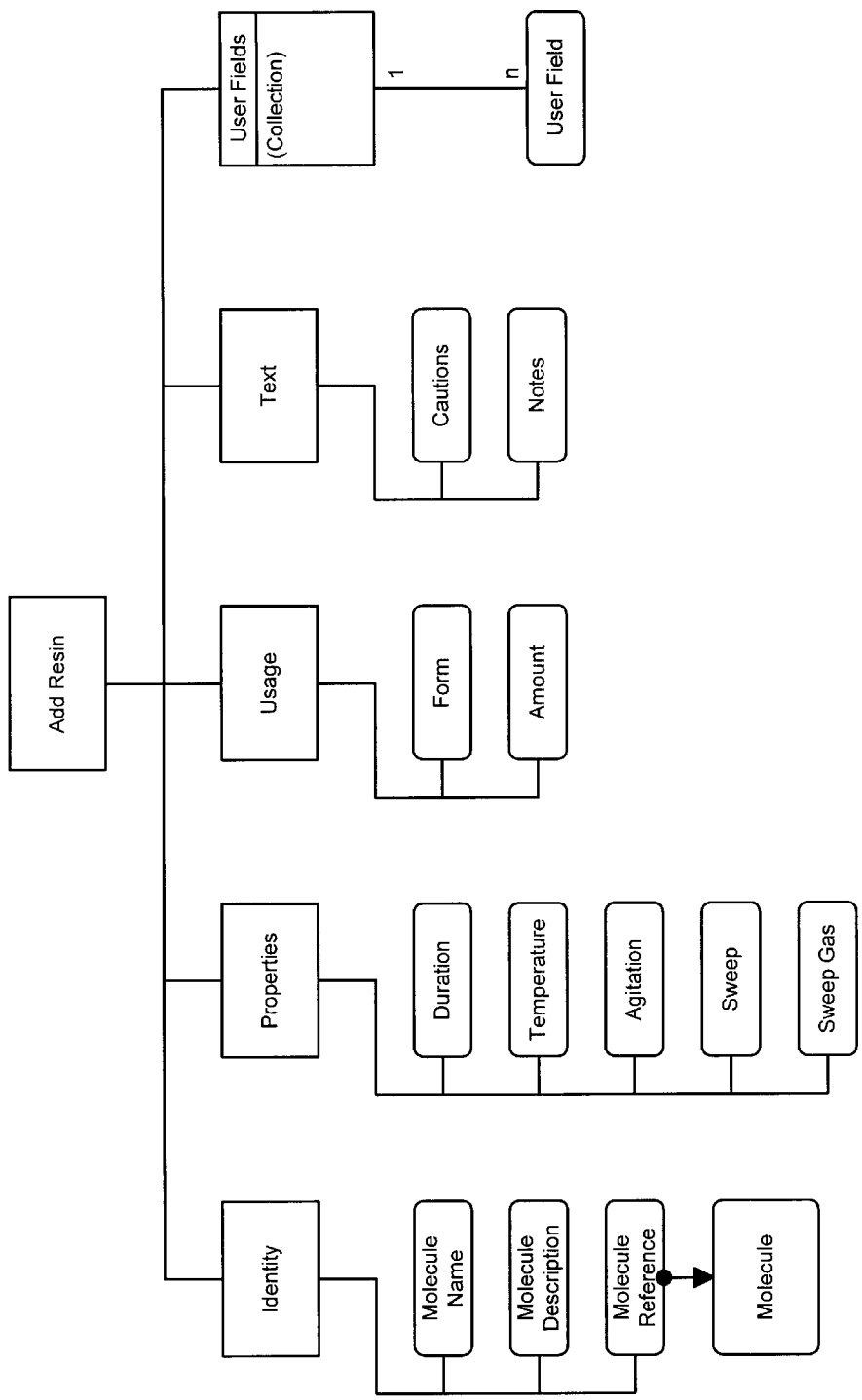
FIG. 12 is a class diagram of the Add Resin class illustrated in FIG. 8.

A key related class of the Unit Procedure is the Operations object collection. Operations consist of a collection of chemical process activity classes—that is, a set of operation primitives which describe chemical process activities used to perform a chemical process. FIG. 8 illustrates a class diagram for Operations and related classes used in Unit Procedures. In the preferred embodiment the Operation class includes abstract base classes. An abstract class represents a class that will be extended by the frame work user to provide features specially selected by the framework user to add value to the resulting application program. Abstract classes will be designated in the drawings with a solid triangle. Operations consists of a set of abstract classes, which can include Charge, Condition, Separation, and User classes. Such Operation Category abstract classes provides a framework extension point where application program developers can specialize the application to hold new operation categories. Individual Operations (e.g., Add Solid) inherit their properties from the corresponding abstract base class (e.g., Charge).

The Charge base class contains information on methods and properties of the activities involved in adding chemical entities employed in the chemical process during the course of the procedure. FIG. 9, FIG. 10, FIG. 11 and FIG. 12 illustrate class diagrams for the Add Solid, Add Liquid, Add Gas and Add Resin classes, respectively, which are children of the Charge base class. FIG. 9, FIG. 10, FIG. 11 and FIG. 12 also show how the classes can be extended by referencing other classes. For example, the Molecule Reference class points to the Molecule class, indicating that in the preferred embodiment the Molecule Reference points to an instance of the Molecule class.

Figure 13:
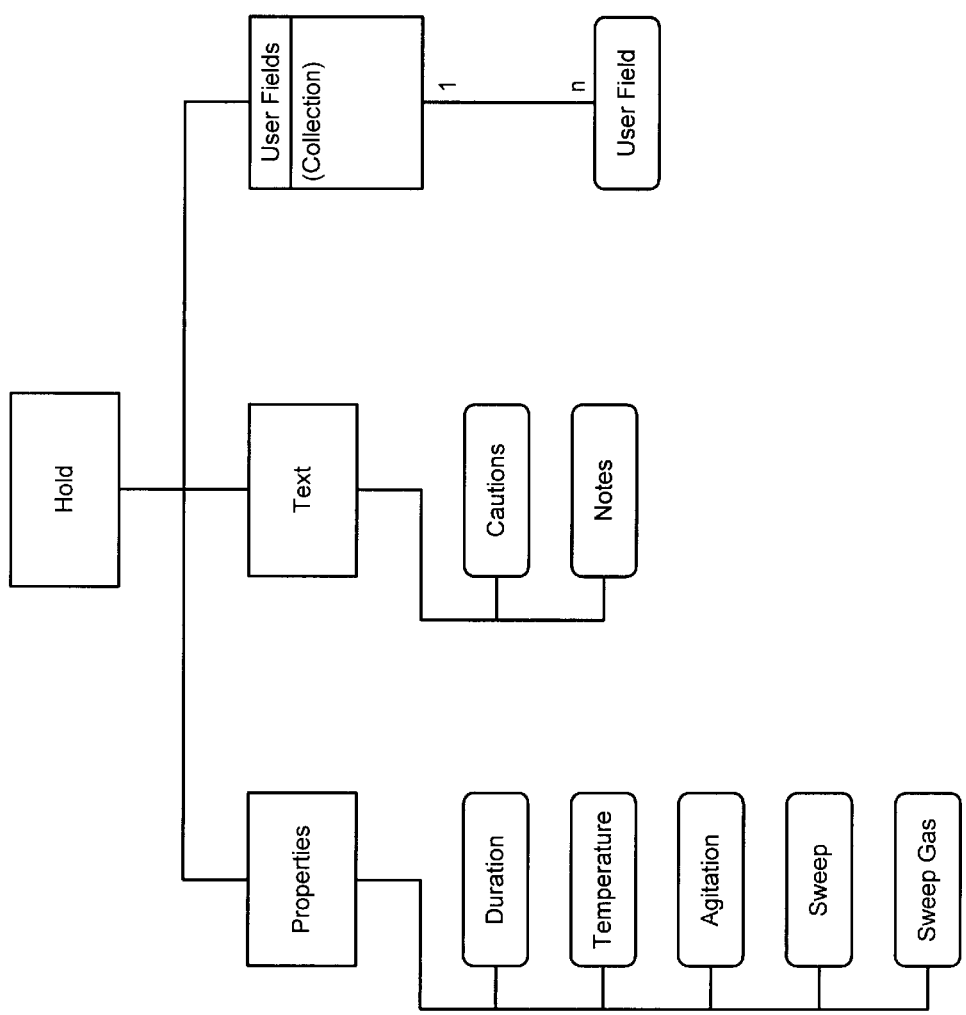
FIG. 13 is a class diagram of the Hold class illustrated in FIG. 8.
Figure 14:
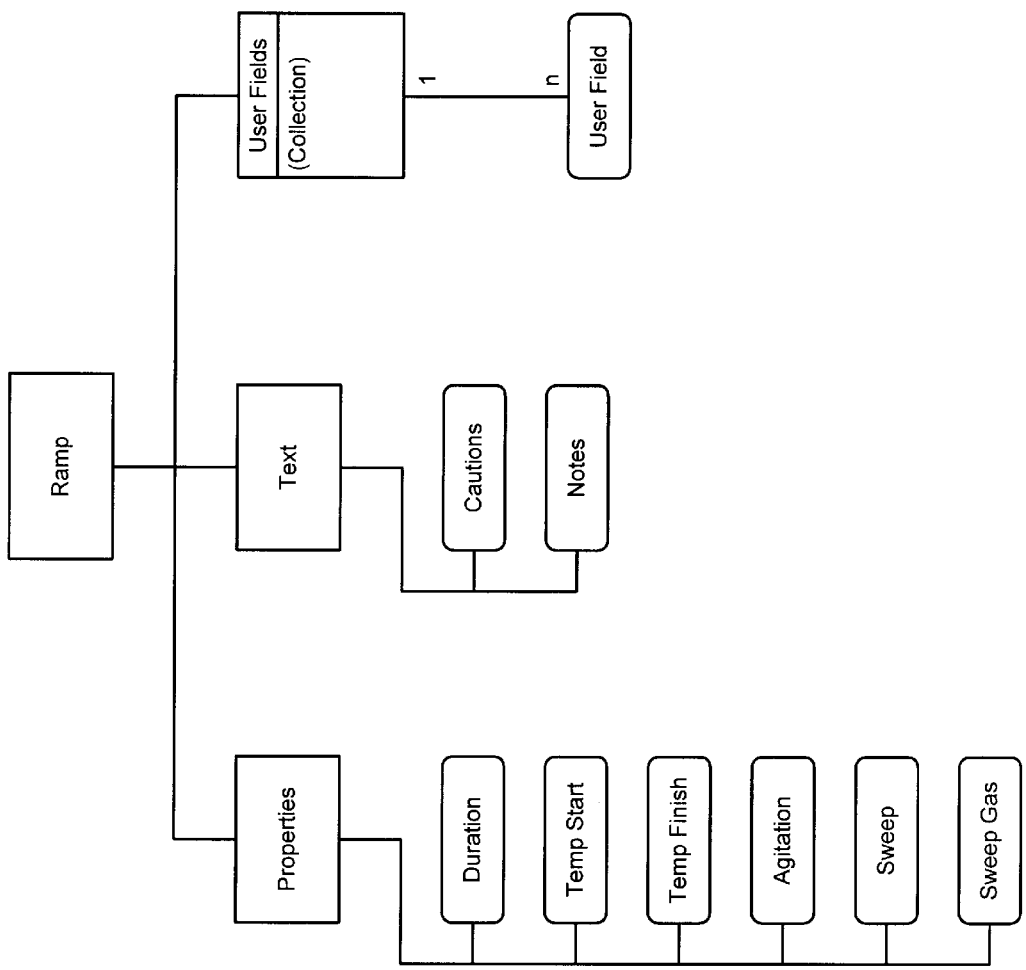
FIG. 14 is a class diagram of the Ramp class illustrated in FIG. 8.
Figure 15:
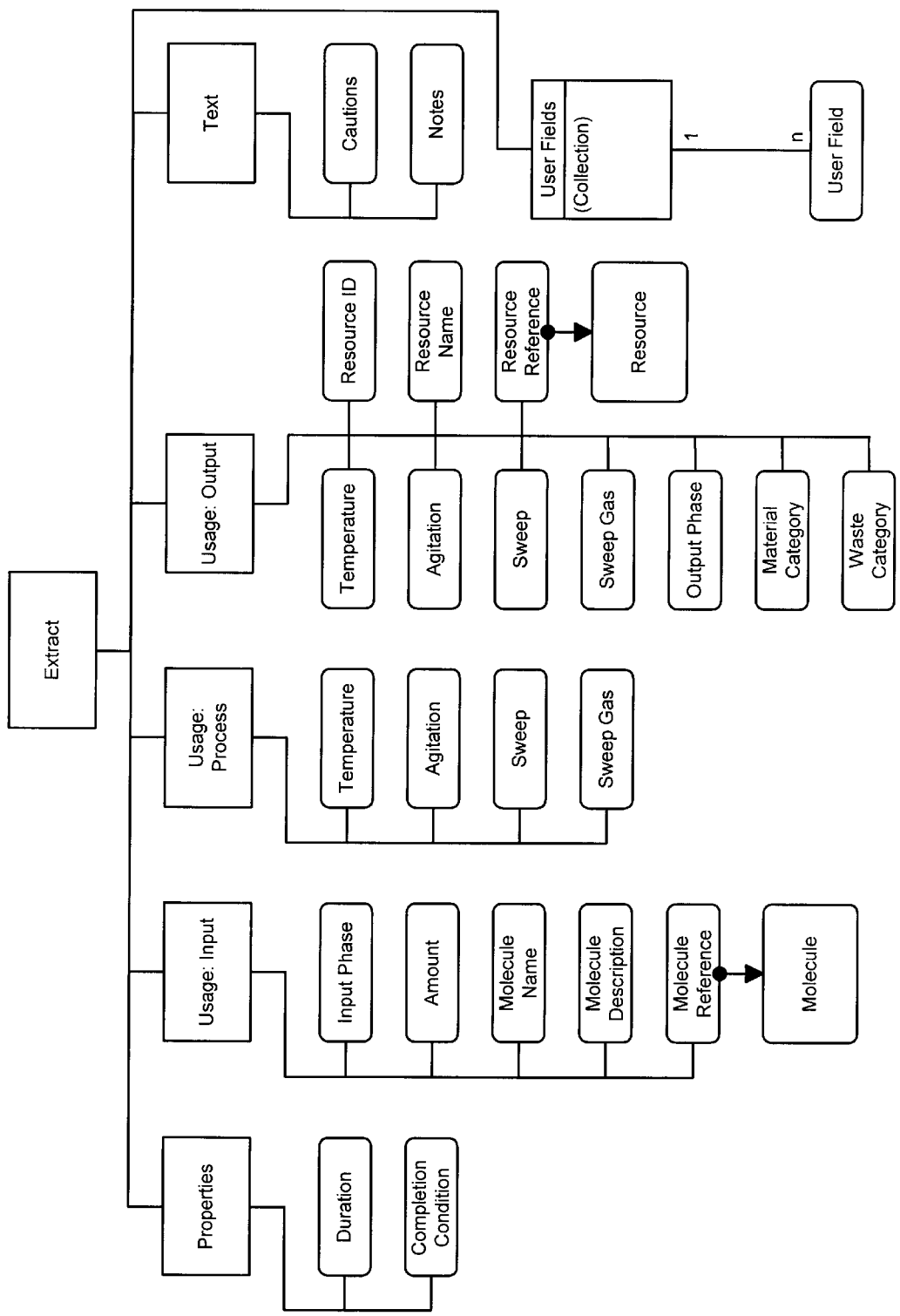
FIG. 15 is a class diagram of the Extract class illustrated in FIG. 8.
Figure 16:
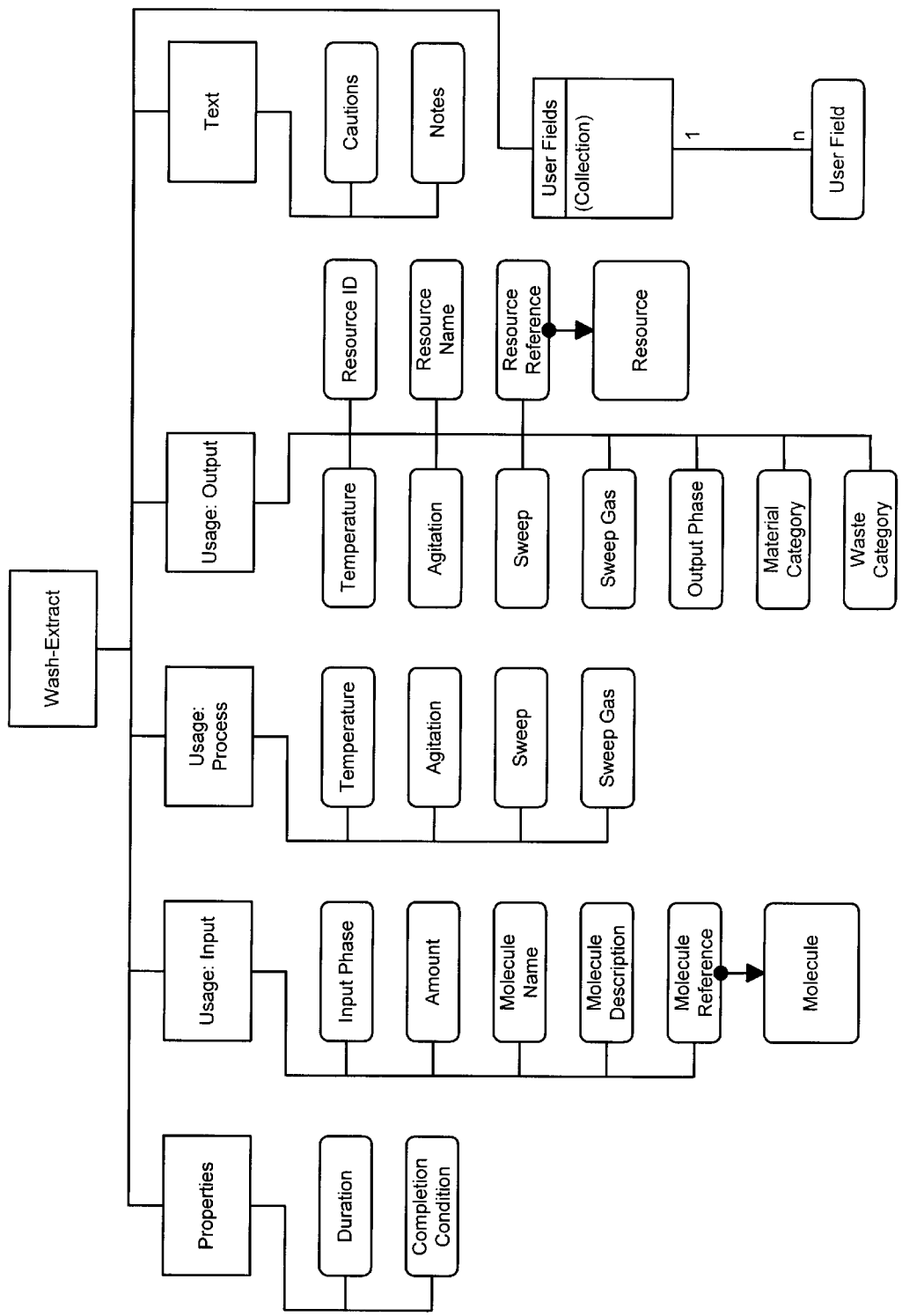
FIG. 16 is a class diagram of the Wash-Extract class illustrated in FIG. 8.
Figure 17:
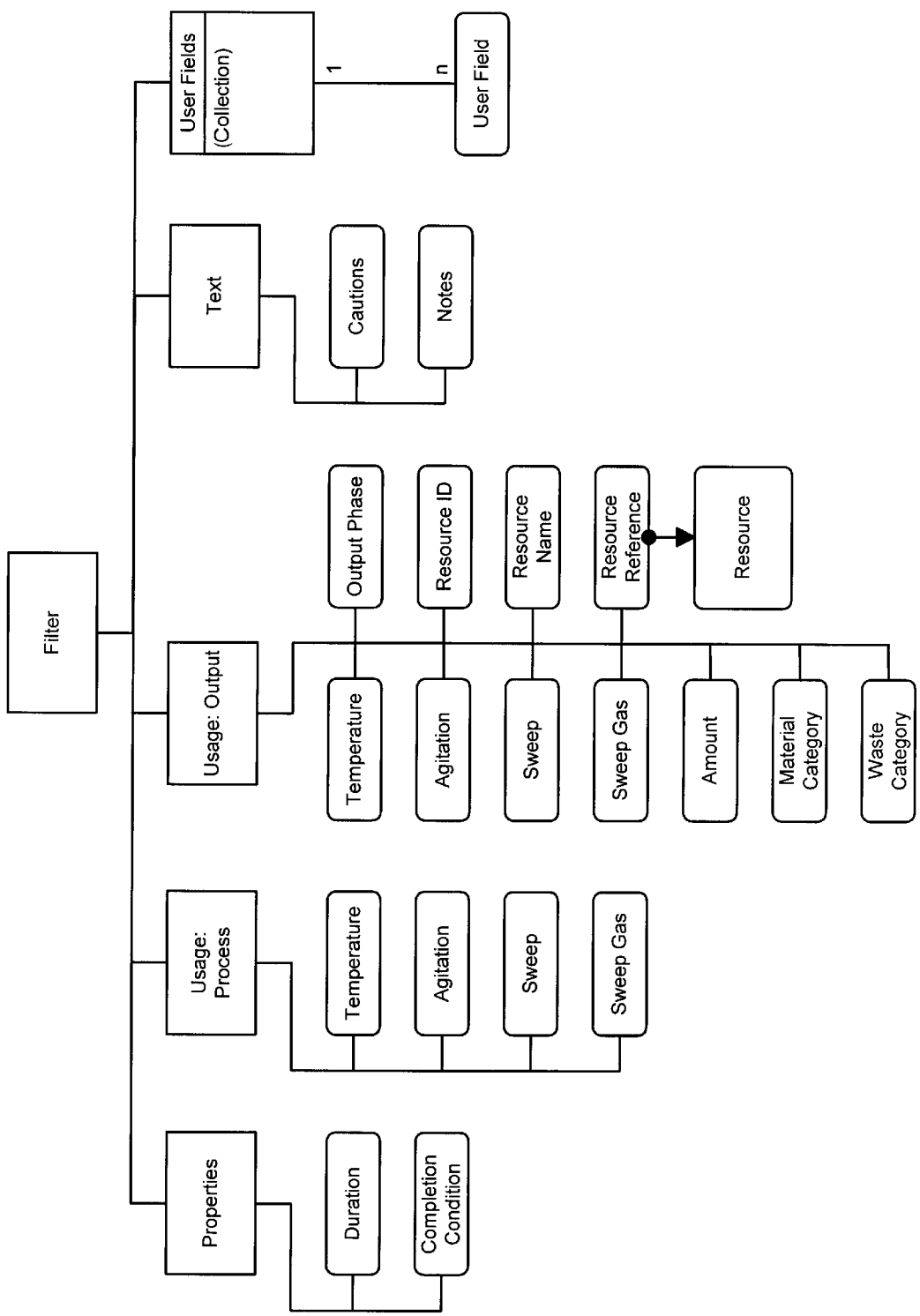
FIG. 17 is a class diagram of the Filter class illustrated in FIG. 8.
Figure 18:
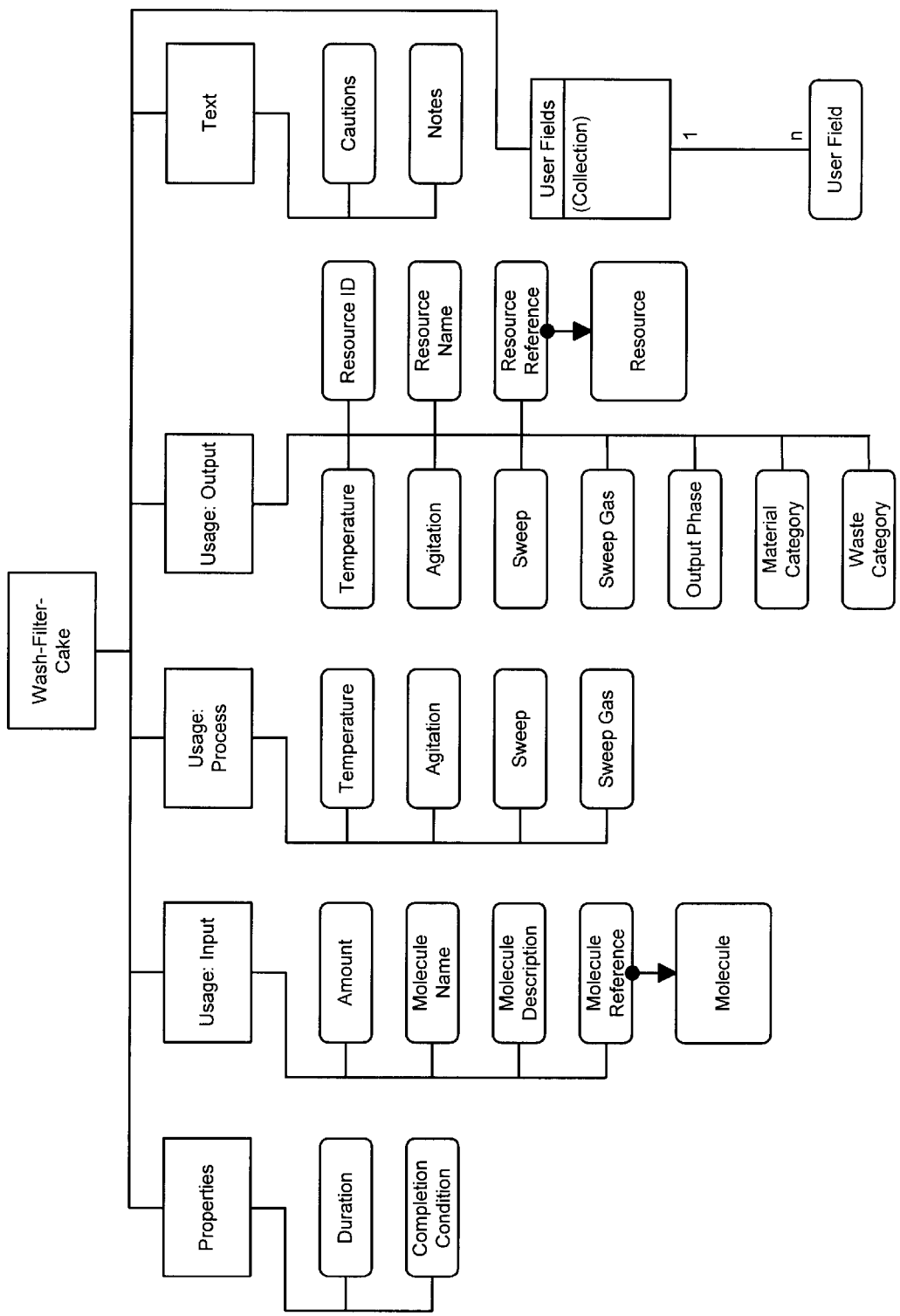
FIG. 18 is a class diagram of the Wash-Filter-Cake class illustrated in FIG. 8.
Figure 19:
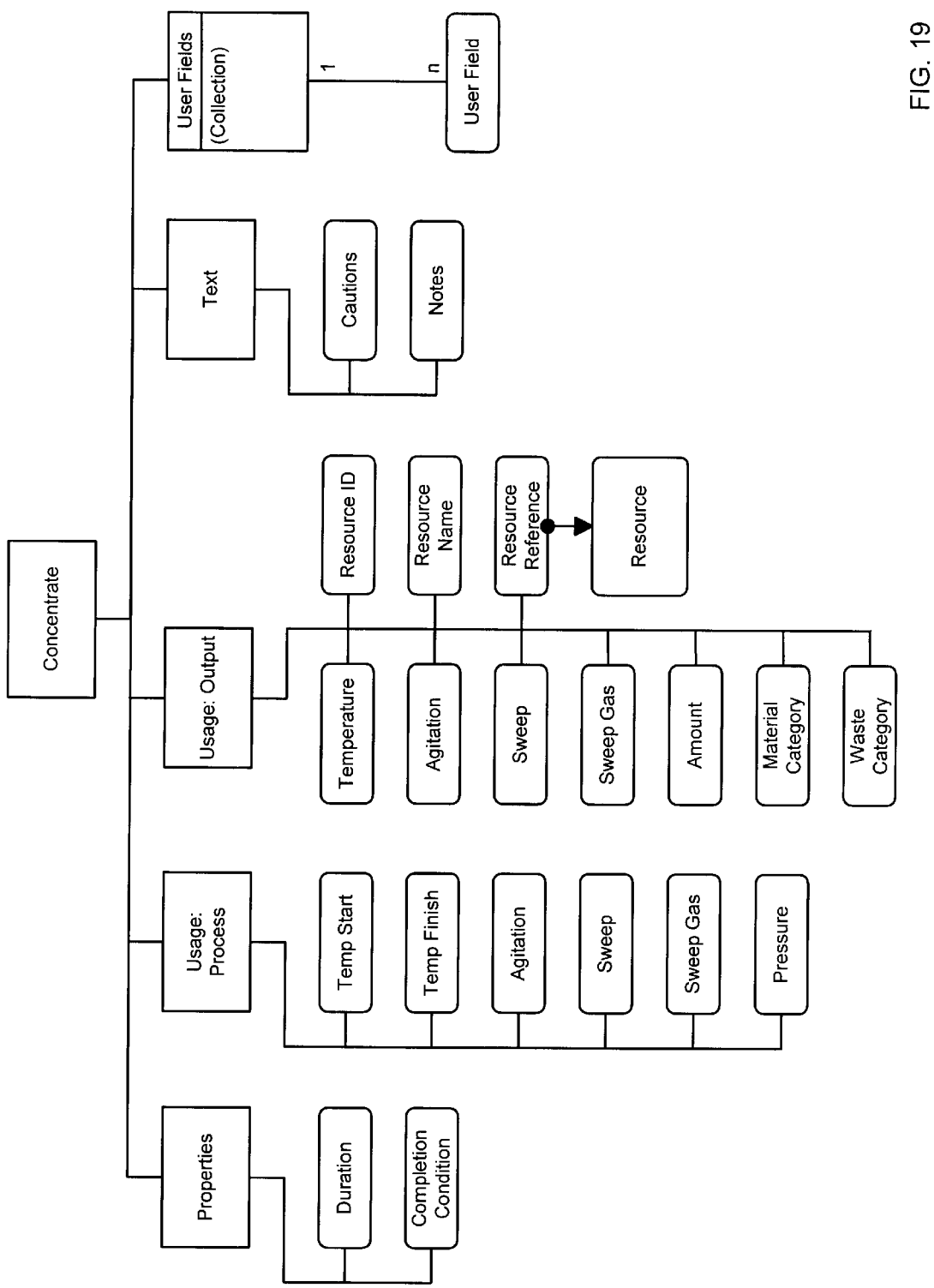
FIG. 19 is a class diagram of the Concentrate class illustrated in FIG. 8.
Figure 20:
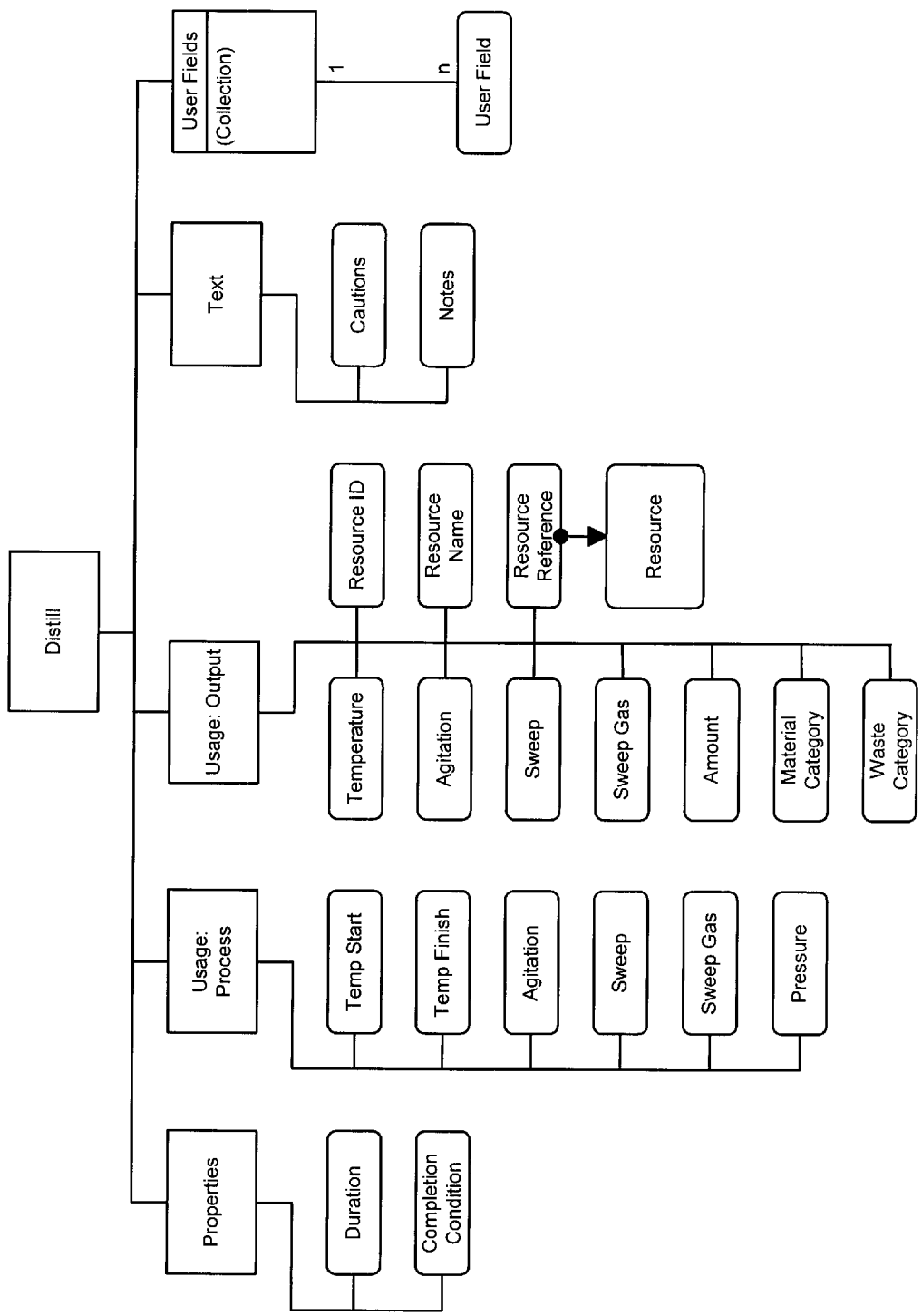
FIG. 20 is a class diagram of the Distill class illustrated in FIG. 8.
Figure 21:
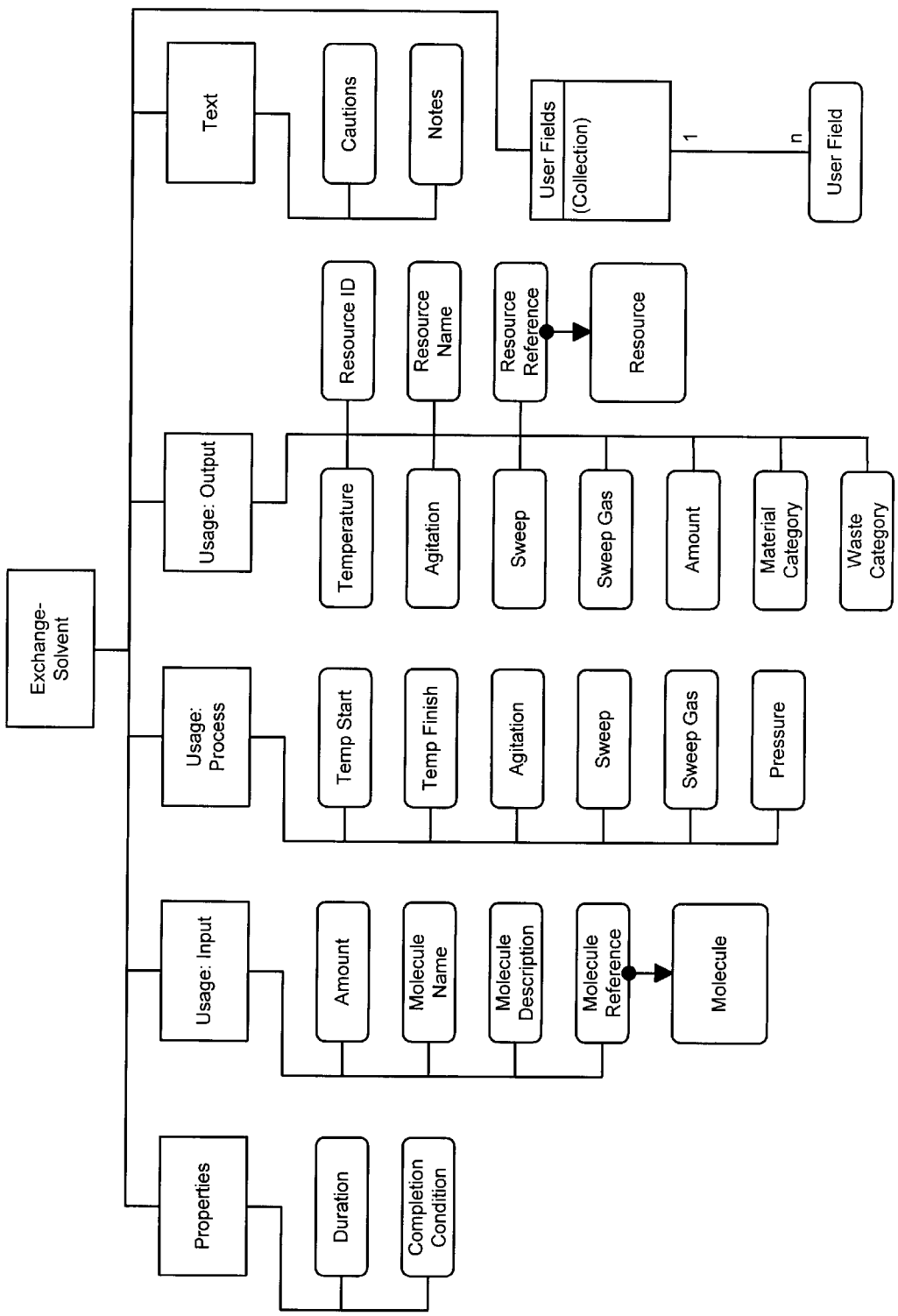
FIG. 21 is a class diagram of the Exchange-Solvent class illustrated in FIG. 8.
Figure 22:
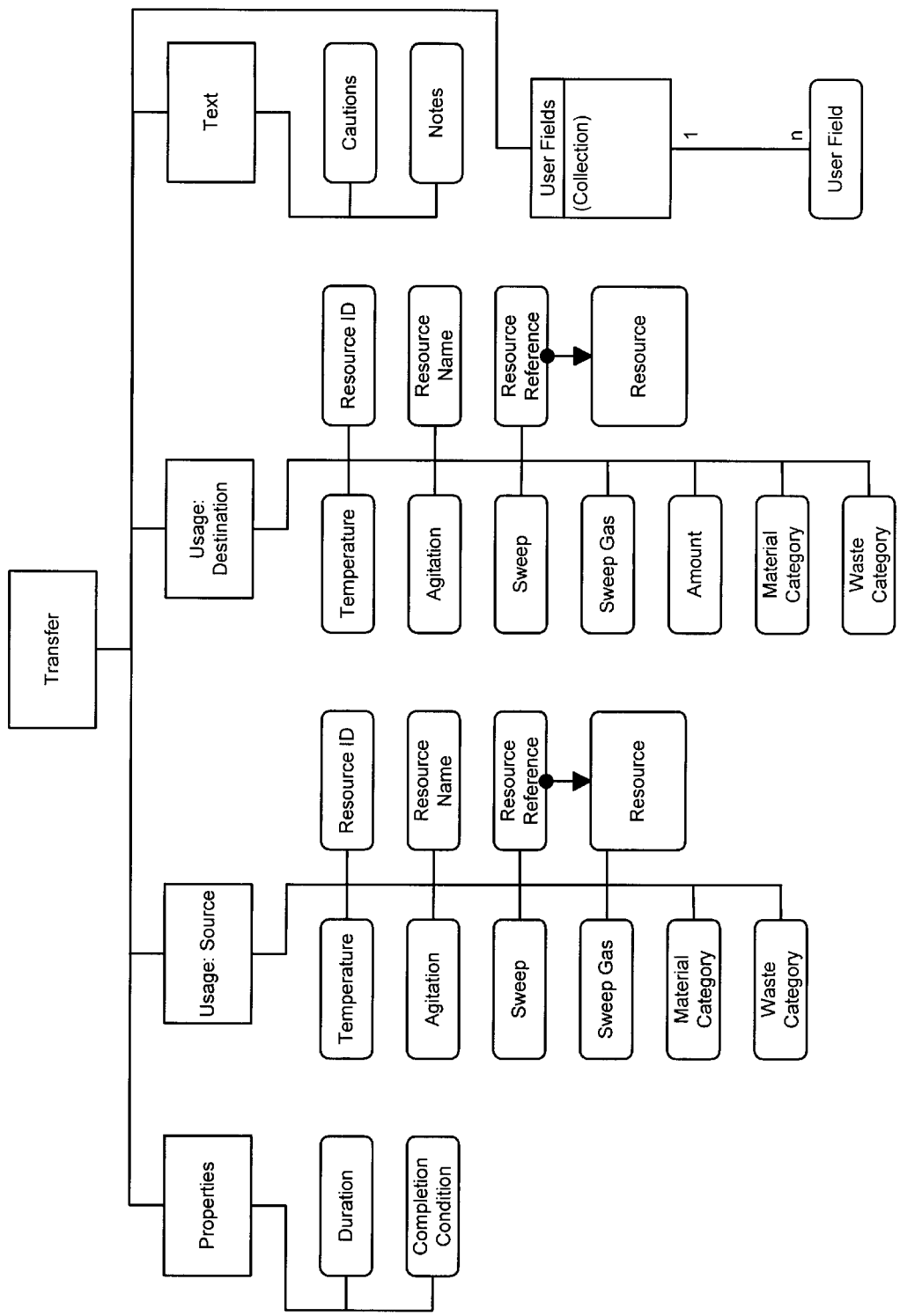
FIG. 22 is a class diagram of the Transfer class illustrated in FIG. 8.

The Condition base class contains information on methods and properties of the conditions that the chemical entities employed in the chemical process are maintained during the course of the procedure. FIG. 13. and FIG. 14 illustrate class diagrams for the Hold and Ramp classes, respectively, which are children of the Condition base class.

The Separation base class contains information on methods and properties of the activities involved in work-up, isolation, and purification of the chemical entities produced by the chemical process. FIG. 15, FIG. 16, FIG. 17, FIG. 18, FIG. 19, FIG. 20, FIG. 21, and FIG. 22 illustrate class diagrams for the Extract, Wash-Extract, Filter, Wash-Filter-Cake, Concentrate, Distill, Exchange-Solvent and Transfer classes, respectively, which are children of the Separation base class. FIG. 15, FIG. 16, FIG. 17, FIG. 18, FIG. 19, FIG. 20, FIG. 21, and FIG. 22 also show how the classes can be extended by referencing other classes. For example, the classes are extended by having the Molecule Reference points to the Molecule class and by having the Resource Reference points to the Resource class. Thus, in the preferred embodiment the Molecule Reference points to an instance of the Molecule class and the Resource Reference points to an instance of the Resource class.

Figure 23:
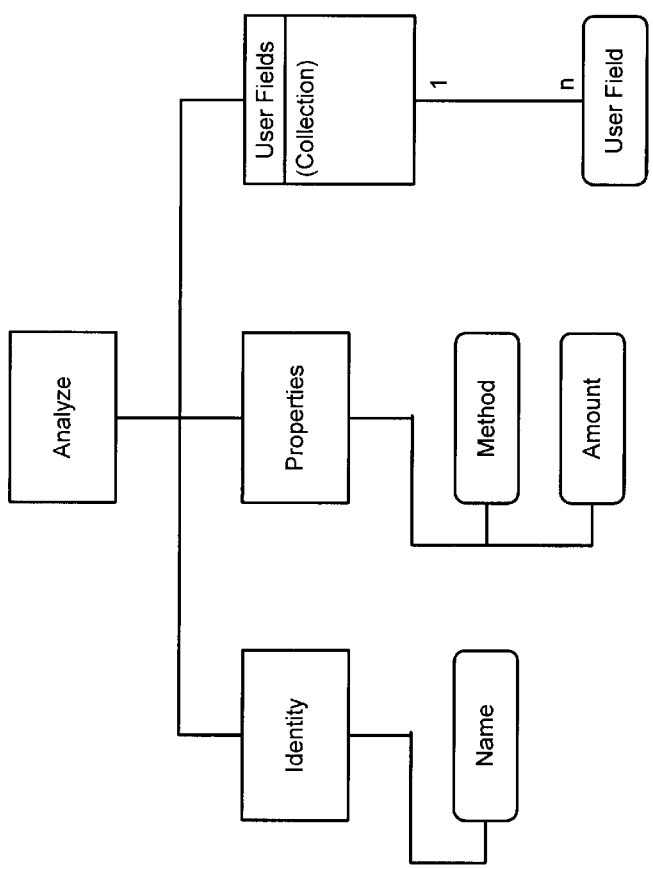
FIG. 23 is a class diagram of the Analyze class illustrated in FIG. 8.

The User class is used to group together an arbitrary list of operation details and serves as a container for custom user-designated classes. For example, FIG. 23 shows the Analyze class. This class contains the information associated with perform in-process analytical controls during the course of the chemical process.

Responses Class

The Response class contains information on the outcome of the chemical process. Those skilled in the art will recognize the responses often constitute the "results" of chemical-process development activity and represent important metrics for gauging the status of chemical development activities.

Figure 24:
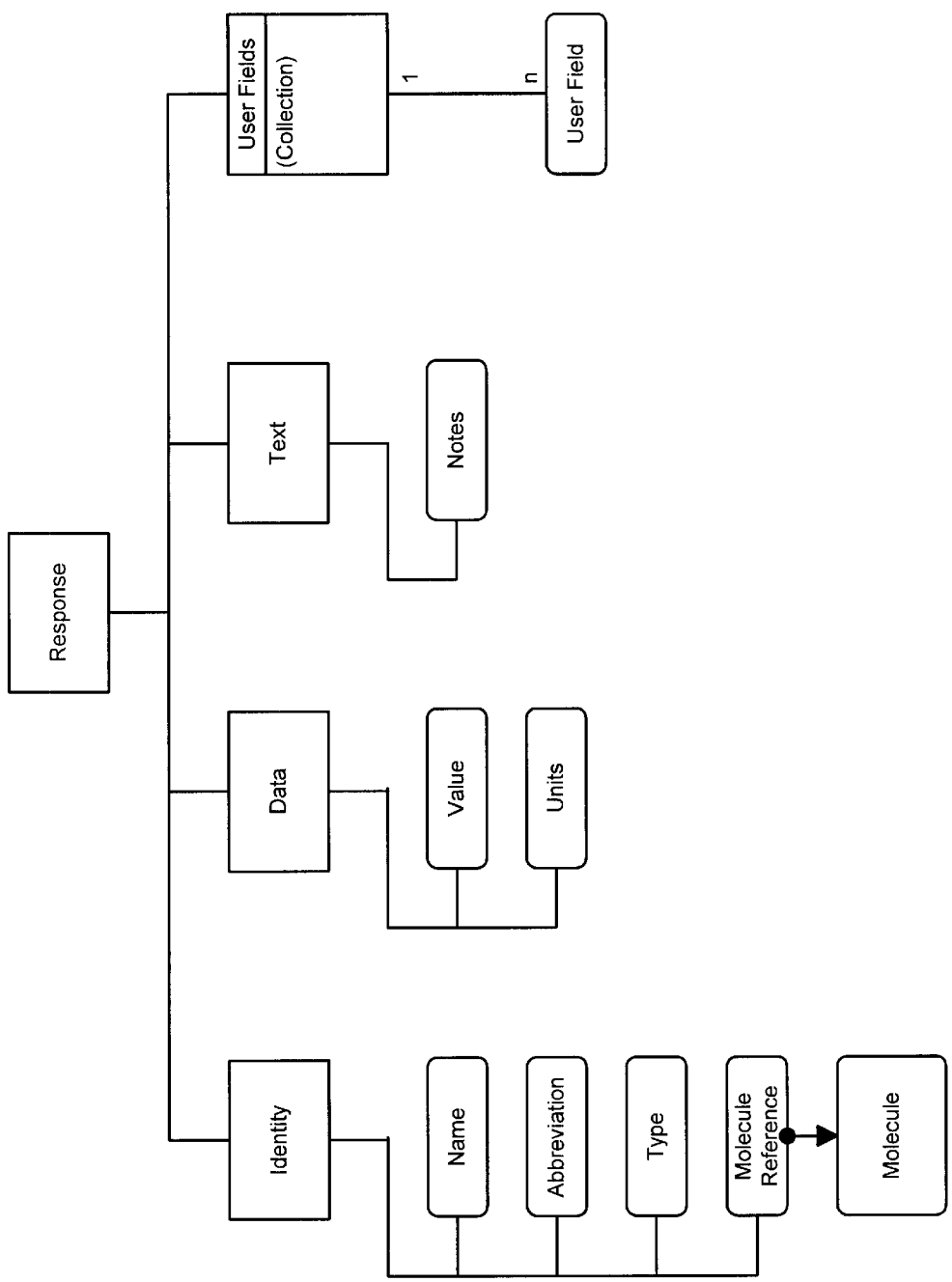
FIG. 24 is a class diagram of the Response class illustrated in FIG. 5.

FIG. 24 shows that the Response class contains information on the identity of the response in the Identity subclass. Identity information can include name, abbreviation, type, and a reference to an instance of a Molecule class. The Identity class can contain a number of pre-defined Names including, for example, product yield, total impurities, single impurity, chemical purity, reactant conversion, enantiomeric excess, diastereomeric excess, and isomeric excess. The corresponding values and units of instances of the Response class are contained in the Data subclass.

References Class

Figure 25:
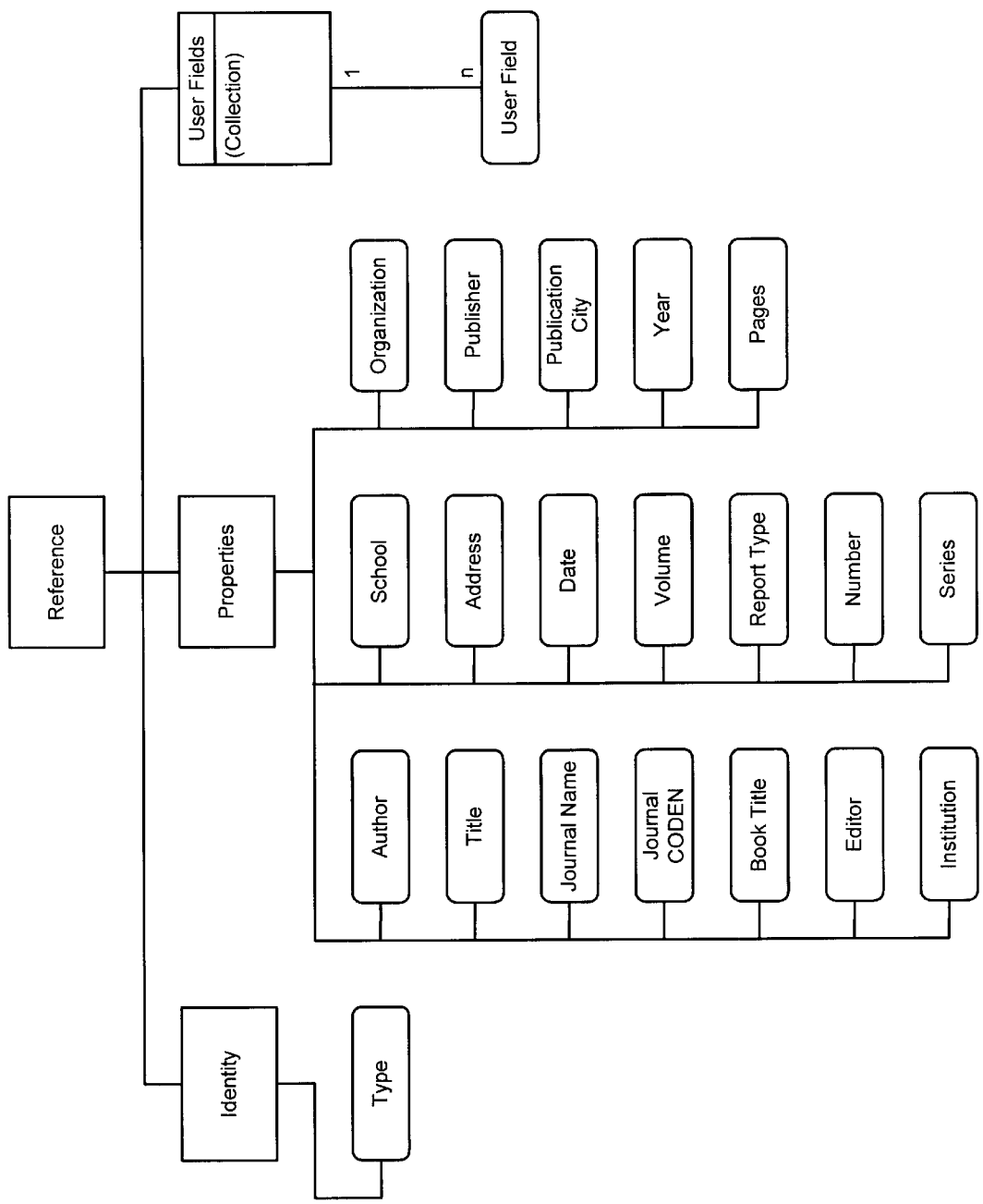
FIG. 25 is a class diagram of the Reference class illustrated in FIG. 5.

The References class contains information on published and unpublished references that relate to the chemical process undergoing development by the user. FIG. 25 shows the Reference class can contain information on the reference type (e.g., article, book, conference proceeding, thesis) as well as the properties of the reference.

Experimental Sets Class

The Experimental Set class contains information on the chemical process that has been operated under conditions that constitute a variation of the base (default) chemical process definition. For example, a variation set of the chemical process definition may consists of the group of experiments that have been run at the default conditions but have been modified to include various larger amounts of reactant, various different solvents, and running the chemical process at various higher and lower temperatures. Such variation sets are the basis for probing the chemical process definition in order to characterize its behavior. Those skilled in the art will recognize that knowledge of the behavior of the chemical process can assist the user in evaluating the impact of factors under the control of the users on the quality of the product, optimizing the chemical process on the basis of response criteria, and evaluating the robustness of the process.

Figure 26:
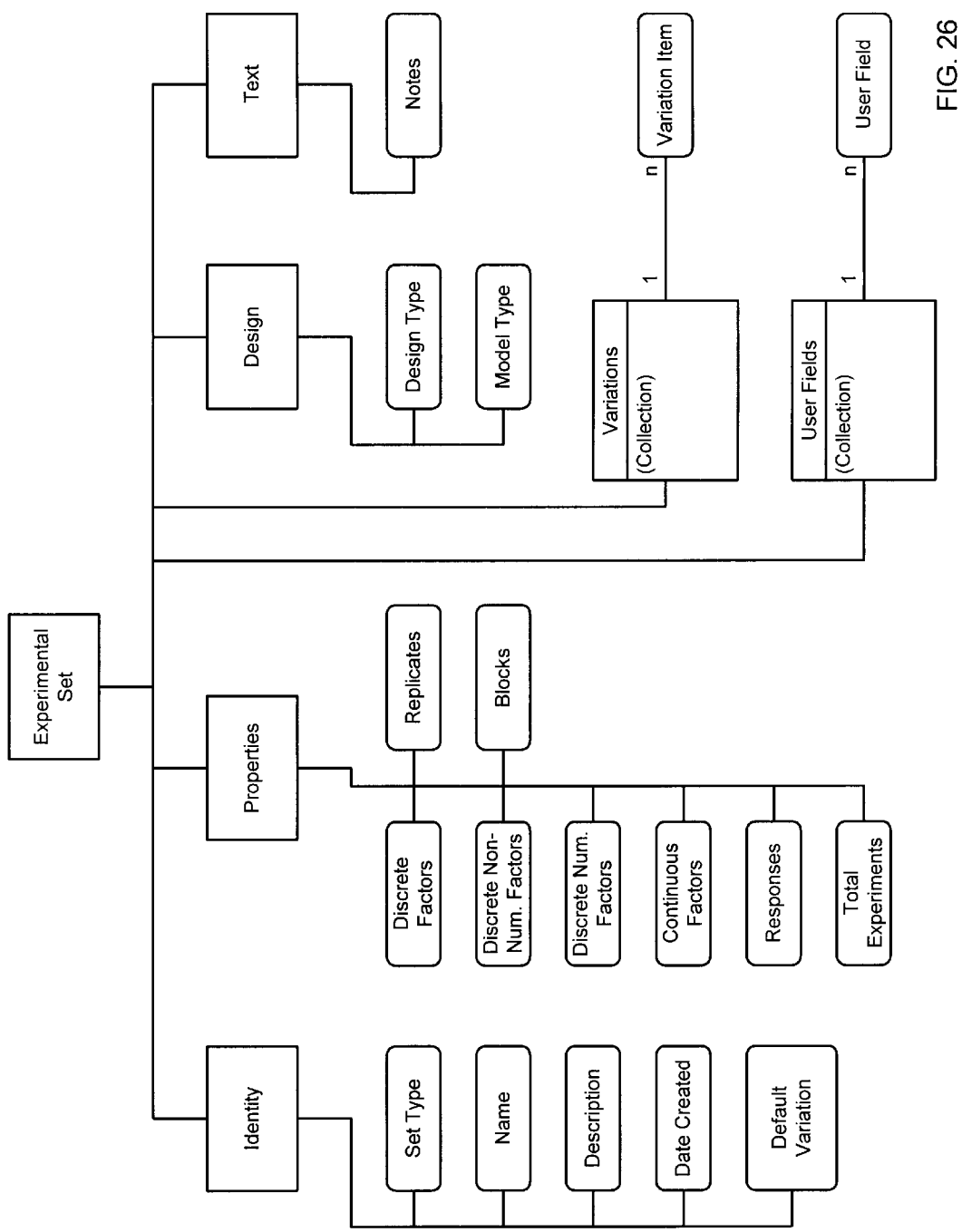
FIG. 26 is a class diagram of the Experimental Set class illustrated in FIG. 5.
Figure 27:
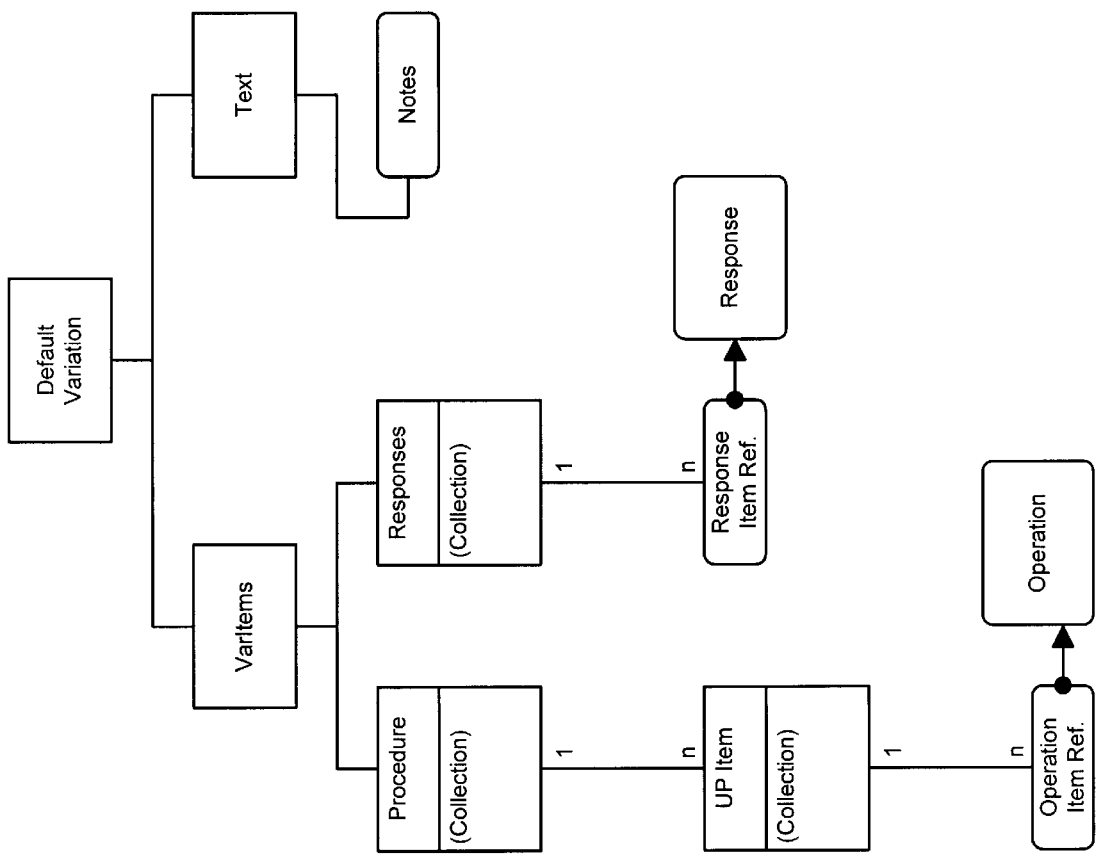
FIG. 27 is a class diagram of the Default Variation class illustrated in FIG. 26

FIG. 26 illustrates the class diagram for the Experimental Set class and related classes. FIG. 26 shows that the Experimental Set class contains an Identity subclass which identifies the experimental set and relates it to a Default Variation class. The default variation consists of all the experimental setting for the chemical process as defined in the default case in the CPD Document. FIG. 27 illustrates the Default Variation class diagram and shows that it contains variation items, which consists of the Procedure class, a collection, and the Responses class, a collection. The Procedure class is related to the default case in the CPD Document by a pointer to an instance of the Operation class. Similarly, the Responses class is related to the base case in the CPD Document by a pointer to an instance of the Response class.

FIG. 26 further shows that the Experimental Set class is defined by a Properties class that delineates the number of discrete factors (variables that can only be set to discrete values), the number of discrete non-numeric factors (category variable items that assume discrete non-numeric values like solvent A and solvent B), the number of discrete numeric factors (category variable items that assume discrete numeric values like 10 cent and 25 cent coins), the number of continuous factors (variables that can assume any numeric quantity like volume of liquid or mass of reactant), the number of responses, the number of replicates in the set, and the number of blocks in the set (groups of experiments run together as a single subset). These properties form the basis for defining a statistical experimental design that has been applied to the experimental set. FIG. 26 also shows that the Experimental Set class contains information on the experimental design used to create the settings for the experimental set. Experimental design types can include, for example, user-defined ad hoc designs, Plackelt-Burman designs, 2-level factorial designs, 3-level factorial designs, mixed 2- and 3-level factorial designs, fractional factorial designs (resolution III, IV, or V), orthogonal array designs, D-optimal designs, central composite face-centered designs, central composite circumscribed designs, and Box Benhken designs.

Figure 28:
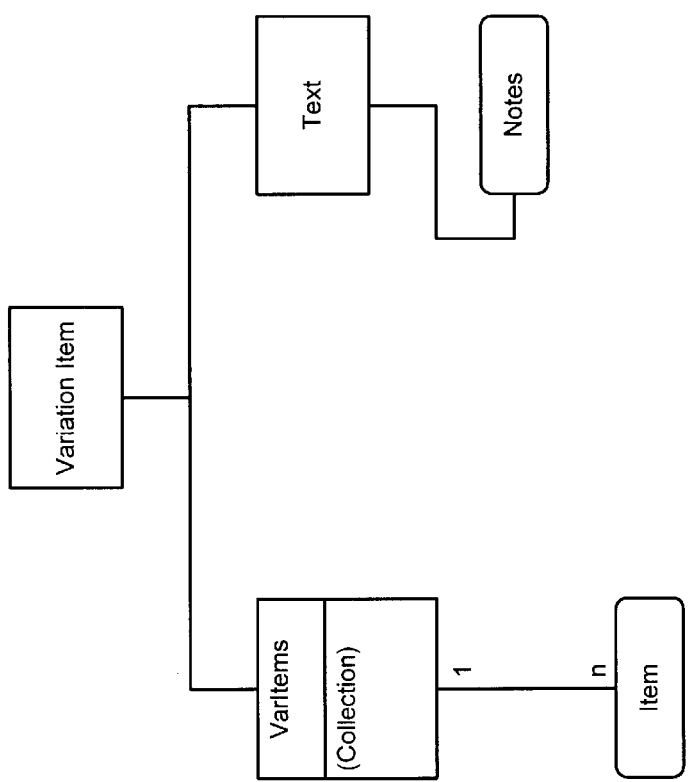
FIG. 28 is a class diagram of the Variation Item class illustrated in FIG. 26

FIG. 26 further shows that the Experimental Set class is defined by the subclass Variation, which consists of a collection of Variation Items. FIG. 28 illustrates the class diagram for Variation Items. The class diagrams shown in FIG. 26 and FIG. 28 illustrates how the object oriented framework can be extended by the program developer. By defining a Text class as a child of the Experimental Set class and defining a Text class as a child of the Variation Item class, the framework provides a means for the user to maintain a free-text description of the entire experimental set in addition to maintaining free-text descriptions of the individual experiments within the experimental set.

Chemical Process Recording, Characterization and Reporting Category Diagrams

As noted above, the inventors of the present framework have identified a set of OOP classes most likely to be desired by developers of chemical-process-development decision-support applications and have defined the relationship between such classes. Those skilled in the art will recognize that such classes can be overridden by users of the framework in that framework users who are developing applications can incorporate extensions and additional object to suit the purposes of the user. In this way, the framework categories provide a base of information from which extensions can be developed by program developers.

The categories of Chemical Process Recording, Chemical Process Characterization and Chemical Process Reporting mechanisms of the framework will be referred to with a preceding "CPR", "CPC" and "CPE", respectively, unless not required by the context in which the category is being described.

Figure 29:
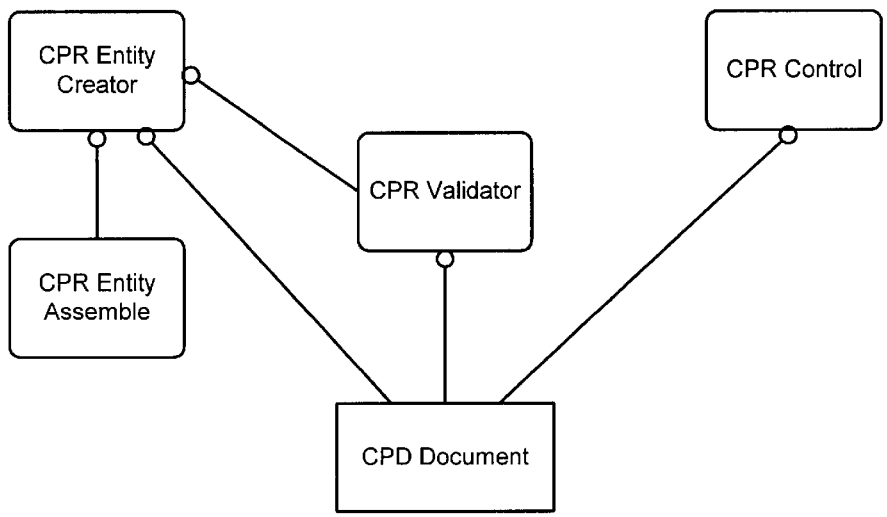
FIG. 29 is a category diagram representation of Reporting categories.
Figure 34:
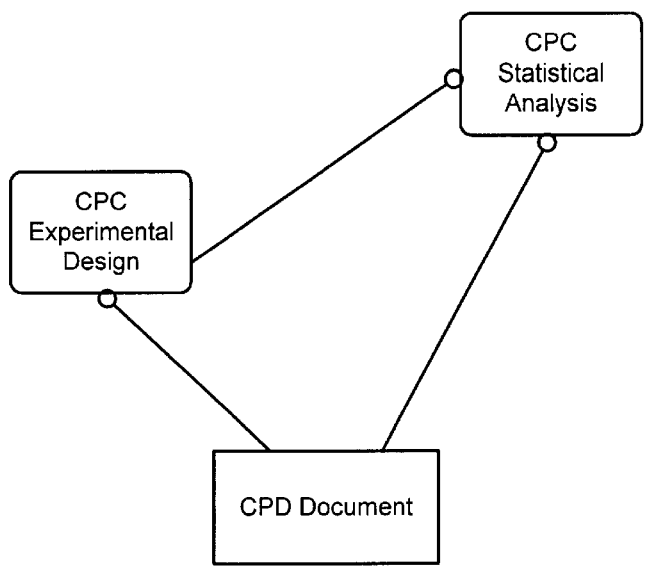
FIG. 34 is a category diagram representation of Characterization categories.
Figure 37:
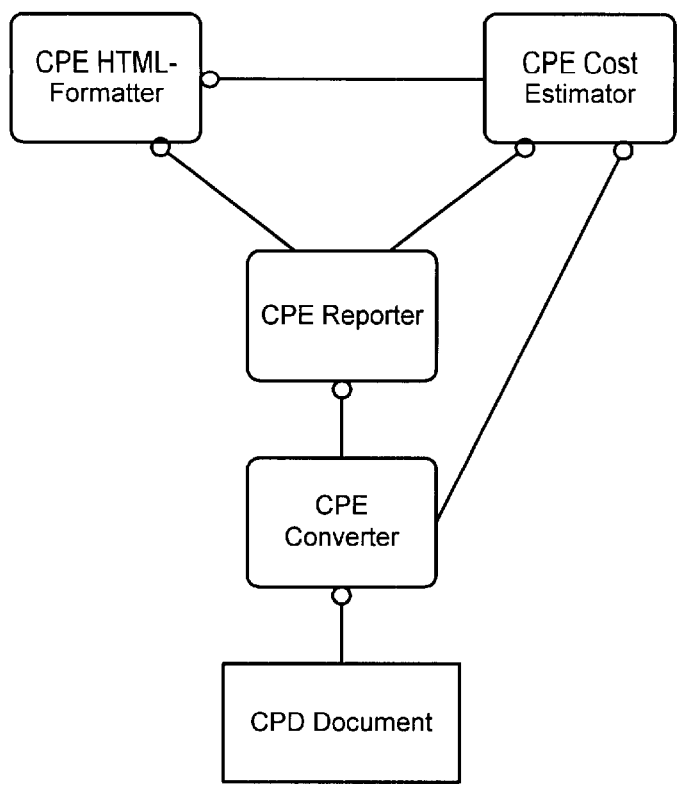
FIG. 37 is a category diagram representation of Reporting categories.

FIG. 29, FIG. 34 and FIG. 37 are category diagram representation of the categories that comprise the Chemical Process Recording, Chemical Process Characterization and Chemical Process Reporting mechanisms, respectively. Those skilled in the art will recognize the categories illustrated in FIG. 29, FIG. 34 and FIG. 37 correspond to OOP classes that encapsulate data attributes and behavior, and are stored in the memory of the computer system illustrated in FIG. 2. Such objects can be implemented, for example, in a computer system operating environment that supports the C++, Java, or Visual Basic languages.

The Chemical Process Recording mechanism illustrated in FIG. 29 includes a CPR Entity Creation class that contains attributes and methods for creating the entities contained in the CPD Document class. The CPR Entity Creator class makes use of the CPR Entity Assemble class, which provides listings of entities available for inclusion into the CPD Document class. The CPR Entity Creator class also makes use of the CPR Validator class, which determines whether the attributes of the CPD Document class conform to rules contained in the CPR Validator class (e.g., internal chemical logic rules or rules specified in a Document Type Definition (DTD)). The Chemical Process Recording mechanism illustrated in FIG. 29 also contains a CPR Control class, which provides attributes and methods for maintaining an instance of the CPD Document under document control.

The Chemical Process Characterization mechanism illustrated in FIG. 34 includes a CPC Statistical Analysis class that contains attributes and methods for performing a range of statistical analyses on an instance of the CPD Document class. The CPC Statistical Analysis class makes use of the CPC Experimental Design class, which provides attributes and methods for creating experimental designs for identifying the factors that are major determinants in the outcome of the chemical process, for optimizing the chemical process, and for identifying conditions that lead to a robust chemical process.

The Chemical Process Reporting mechanism illustrated in FIG. 37 includes a CPE Reporter class that contains attributes and methods for creating report objects used to generate reports, analyses, and data objects used by other objects or devices. The CPE Reporter class makes use of a CPE Converter class, which manages the translation and conversions of various units of, for example, mass, volume, temperature, time, moles, equivalents, concentration and loading, used in defining chemical processes. The CPE Reporter class is used by the CPE HTML Formater class to create reports in the HTML format, which can be rendered by any standard browser object. The Chemical Process Reporting mechanism illustrated in FIG. 37 further includes a CPE Cost Estimator class, which contains attributes and methods useful in creating cost estimates of chemical processes.

It should be understood the CPE Reporter class contains attributes and methods for creating report objects that can be passed to objects other than those for creating reports or analyses. That is, the report object can be passed to any object that acts as a consumer of the information contained in the report object. For example, a report object can be passed to one or more objects that are involved in directing the operation of any device controlled by the computer (206) illustrated in FIG. 2. Examples of such devices controlled by a computer include, but are not limited to, automated synthesizers, analytical instruments, automated titrators, reaction calorimeters, robotic liquid dispensers, chemical-process-development workstations, and computer operated chemical reactors.

Chemical Process Recording Class Diagrams

The section below describes the Chemical Process Recording categories illustrated in FIG. 29. The description will use the convention that category names are comprised of descriptive names that start with an initial capital letter.

CPR Entity Creator Category

Figure 30:
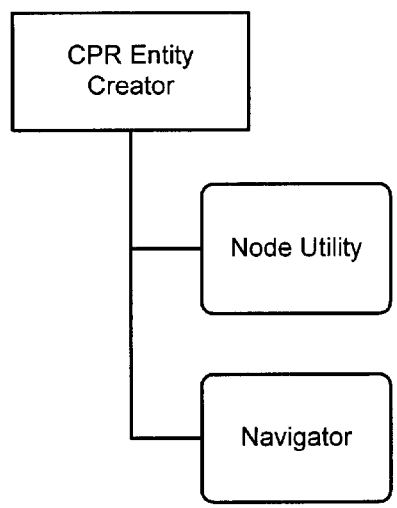
FIG. 30 is a class diagram of the CPR Entity category illustrated in FIG. 29 that contains attributes and methods for navigating and creating nodes in the CPD Document.

FIG. 30 is a class diagram that illustrates the characteristics of the category called CPR Entity Creator. This class provides attributes and methods to create instances of the subclasses specified in the CPD Document class. For example, the CPR Entity Creator entity can create an instance of the Molecule class—that is, a Molecule entity with all the specified children classes, their attributes and default values. As indicated previously, the preferred embodiment of the present invention employs the XML language to implement CPD Document class as XML nodes. The CPR Entity Creator makes use of two subclasses to assist in this task. The Node Utility class defines the nodes to be created. The Navigator class provides attributes and methods for navigating the XML tree and setting the values of the XML nodes.

CPR Control Category

Figure 31:
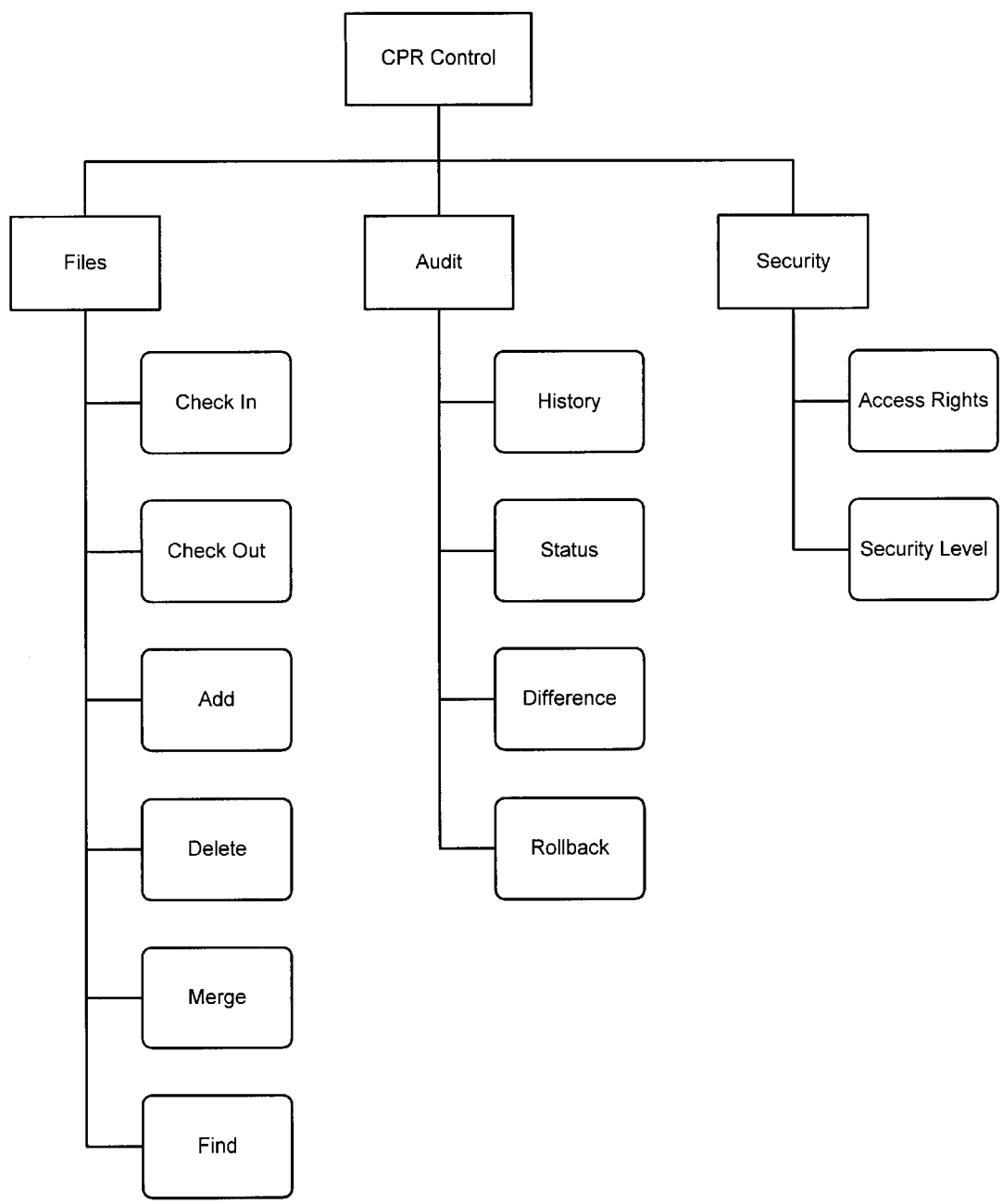
FIG. 31 is a class diagram of the CPR Control category illustrated in FIG. 29 that contains attributes and methods for managing and auditing files under document control.

FIG. 31 is a class diagram that illustrates the characteristics of the category called CPR Control. This class provides attributes and methods that contain document control policies and provide services for maintaining persistent instances of the CPD Document under document control in a document control repository. The CPR Control class shows three classes: Files, Audit and Security.

The Files class provides attributes and methods for managing files which include, for example, checking-in a file, checking-out a file, adding a file, deleting a file, merging two or more files that contain changes, and finding a file in the document control repository.

The Audit class provides attributes and methods for maintaining an audit trail on the events and actions that led to changes in the composition of the CPD Document. The Audit class contains four subclasses. The History subclass provides attributes and methods for recording the changes to the CPD Document since it was added to the repository. This History subclass provides for methods that allow the user to return to any prior version of the CPD Document. The Status subclass provides attributes and methods for reporting the current status of the CPD Document including the user that has checked-it-out and the version number. The Difference subclass provides attributes and methods for defining the differences between any two versions of the CPD Document that have been maintained by the History class. And the Rollback subclass provides attributes and methods for returning the CPD Document to any prior version state defined by the History subclass.

FIG. 31 further shows that the CPR Control category contains a Security class. This class contains two subclasses. An Access Rights class which defines the level of permission that a user is granted to access the CPD Document repository. And a Security Level class which defines the attributes of prescribed levels of security that can be assigned to a user.

CPR Validator Category

Figure 32:
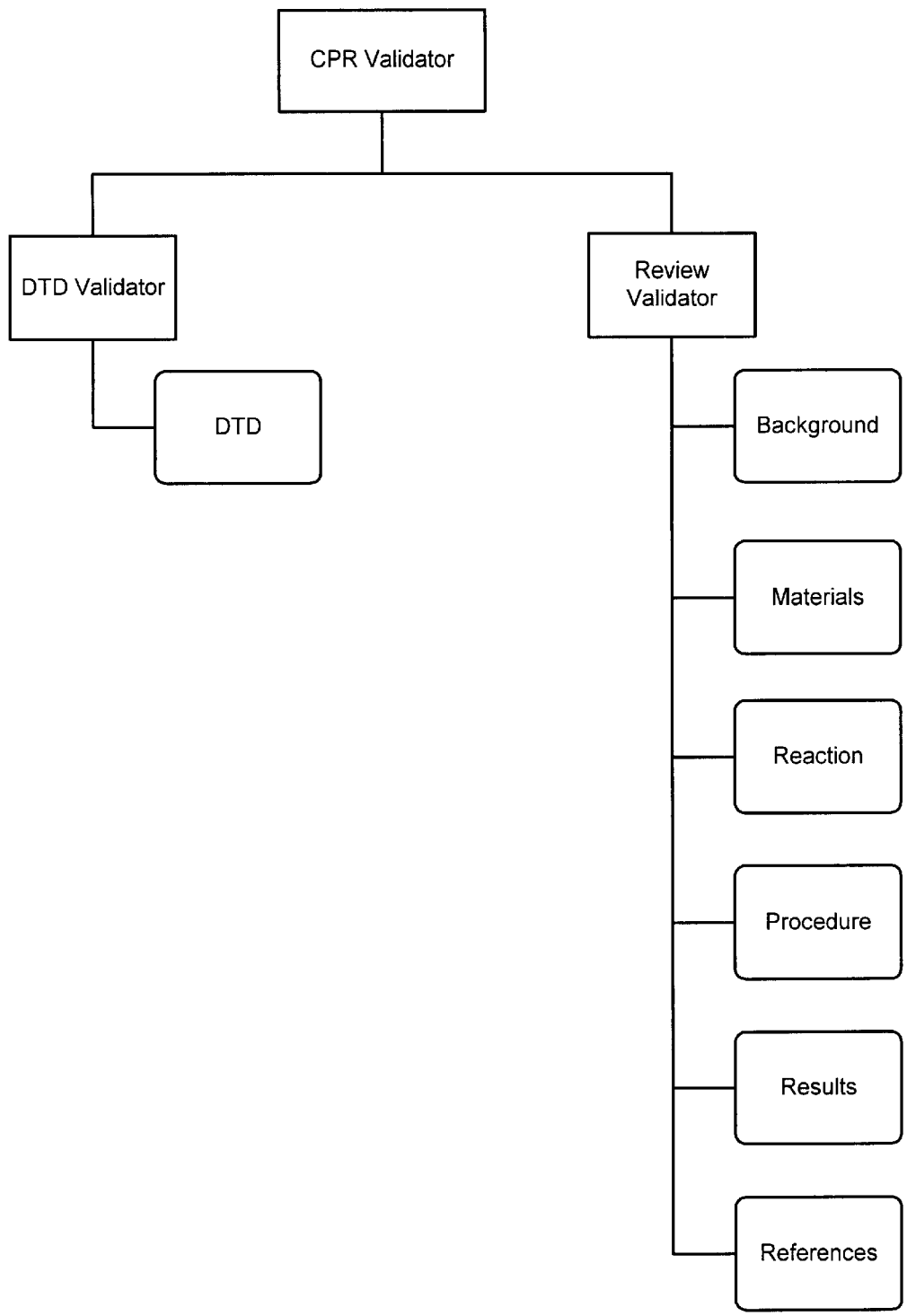
FIG. 32 is a class diagram of the CPR Validation category illustrated in FIG. 29 that contains attributes and methods for validating the CPD document on the basis of a DTD and a set of review rules and policies.

FIG. 32 shows a class diagram for the CPR Validator category. This category consists of two classes, a DTD Validator class and a Review Validator class. The DTD Validator class contains attributes and methods for validating an instance of the CPD Document against a Document Type Definition (DTD). Those skilled in the art will recognize that there exist standard methods for creating a DTD and that such a DTD provides a way to specify the structure of an XML-based document.

FIG. 32 further shows that the CPR Validator category contains a Review Validator class. This class provides attributes and methods for validating the values of nodes in a CPD Document instance. The class provides methods for testing the values of individual nodes in the CPD Document instant and determining whether that fall within an acceptable range. The Review Validator class provides this methods for testing a range of nodes including those created from Background, Materials, Reaction, Procedure, Results and Reference classes.

CPR Entity Assemble Category

Figure 33:
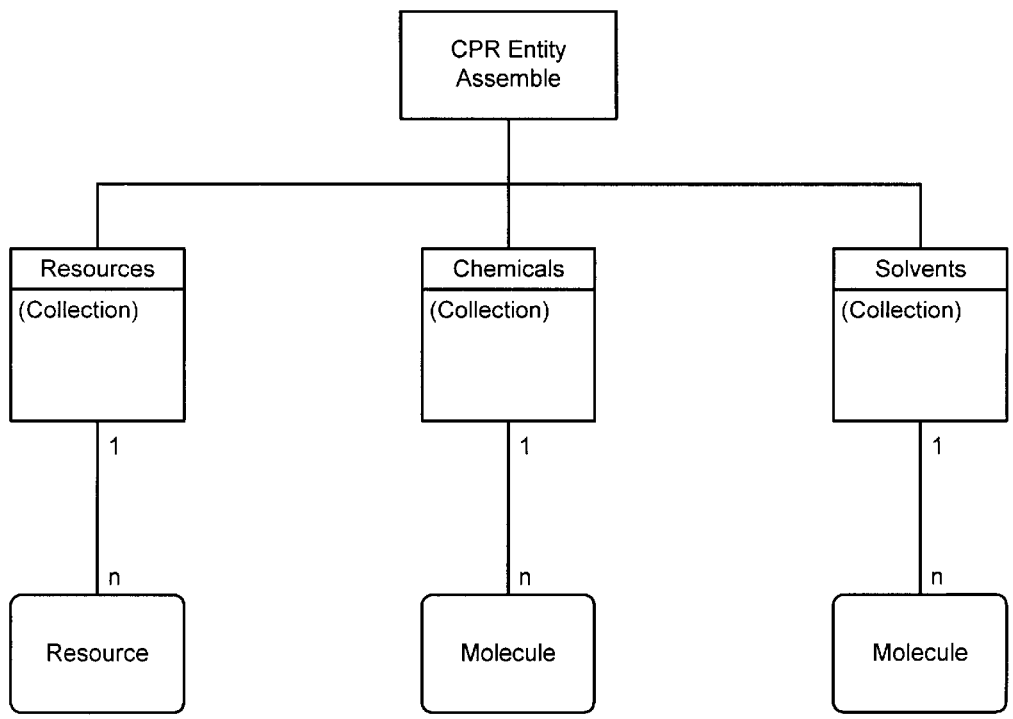
FIG. 33 is a class diagram of the CPR Entity Assemble category illustrated in FIG. 29 that contains attributes and methods for gathering resources, chemical and solvents with their accompanying information.

FIG. 33 shows a class diagram for the CPR Entity Assemble category. This category consists of three classes, a Resources class, a Chemicals class and a Solvents class. These classes provide attributes and methods for requesting, retrieving and passing information on available entity data objects from data sources on a client or server machine.

Chemical Process Characterization Class Diagrams

The section below describes the Chemical Process Characterization categories illustrated in FIG. 34.

CPC Experimental Design Category

Figure 35:
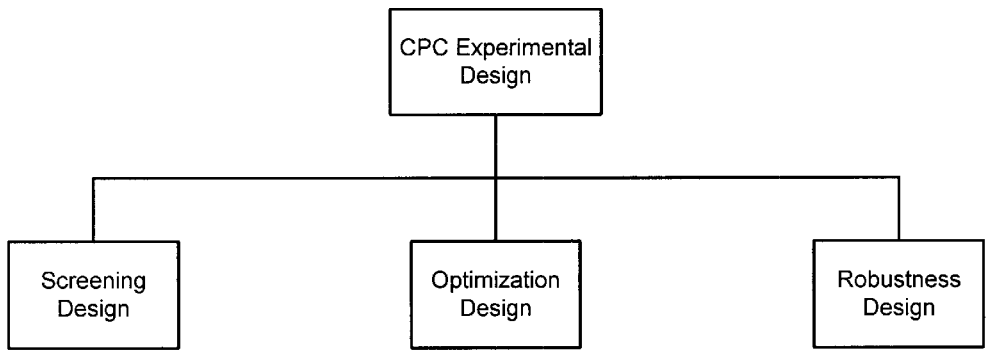
FIG. 35 is a class diagram of the CPC Experimental Design category illustrated in FIG. 34 that contains attributes and methods for creating screening designs, optimization designs and robustness designs.

FIG. 35 shows a class diagram for the CPC Experimental Design category. This category contains classes for creating experimental designs which are useful for characterizing and optimizing chemical processes. FIG. 35 shows a Screening Design class, which contains attributes and methods for creating a designed set of experiments directed at assessing the importance of various factors in a chemical process. Such screening designs allow the user to identify factors that are significant effector of the outcome of the process (for example, the yield of product) and that will be subject of optimization studies. The Screening Design class contains a range of methods for creating a screening design including classic screening designs (Plackett-Burman designs, 2-level factorial designs, mixed 2- and 3-level factorial designs, fractional factorial designs (resolution III, IV, or V) and orthogonal array designs, for example) and computer generated designs (e.g., D-optimal).

FIG. 35 further shows an Optimization Design class. This class contains attributes and methods for creating a designed set of experiments directed at finding the settings of the chemical process that produce the optimal outcome. Those skilled in the art will recognize that the Optimization Design class can provide a range of methods for creating an optimization design including classic experimental design methods (e.g., 3-level factorial designs, central composite face-centered designs, central composite circumscribed designs, Box Benhken designs) and computer generated designs (e.g., D-optimal, G-optimal, A-optimal).

FIG. 35 also shows a Robustness Design class. This class contains attributes and methods for creating a designed set of experiments directed at finding the settings of a chemical process that produce the least variation in the outcome. Robustness designs are important tools in improving the quality of a chemical process—that is, identifying the setting that consistently produce a product of desired quality.

CPC Statistical Analysis Category

Figure 36:
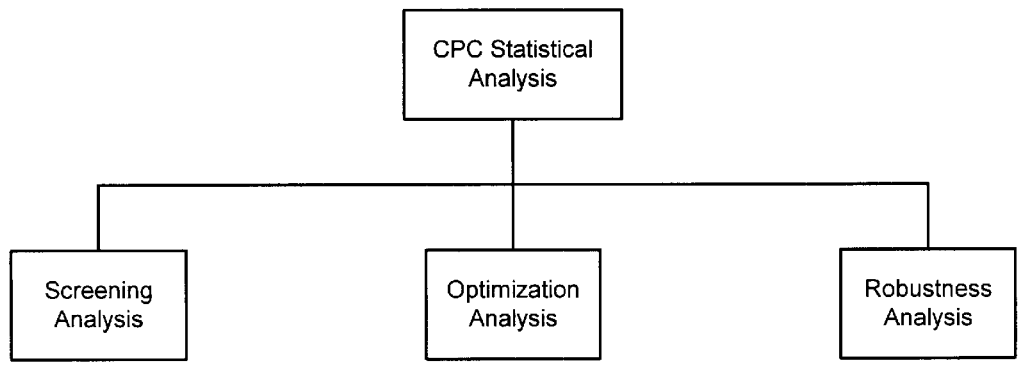
FIG. 36 is a class diagram of the CPC Statistical Analysis category illustrated in FIG. 34 that contains attributes and methods for performing screening, optimization and robustness analyses.

FIG. 36 shows a class diagram for the CPC Statistical Analysis category. This category contains classes for performing a statistics-based analysis on the results of a designed set of experiments. FIG. 36 shows a Screening Analysis class which contains methods for analyzing the results of a screening design using a variety of statistical methods to identify factors that are significant effectors on the process outcome. FIG. 36 further shows an Optimization Analysis class which contains numerical methods for fitting the results of an optimization design to a mathematical process model that can predict the behavior of the chemical process. This class also can contain methods for performing a further analysis on the resulting mathematical process model to obtain the combination of settings that result in the optimum performance of the chemical process. FIG. 36 also shows a Robustness Analysis class which contains numerical methods for analyzing the results of a robustness design set of experiments and determining the setting that result in the smallest variance of the performance of the chemical process.

Chemical Process Reporting Class Diagrams

The section below describes the Chemical Process Reporting categories illustrated in FIG. 37.

CPE HTML Formatter Category

Figure 38:
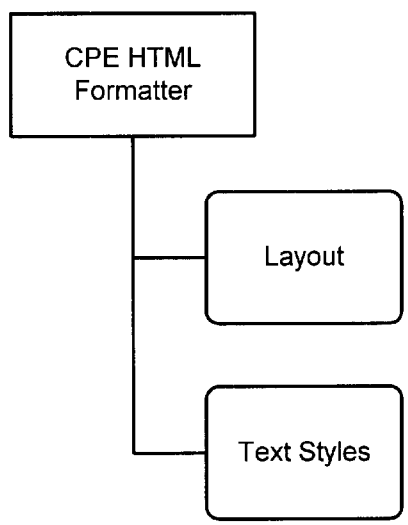
FIG. 38 is a class diagram of the CPE HTML Formatter category illustrated in FIG. 37 that contains attributes and methods for laying out report objects and applying text styles.

FIG. 38 shows a class diagram for the CPE HTML Formatter category. This category contains classes for transforming a Reporter object, described below, to Hypertext Markup Language, and applying a layout and a text style. This category of objects interfaces with the Generic Business Objects illustrated in FIG. 2 through a Browser objects which renders the HTML on the screen for the user.

CPE Cost Estimator Category

Figure 39:
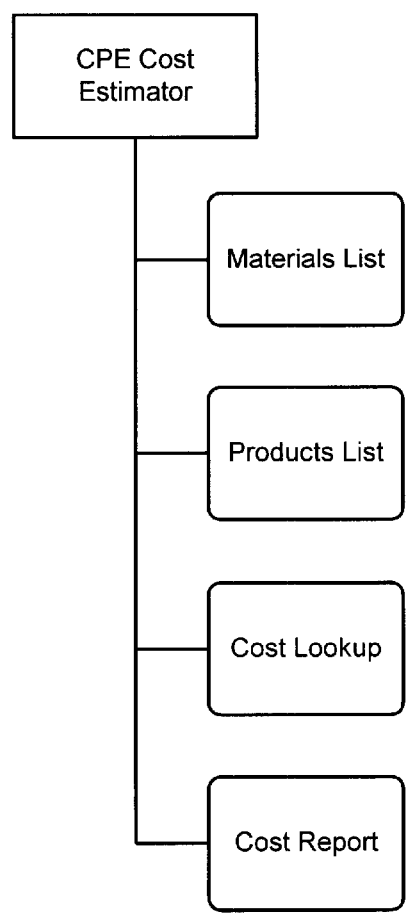
FIG. 39 is a class diagram of the CPE Cost Estimator category illustrated in FIG. 37 that contains attributes and methods for creating a materials list, a products list, a cost lookup, and a cost report.

FIG. 39 shows a class diagram for the CPE Cost Estimator category. This category contains classes useful in creating an estimate of the material cost of a chemical process defined in an instance of a CPD Document object. Classes useful for estimating the material cost include a Materials List and Products List classes, which extracts a list of material and products, respectively, and the corresponding amounts from an instance of a CPD Document object. FIG. 39 further shows a Cost Lookup class, which employs the Material List object to create a query on an external object that contains information on material costs. Such an external object could be a file on the local machine, a file on a server machine, a database on the local machine, or a database on a server machine. FIG. 39 additionally shows a Cost Report class, which contains attributes and methods for creating a cost analysis and returning a report. The Cost Report class has methods to query the CPD Document object to obtain information about the stoichiometry in the reaction as well as query the Cost Lookup Class to obtain corresponding cost information.

CPE Converter Category

Figure 40:
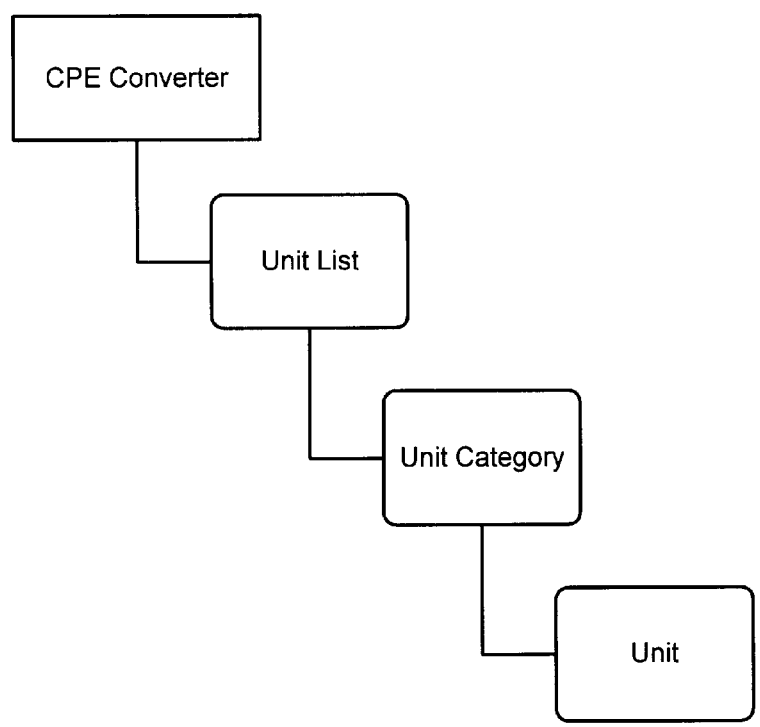
FIG. 40 is a class diagram of the CPE Converter category illustrated in FIG. 37 that contains attributes and methods for converting among mass, volume, temperature, moles, equivalents, concentration and loading units.

FIG. 40 shows a class diagram for the CPE Converter category. This category consists of the Unit List Class, which contains the attributes of volume, mass, length, temperature, time, equivalents, moles, concentration and loading properties as used in the defining chemical process. The Unit List class further contains methods that provide interconversion among members of the same type (e.g., pounds to kilograms).

CPE Reporter Category

Figure 41:
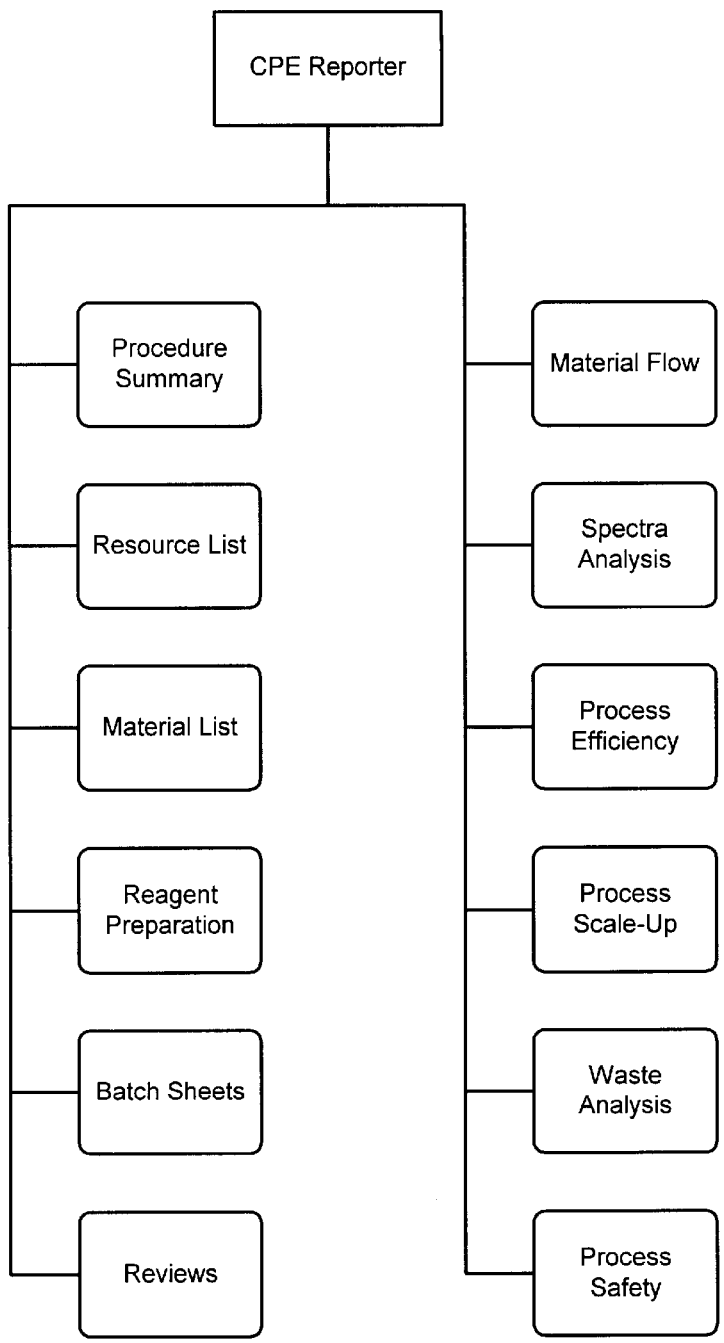
FIG. 41 is a class diagram of the CPE Reporter category illustrated in FIG. 37 that contains attributes and methods for creating key analyses and accompanying reports.

FIG. 41 shows a class diagram for the CPE Reporter category. This category contains classes that contain attributes and methods for performing tasks that are commonly associated with chemical development. Classes that meet these requirements include the following:

Process Summary class contains attributes and methods for creating a summary of the process in textual form as would be found in a research report or scientific journal.

Resource List class contains attributes and methods to create a list of the resources used in a chemical process and their associated properties. May additionally contain methods for obtaining the availability of the resource in conjunction with a resource scheduling object.

Materials List class contains attributes and methods to create a materials list needed to carry out the chemical process Reagent Preparation class contains attributes and methods to create a list of reagents needed to carry out the chemical process and a set of directions on how to prepare the reagents. For example, this class would provide methods for calculating the amount of a solution needed and the amount of solute that would need to be added to a given amount of solvent to produce a solution of the requisite concentration.

Batch Sheets class contains attributes and methods to create an experimental procedure batch sheets that details the exact series of steps that an operator would need to perform to carry out the chemical process specified in the CPD Document. Those skilled in the art will recognize that the use of Batch Sheets represent an industry standard practice for communicating to an operator how to carry our a chemical process.

Review class consists of subclasses containing policies, guidelines and heuristics that support custom analyses and audits on the content of a CPD Document instance. The analyses can include an assessment, for example, whether requisite information is missing from the CPD Document instance or whether values of attributes contained in the CPD Document instance are outside of the normal or expected range.

Material Flow class contains classes for analyzing chemical material flow in the chemical process specified by the CPD Document instance. The analysis can include the creation of a material-flow block diagram that provides a graphical view of the inputs, outputs and transfers in the chemical process.

Spectra Analysis class contains classes for analyzing, comparing, and visualizing characterization spectra encapsulated in an instance of the CPD Document.

Process Efficiency Analysis class consists of classes containing policies, guidelines and heuristics that support an analysis of the efficiency of the chemical process contained in the CPD Document instance. The analysis can provide, for example, performance metrics that include throughput (mass of product per unit time), equipment utilization (mass of product per unit volume per unit time) and process effectiveness (mass of product per unit volume of equipment).

Process Scale-up class contains attributes and methods for managing the scale-up of a chemical process defined in an instance of the CPD Document. Methods can include resizing of material requirements and matching new scale to appropriate resources (e.g., reactors and processing equipment).

Waste Analysis consists of classes containing policies, guidelines and heuristics for evaluating the chemical process defined in an instance of the CPD Document in terms of the waste products that are produced during the course of operating the chemical process. Waste analysis can include an analysis of the production of burnable organic wastes, hazardous waste, high biological oxygen demand (BOD) aqueous wastes, inorganic waste, organic waste, and volatile organic wastes. Waste Analysis classes can further interact with other objectes that contain information on local regulations with regards to waste management. Thus, Waste Analysis classes can provide the basis for creating application programs that analyze a chemical process in terms of waste production within the context of waste management regulations in the locale where the user intends to operate the chemical process.

Process Safety consists of classes containing attributes, methods, policies, guidelines and heuristics for evaluating safety issues associated with the operation of the chemical process defined in an instance of the CPD Document.

Implementation of the Extended Framework

Now that the classes of the framework have been defined and the attributes and methods have been briefly presented above, we now proceed to describe how the framework may be used to implement some selected chemical-process-development decision-support applications. In a typical implementation, the framework user/application developer will utilize the class and methods definitions, as described above, with appropriate extensions and overrides, to produce a desired application program. Those skilled in the art will recognize that, as is the case with object-oriented programming principles, details of the implementation of the extended framework will depend on the particular extensions implemented by the framework user. Nevertheless, a representative implementation of the framework can be described in terms of the classes and methods defined by the present invention. We will describe the processing tasks performed by classes of the extended system in a procedural, step-wise fashion. The following description, therefore, should be understood to apply to the operating steps performed by the extended framework. Those skilled in the art, however, will understand that the flow of processing is not necessarily sequential through the flow diagram boxes, as objects will perform in accordance with their attributes and methods.

The framework classes define the physical and logical elements required to define, characterize, optimize, analyze and operate a chemical process—that is, the physical and logical elements that are the subject of chemical process development. In the preferred embodiment, the Chemical Process Definition mechanism defines the chemical reaction which is the subject of the chemical development activity. The Chemical Process Recording mechanism supports the creation, validation and management of the CPD Document that defines the chemical process which is the subject of chemical development activity. The Chemical Process Characterization mechanism supports the characterization and optimization of the chemical process. And the Chemical Process Reporting mechanism supports the analysis, operation, execution and reporting of the chemical process which is the subject of the chemical development activity.

Operation of CPD Composer

Figure 42:
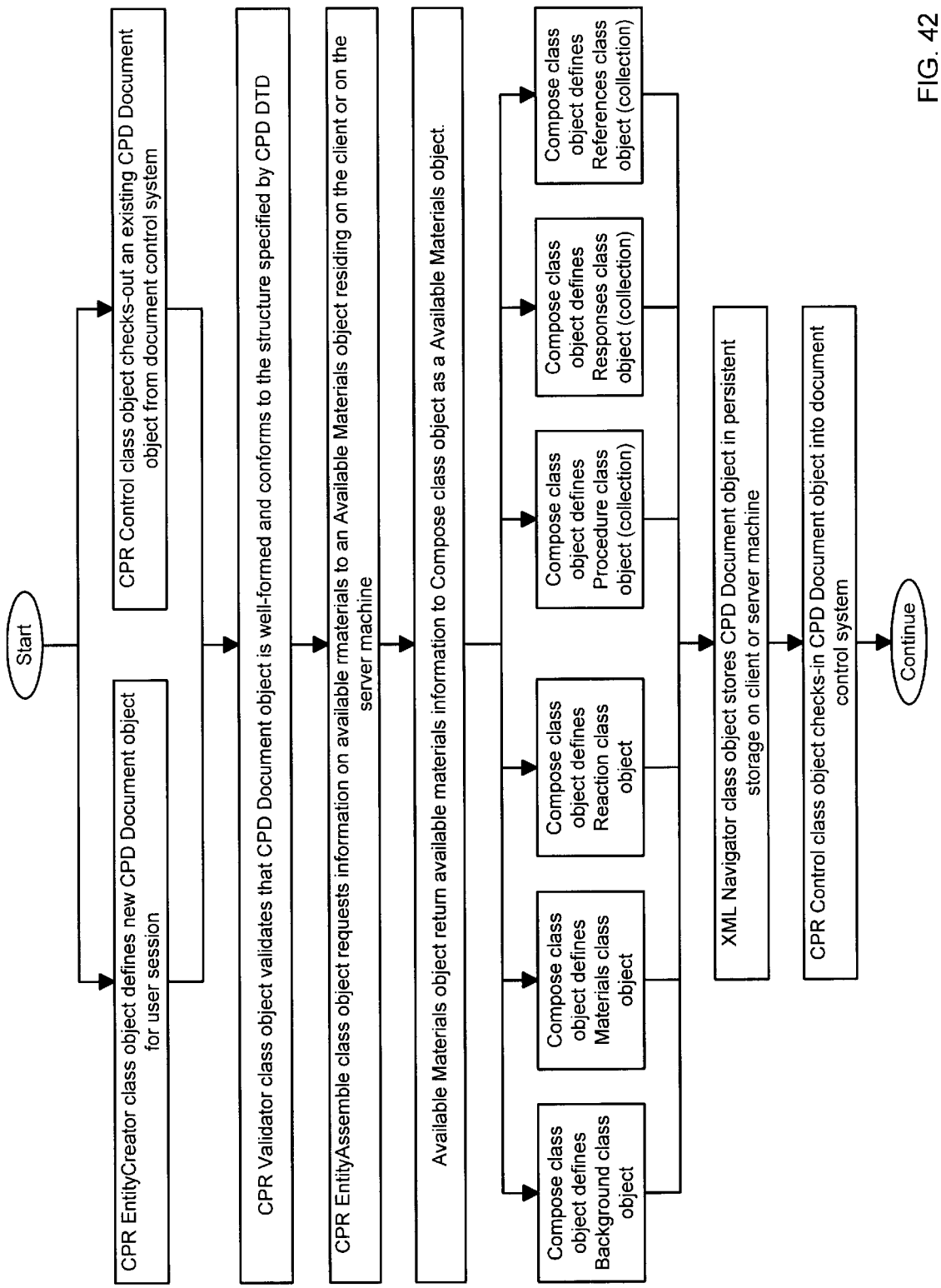
FIG. 42 is a flow diagram representation of the processing carried out by Composer, an example application that implements the framework of the present invention.

The application to be generated from the framework is intended to allow the user to create a valid CPD Document for use in chemical development activities and to maintain the CPD Document under document control. For the purposes of this illustration, we will call this application program Composer. Composer is constructed from classes of objects and in itself is an object. Composer oversees the creation of an instance of the CPD Document object, allows the user to input information, populates the CPD Document with the appropriate data, and places the CPD Document in persistent storage under document control. This sequence of processing is illustrated in FIG. 42. It is important to note that Composer might not directly carry out the actions specified in FIG. 42, but Composer will be responsible for initiating such actions and, for the purposes of description, will be characterized as carrying out or performing such actions.

The application-program user, the "User", will communicate their intent to begin a Composer session through the user interface, which can be crafted by the application program developer. The User can initiate a Composer session through the user interface. As shown in FIG. 42, the User can begin a session in one of at least two ways. In the first way, the user creates a new "file"—that is, creates a new instance of the CPD Document object. Composer implements the CPR Entity Creator class object to create the new instance. And in the second way, the user can check-out the most recent version of an existing "file" from the document management repository—that is, opens an existing version of the CPD Document from persistent storage to make modifications. Composer implements the CPR Control class object, which calls the CheckOut class. This class contains a method with a Release parameter that specifies the version number that is required (most recent). Next, the object calls the Get( ) method to get the file, which invokes the Lock( ) method. The Lock( ) method checks to see if the specified version of the document is locked because it is in use by another User. If the version is already locked, it informs the user through the user interface. If the version is not locked, the Lock( ) method locks the LockState object to indicate that this version is locked and cannot be changed until it is checked back in.

Composer next instantiates the CPD Document object using a method from the XML Navigator object class. In the preferred embodiment of the present invention, the CPD Document is implemented as an XML object class. Accordingly, CPD Document object instantiation consists of the CPD Document object creating an instance of the XML Navigator object, which in turn creates an instance of the XML Document Object Model though the XML parser. These actions result in the creation of a tree on nodes in memory whose structure can be specified by a CPD Document Type Definition (DTD) and whose values are specified by the contents of an existing the CPD Document object (if available).

The User next needs to assemble a list of available resources and materials with their accompanying attributes that are required to define the chemical process. A preferred approach is to gather this information from a data source which typically consists of a relational or object database located on the client or a server machine. Towards this end, Composer invokes the CPR Entity Assemble class object which takes a query initiated by the User through the user interface and returns a list of available resources and materials with their accompanying attributes (Available Materials object). In the preferred embodiment of the present invention, this the Materials object is returned as an XML string, which can be instantiated on the client machine into a tree of nodes and navigated using the methods described above. The CPR Entity assemble class of objects contains methods to access the requisite nodes in the Materials object and pass the nodes to the object classes further described below.

The User next initiates the construction of the CPD Document through the user interface. FIG. 42 next shows that the User can initiate construction through any of six class objects that are linked to the corresponding section of the user interface. Because of the independence of the objects the user can start with any object class, move to a different class, and return to the starting point at a later time without deleteriously affecting the creation of the CPD Document. For the purpose of illustration, we will now describe the creation of an instance of the Material object for inclusion into the CPD Document. The other five classes operate in a similar manner. The user will select the Materials section of the user interface. Selection will initiate an instantiation of the Materials class object. The user will select items on the user interface that correspond to members of the Available Materials object described previously. In the preferred embodiment of the present invention, selection, preferably through a drag-and-drop operation, initiates the transfer of, for example, a Molecule object from the Available Materials to Materials on the user interface. At the object level, this action results in copying the Molecule object from the Available Materials object to the Materials object contained within the CPD Document. The use of the framework of the present invention allows application program developers to exchange messages and information between software and data objects with equal ease.

Once the user has completed inputting the Background, Materials, Reaction, Procedure, Responses and References information via the user interface, the information is passed to the corresponding objects. The user then initiates storing the CPD Document object into persistent storage. This is accomplished by accessing the XML Navigator object, described previously, and invoking the SaveCPDDocument( ) method.

The final step initiated by the User involves checking-in the CPD Document into the document control system. The CheckIn object in the CPR Control class is called; the version number is updated; the Unlock( ) method unlocks the LockState; and the CPD Document is moved from the client machine into the document control system.

Operation of the CPD Reporter Category

Figure 43:
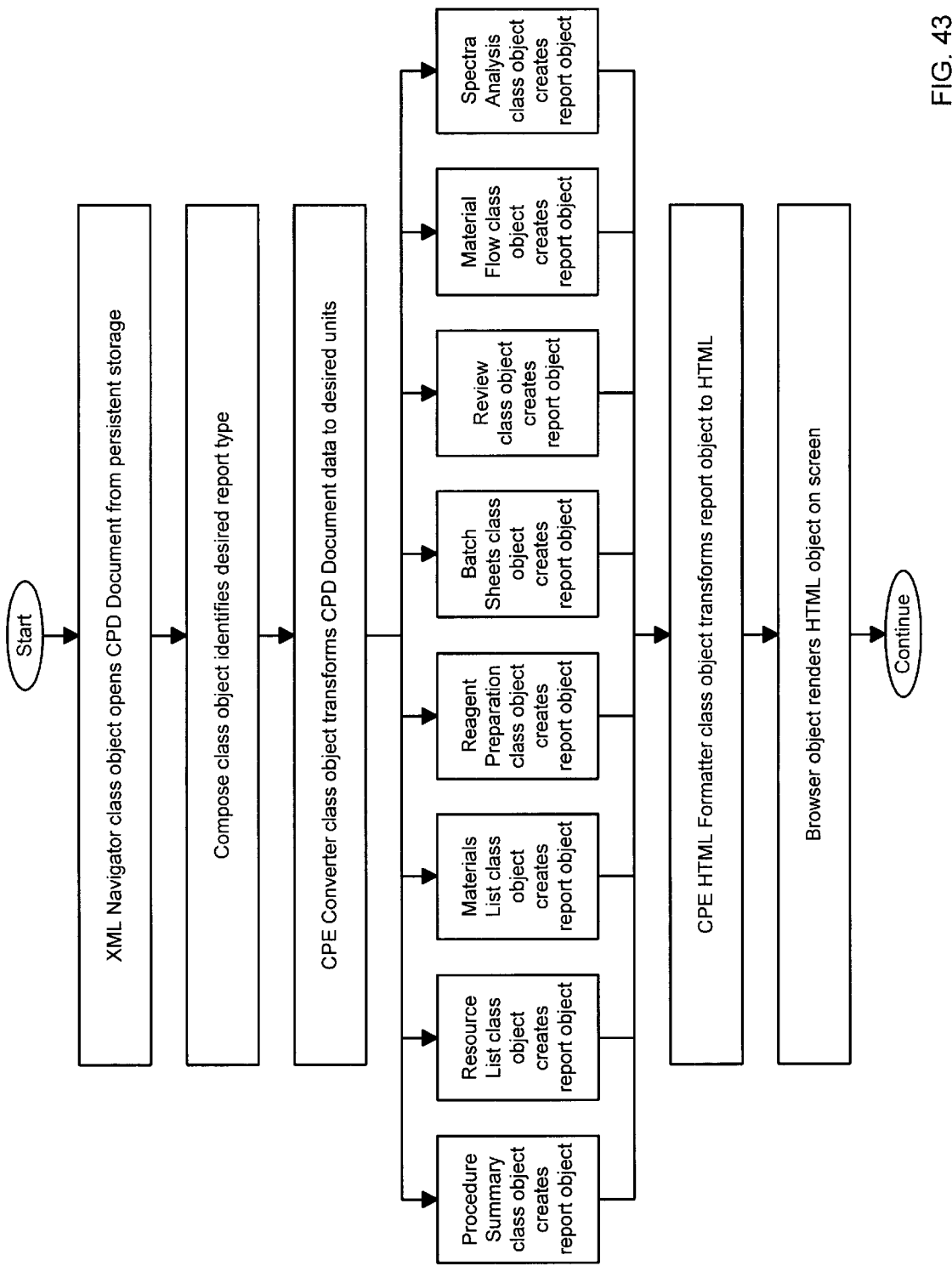
FIG. 43 is a flow diagram representation of the processing carried out by Composer using the CPR Reporter category illustrated in FIG. 41.

Once the User has created a valid and complete CPD Document, the User can make use of the CPD Document to automatically create one of a number of reports or analyses which support the typical chemical-process-development activities. Automatic preparation of reports and analyses are supported by the CPD Reporter Category of objects, illustrated previously in category diagram in FIG. 37. A representative implementation and operation of this category of objects in the Composer example application is illustrated in FIG. 43. The User will communicate their intent to create a report or an analysis through the user interface. The Compose class object invokes the XML Navigator class objects which contains methods for handling files which are used to open an instance of the CPD Document. In the preferred embodiment of the present invention, the CPD Document is implemented in XML and the CPD Document instance consists of a tree of nodes in memory. The User selects the desired report or analysis type from an enumerated list employing a method available from the Compose class object. The User can next selects the desired units to be used in the report and analyses through the user interface. Composer invokes an instance of the CPE Converter class which transforms the data contained in the CPD Document instance to the desired units.

Creation of the report or analyses is initiated by invoking the appropriate Reporter category object class. FIG. 43, for illustration purposes, shows eight special object classes which include Procedure Summary, Resource List, Materials List, Reagent Preparation, Batch Sheets, Review, Material Flow and Spectra Analysis. Those skilled in the art will recognize that the Reporter category can readily be extended to include additional object classes directed at additional reports, analyses, or report objects used for extended purposes. Accordingly, FIG. 43 is intended to provide examples that illustrate the use of this category but is not intended to limit the inventions to the object classes recited. During its operation, a Reporter category object has methods and attributes to create a report object. In the typical operation, the Reporter category object loops through the instance of the CPD Document object and finds and extracts the requisite information. The information is analyzed employing methods that employ logic and numerical calculation algorithms. The information and the analyzes are then processed into a document object. FIG. 43 shows that the report object is transformed to an Hyper Text Markup Language object by invoking the CPE HTML Formatter class object. Optionally, the Reporter category object can create the HTML object directly. The advantage of creating a report object is that it allows the application programmer to invoke alternate Formatter objects. For example, the application programmer could invoke a standard, commercial word processing object to generate a standard word-processing file. FIG. 43 next shows invocation of the Browser object, a standard Business Object available on most computer operating systems, to render the HTML object to the user interface.

Operation of the Chemical Process Screener

The next example chemical-process-development decision-support application to be generated from the framework is intended to allow the user to employ a valid CPD Document to create an experimental design directed at identifying the factors (e.g., independent variables like temperature or solvent selection that are under the user's control) defined in the CPD Document that have a large effect on a chemical process response (e.g., a dependent variable like product yield that defines the performance or outcome of the chemical process). During chemical-process development, factors identified to be important effectors of the response in a chemical process are selected for optimization in follow-up studies. For the purpose of this example, we will call this application Process Screener.

Figure 44:
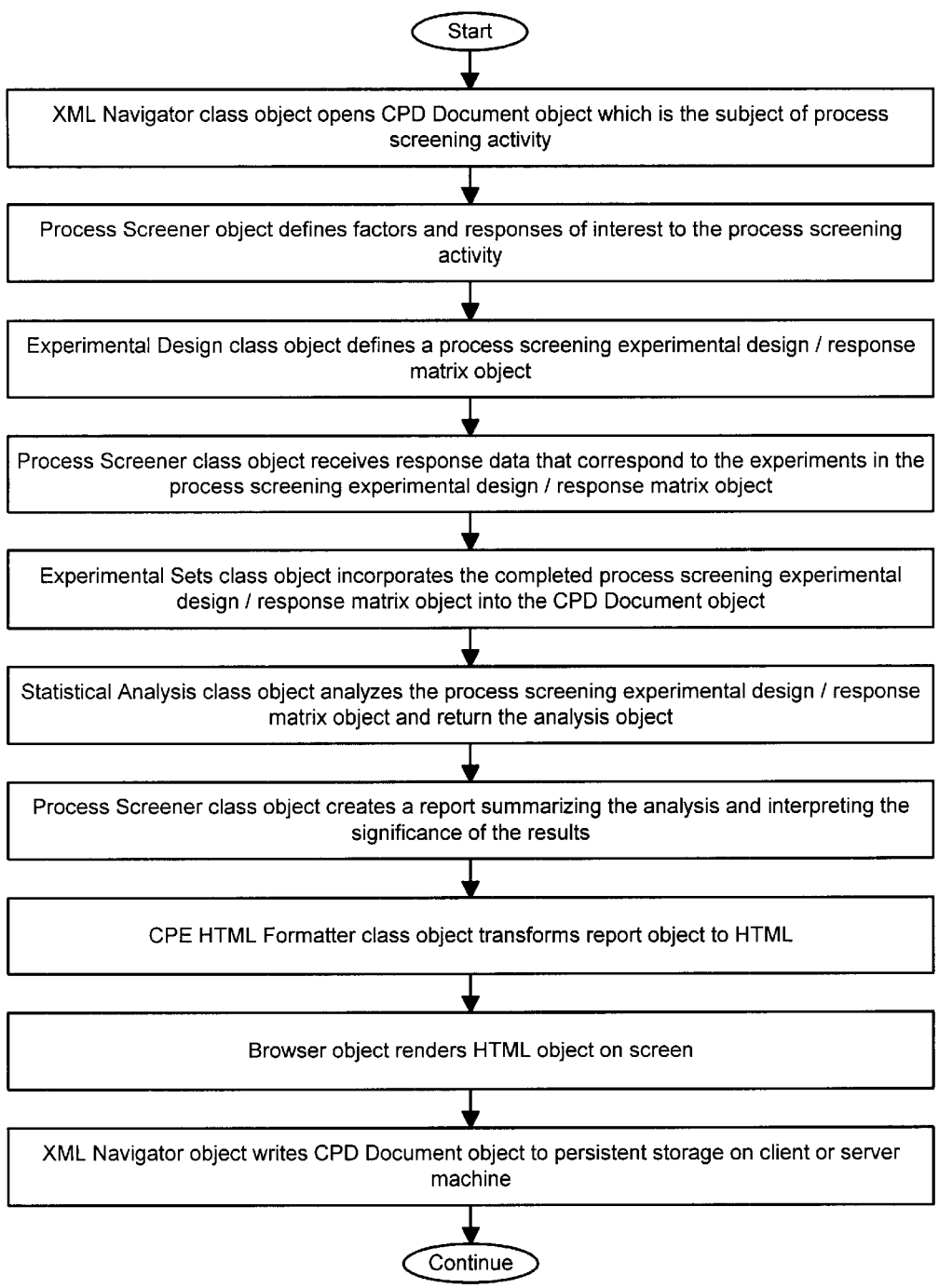
FIG. 44 is a flow diagram representation of the processing carried out by Process Screener, an example application that implements the CPC Experimental Design and CPC Statistical Analysis categories illustrated in FIGS. 35 and 36, respectively.

The User initiates a Process Screener session through a user interface. The session begins with the user selecting a CPD Document instance which will be the subject of process screening activity. The Process Screener object invokes the XML Navigator object to create an instance of the CPD Document. The Process Screener object contains methods which loop through an instance of the CPD Document object and extract all the factors that are defined in the chemical process and assigns them a variable category (e.g., continuous, discrete numeric or discrete non-numeric). The User next selects the factors that they deem to be potential effectors, the values of the factor settings they wish to employ, and the number (e.g., N) of experiments they are willing to perform. The Process Screener object then invokes the Experimental Design object, which carries out the following sequence of actions. The Experimental Design object contains a method to generate a candidate set of experiments consisting of the full factorial array of experiments involving each potential effector and involving each factor setting. Next, the Experimental Design object employs a method to identify the subset of N experiments contained within the candidate set that best meet certain pre-defined mathematical criteria for information content (e.g., D-optimality, G-optimality, A-optimality). The Experimental Design object then returns an experimental design matrix object containing N experiments. The User then operates the chemical processes defined in the CPD Document at each of the settings specified in the experimental design matrix and inputs the corresponding responses through the user interface. FIG. 44 next shows the Experimental Sets class object being called to incorporate the entire experimental design/response matrix object into the CPD Document object, which makes it part of the permanent chemical development record for the subject chemical process.

In the next step of the operation of the Process Screener application, the Statistical Analysis class object is invoked by the User through the user interface. This object contains methods to perform an analysis (e.g., linear regression, multi-linear regression, partial least squares) that aims to quantitatively correlate factor settings with observed values of the response in the chemical process. On the basis of these correlations, the Statistical Analysis class object employs attributes, methods, and heuristics to rank the factors in terms of their effector impact on the chemical process and summarizes these results into a analysis object. The analysis object is used by the Process Screener class object to create a report object. The CPE HTML Formatter class object transforms the report object into an HTML object which can be rendered on the screen of the user interface by invoking the Browser object. Finally, the Process Screener object invokes the XML Navigator object, which contains a method to write the CPD Document to persistent storage on the client or server machine.

Operation of the Chemical Process Optimizer

This example chemical-process-development decision-support application is intended to provide the User a means to optimize—that is, find the combination of settings that results in an target or optimal response—the chemical process using the information obtained in the screening activities. For the purpose of this example, we will call this application Process Optimizer. In a manner analogous to the Process Screening application, Process Optimizer invokes the XML Navigator object to create an instance of the CPD Document. The Process Optimizer object then creates a list of valid factors for study. Based on the results of the process screening activities, the User selects the factors for study. On the basis of the number of factors, the Experimental Design class object uses methods to create an experimental design matrix of experiments. The experimental design matrix is formulated to measure the first order, interaction and second order effects of each factor. The user enters the responses corresponding to each experiment in the matrix through the user interface by invoking the receive method from the Process Optimization class. Next, the Experimental Sets class object is invoked by the User to incorporate the experimental design/response matrix object into the CPD Document object.

Figure 45:
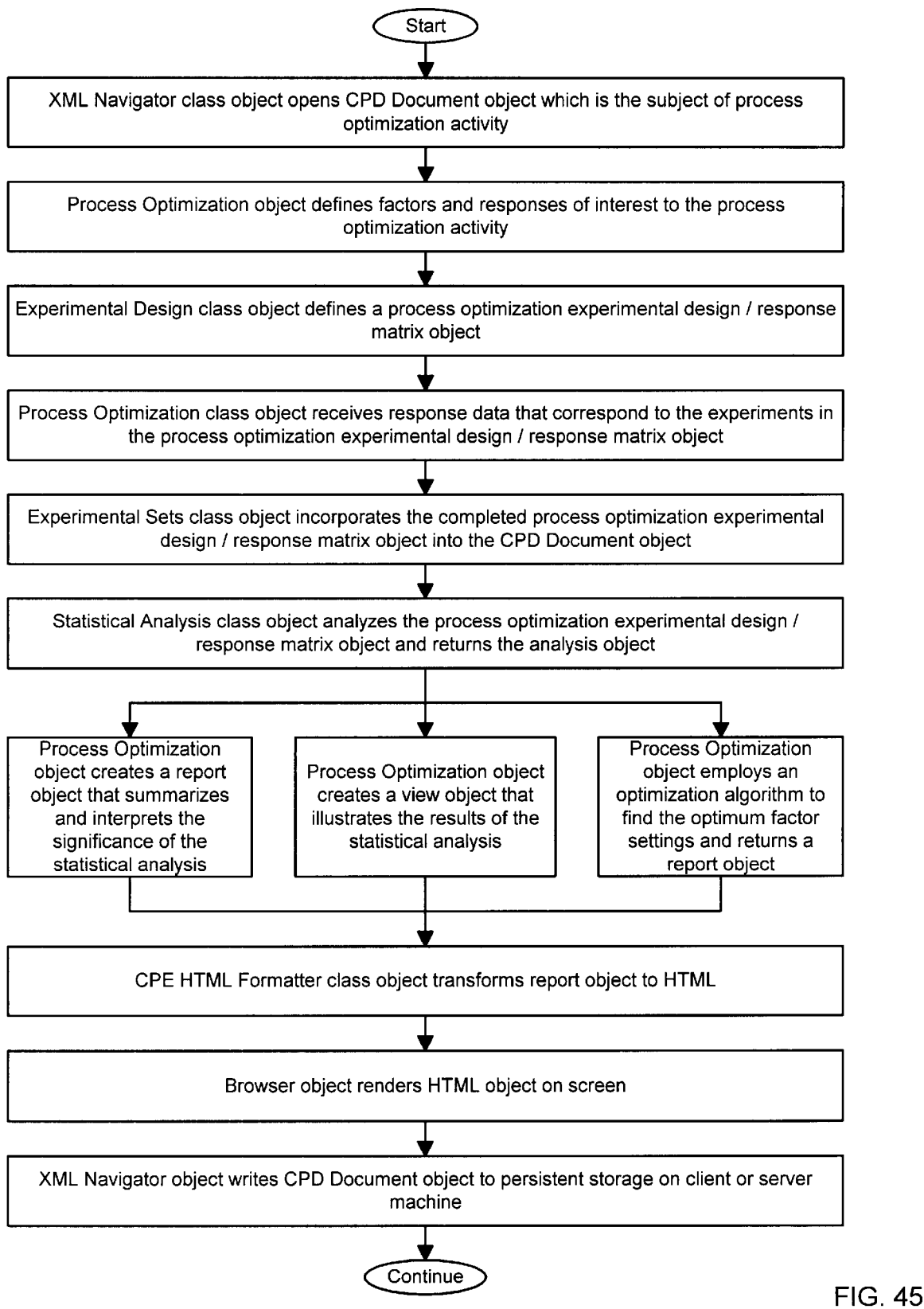
FIG. 45 is a flow diagram representation of the processing carried out by Process Optimizer, an example application that implements the CPC Experimental Design and CPC Statistical Analysis categories illustrated in FIGS. 35 and 36, respectively.

The User now initiates an analysis of experimental design/response matrix by invoking the Statistical Analysis class object. This object will use methods to perform a linear regression of the experimental design/response matrix to a response surface model. Those skilled in the art will recognize that response surface models constitute quadratic predictor equations that represent useful models for predicting responses of chemical processes that involve first order, interaction and second order effects in the factors. Upon completion of the regression, the Statistical Analysis class object will return the results as an analysis object. The analysis object can be passed to Process Optimization object and processed in a number of ways, three of which are illustrated in FIG. 45. In the first way, the Process Optimization object uses heuristic methods to interpret the attributes of the analysis object and create a report object outlining the significance of the results. In the second way, the Process Optimization object uses display methods to created a view object from the analysis object, which illustrates the significance of the results. And in the third way, the Process Optimization object uses mathematical methods in conjunction with the analysis object to find the optimum factor settings and return a report object.

Next, a report object created as described above is passed to a CPE HTLM Formatter class object to transform the report object to an HTML object, as described previously. The Browser object, a member of the Common Business Objects, can then be used to render the HTML object on the user interface. FIG. 45 also shows the Process Optimization class invoking the XML Navigation object to create an instance of the CPD Document in persistent storage.

Operation of the Chemical-Process Cost-Estimator

This example illustrates how the framework of the present invention can be used to generate a chemical-process-development decision-support application intended to allow the user to obtain an estimate of the cost of running a chemical process defined in a valid CPD Document. Estimation of the cost of running a chemical process early in the chemical process development cycle is an important time- and cost-saving activity, which can be aided by the availability of the appropriate chemical-process development decision-support application. For the purpose of this example, we will call this application Chemical-Process Cost-Estimator.

Figure 46:
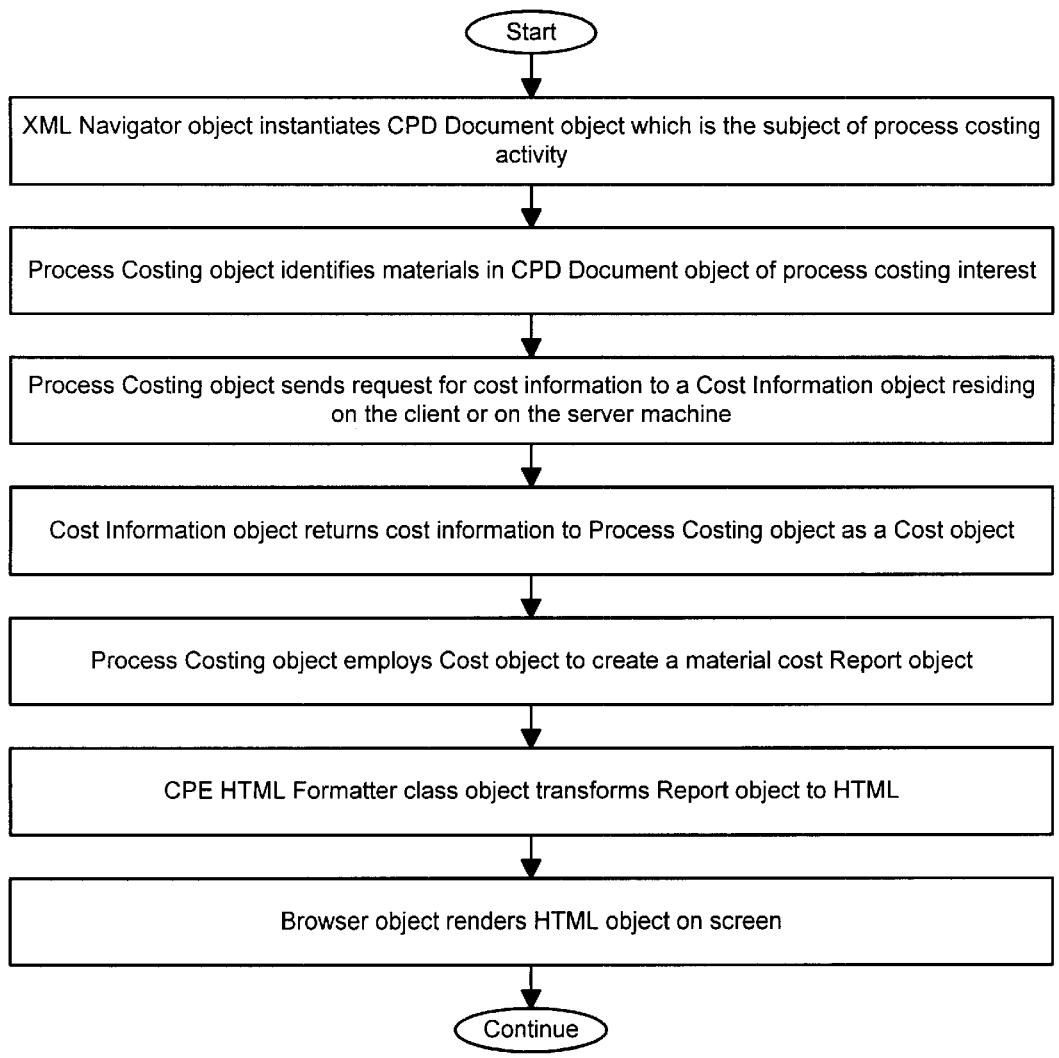
FIG. 46 is a flow diagram representation of the processing carried out by Process Material Estimator, an example application that implements the CPE Cost Estimator category illustrated in FIG. 39.

FIG. 46 illustrates the use of the framework of the present invention to perform the requisite processing in the Chemical-Process Cost-Estimator example application. The User initiates a session with the software application by selecting a CPD Document instance for study. Next, the Process Costing object invokes the XML Navigator object which creates and instance of the CPD Document object. The Process Costing object identifies the materials in the CPD Document instance that are of costing interest and assembles them into a List object. The Process Costing object send the List object in the form of a query request to a Cost Information object residing on the client or on the server machine. This Cost Information object can take a number of forms including, but not limited to, an object database, a relational database, an XML-data object, and a free-text database. The Cost Information object returns a Cost object, which contains the list of materials with associated attributes including grade, availability, lot sizes, and cost. The Process Costing object contains methods which are applied to the Cost object to create a cost report object. The CPE HTML Formatter class object transforms the Report object to an HTML object. The browser object is invoked to render the HTML object on the user interface.

Operation of the Chemical Process Controller

This example illustrates how the framework of the present invention can be used to generate an application intended to drive the operation of one or more different kinds of automated synthesizers. The need for improved efficiency in chemical-process development is being met, in part, by using automation and robotics to perform many of the chemical-process-development activities. Use of automated synthesizers allows a user to perform experiments in parallel, which results in significant time savings. An area of particular interest is the use of automated synthesizers to carry out the matrix of designed experiments which were outlined in the Chemical Process Screener and Chemical Process Optimizer described above. To use an automated synthesizers, an operator must program the synthesizer to create what is frequently called a "command file." The command file contains the exact sequence of instructions, described in a syntax which the automated synthesizer can understand, needed for the automated synthesizer to perform the matrix of experiments. Creation of the command file is a task that requires the operator to specify each element of the chemical process procedure for each individual experiment. This is an expensive and time-consuming task that requires an operator with significant training in the programming of synthesizers. The Chemical Process Controller application, which is described below, is intended to automate the process of programming the automated synthesizer to create the command file resulting in a cost and time saving and reducing the need for a highly trained operator.

Figure 47:
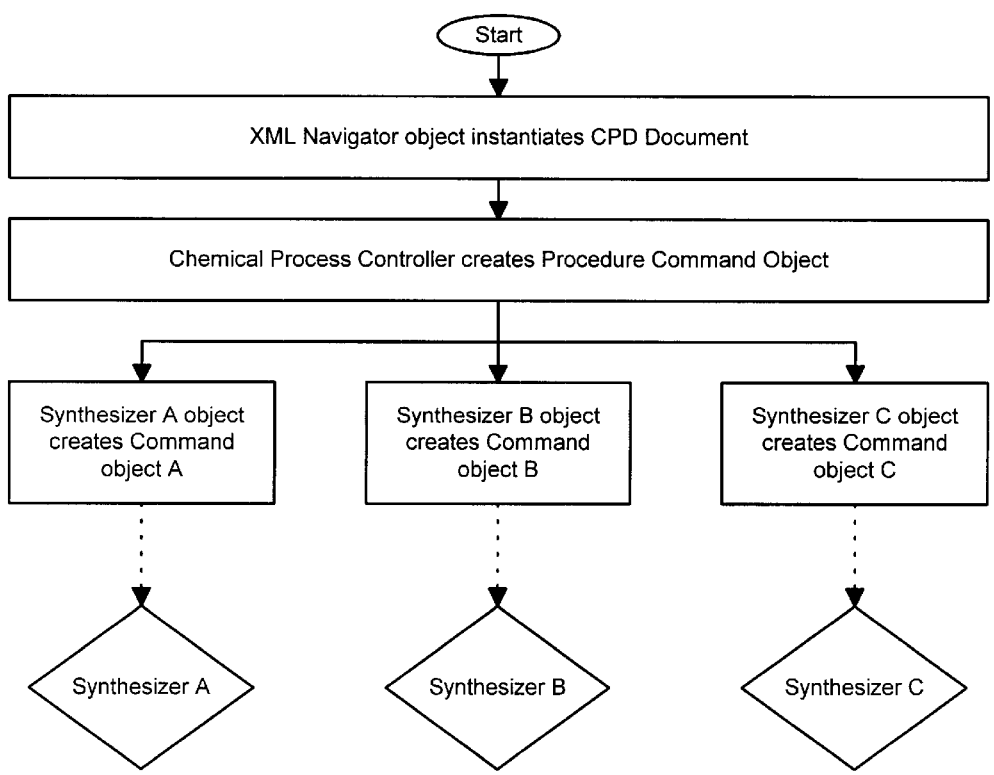
FIG. 47 is a flow diagram representation of the processing carried out by Process Controller, an example application intended to drive the operation of automated synthesizers using the procedure information contained in the CPD Document.

FIG. 47 illustrates the operation of the Chemical Process Controller application. The User inititiates a session by invoking the XML Navigation object to create an instance of the CPD Document. The Chemical Process Controller object contains methods that allow it to create a Procedure Command object. The Procedure Command object consists of the object hierarchy that specifies the resources, materials and sequence of Operation objects needed to perform the chemical process specified in the CPD Document. Next, the Procedure Command object is passed to one of several possible automated Synthesizer objects. Each Synthesizer object is responsible for using the Procedure Command object to create a command file for the respective synthesizer. Towards that end, the Synthesizer object can contain attributes and methods which include the following. The Synthesizer object can contain methods and attributes for mapping an operation in the Procedure Command object to the corresponding operation in the Command object. The Synthesizer object can contain methods and attributes for mapping an operation in the Procedure Command object to a sequence of one or more alternate operations in the Command object. The Synthesizer object can contain methods that recognize incompatibilities between a requested operation in the Procedure Command object and the operating limitations of the synthesizer and subsequently provide intelligent workarounds or warn the user. The Synthesizer object can contain a Scheduling object that provides for optimal scheduling the execution of parallel experiments. And, the Synthesizer object provides a method to save the Command object to persistent storage. The Command object can then be used, through an action initiated by the User, to operate the corresponding automated synthesizer.

Advantages of the Invention

Thus, the reusable framework of the invention provides a set of objects that perform chemical-process-development decision support and permit a framework user to add extensions to the framework for specific processing features, thereby producing a chemical-process-development decision-support application for managing and enhancing chemical process development activities. An application program developer can thereby more quickly conclude program development and maintain programs with updates and improvements. The developer must provide the end-user interface, which establishes a means for the end-user to communicate the application program to receive, process, and report data. The program developer is thereby free to concentrate on application program features, building upon the framework.

The embodiments and examples set forth herein were presented in order to best explain the present invention and its practical applications and to thereby enable those skilled in the art to make and use the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the forthcoming claims.

We claim:
1. A computer system comprising:
a central processing unit;
a user interface; and
a main memory having an operating system that supports an object-oriented programming environment containing an object oriented framework that includes a plurality of predefined object oriented classes that may be extended by a user, wherein the framework provides a decision support system for development of a chemical process, said chemical process being specified by a data object.

2. The computer system of claim 1, wherein the memory includes a chemical process recording mechanism comprising at least one category of cooperating objects including at least one object specifying at least one of a method and an attribute for at least one of creating, assembling, validating and controlling information contained in the data object specifying the chemical process.

3. The computer system of claim 1, wherein the memory includes a chemical process characterization mechanism comprising at least one category of cooperating objects including at least one object specifying at least one of a method and an attribute for at least one of creating and analyzing a statistical experimental process design for at least one of screening and optimizing a chemical process factor.

4. The computer system of claim 1, wherein the memory includes a chemical process reporting mechanism comprising at least one category of cooperating objects including at least one object specifying at least one of a method and an attribute for at least one of a unit conversion, a cost estimation, and a task associated with said chemical process.

5. The computer system of claim 4, wherein the cooperating objects of the chemical process reporting mechanism include an object that identifies at least one of a resource and a sequence of logical events for performing a chemical process procedure on an automated device.

6. The computer system of claim 1, wherein the memory includes a data object specifying at least one of a property, a behavior, and an attribute of interest of said chemical process.

7. The computer system of claim 6, further comprising an object specifying an activity sequence to convert a chemical reactant to a chemical product.

8. The computer system of claim 7, further comprising an object identifying a chemical procedure operation.

9. The computer system of claim 1, wherein said data object specifying said chemical process is implemented as an XML object.

10. An object oriented framework that includes a plurality of predefined object classes that may be extended by a user for use in a computer system having an operating system that supports an object oriented programming environment and which includes a memory in which cooperating objects comprising object classes can be stored, the framework providing an extensible decision-support system for development of a chemical process, said chemical process being specified by a data object.

11. The framework of claim 10 further including a chemical process recording mechanism comprising at least one category of cooperating objects including at least one object specifying at least one of a method and an attribute for at least one of creating, assembling, validating and controlling information contained in said data object specifying said chemical process.

12. The framework of claim 10 further including a chemical process characterization mechanism comprising at least one category of cooperating objects including at least one object specifying at least one of a method and an attribute for at least one of creating and analyzing a statistical experimental design for at least one of screening and optimizing a chemical process factor.

13. The framework of claim 10 further including a chemical process reporting mechanism comprising at least one category of cooperating objects including at least one object specifying at least one of a method and an attribute for at least one of unit conversion, cost estimation, and a task associated with said chemical process.

14. The framework of claim 13, wherein the cooperating objects of the chemical process reporting mechanism include an object that identifies at least one of a resource and a sequence of logical events for performing a chemical process procedure on an automated device.

15. The framework of claim 10, wherein said data object specifies at least one of a property, a behavior, and an attribute of interest of said chemical process.

16. The framework of claim 10, further comprising an object specifying an activity sequence to convert a chemical reactant to a chemical product.

17. The framework of claim 16, further comprising an object identifying a chemical procedure operation.

18. The framework of claim 10, wherein said data object specifying said chemical process is implemented as an XML object.

19. A program product data storage device, tangibly embodying a program of machine readable instructions executable by a computer system having an operating system that supports an object oriented programming environment, the program product comprising:

a recordable medium; and an object oriented framework recorded on the recordable medium, the framework including a plurality of pre-defined object oriented classes that may be extended by a user, wherein the framework provides decision-support system for development of a chemical process, said chemical process being specified by a data object.

20. The program product of claim 19 further including a chemical process recording mechanism comprising at least one category of cooperating objects including at least one object specifying at least one of a method and an attribute for at least one of creating, assembling, validating, and controlling information contained in the data object specifying the chemical process.

21. The program product of claim 19 further including a chemical process characterization mechanism comprising at least one category of cooperating objects including at least one object specifying at least one of a method and an attribute for at least one of creating and analyzing a statistical experimental design for at least one of screening and optimizing a chemical process factor.

22. The program product of claim 19 further including a chemical process reporting mechanism comprising at least one category of cooperating objects including at least one object specifying at least one of a method and an attribute for at least one of a unit conversion, a cost estimation, and a task associated with said chemical process.

23. The program product of claim 22 wherein the cooperating objects of the chemical process recording mechanism include an object that identifies at least one of a resource and a sequence of logical events for performing a chemical process procedure on an automated device.

24. The program product of claim 19 wherein the said data object specifies at least one of a property, a behavior, and an attribute of interest of said chemical process.

25. The program product of claim 19 further comprising an object specifying an activity sequence to convert a chemical reactant to a chemical product.

26. The program product of claim 25 further comprising an object identifying a chemical procedure operation.

27. The program product of claim 19 wherein the data object specifying the chemical process is implemented as an XML object.

28. A method of distributing a program product, the method comprising the steps of:

establishing a connection between a first computer system and a second computer system; and transmitting the program product from the first computer system to the second computer system, wherein the program product comprises an object oriented framework that includes a plurality of pre-defined object oriented classes that may be extended by a user, the framework providing a decision support system for development of a chemical process, said chemical process being specified by a data object.

29. The method of claim 28 further including a chemical process recording mechanism comprising at least one category of cooperating objects including at least one object specifying at least one of a method and an attribute for at least one of creating, assembling, validating and controlling information contained in the data object specifying the chemical process.

30. The method of claim 28 further including a chemical process characterization mechanism comprising at least one category of cooperating objects including at least one object specifying at least one of a method and an attribute for at least one of creating and analyzing a statistical experimental design for at least one of screening and optimizing a chemical process factor.

31. The method of claim 28 further including a chemical process reporting mechanism comprising at least one category of cooperating objects including at least one object specifying at least one of a method and an attribute for at least one of a unit conversion, a cost estimation, and a task associated with said chemical process.

32. The method of claim 31, wherein the cooperating objects of the chemical process reporting mechanism includes an object that identifies at least one of a resource and a sequence of logical events for performing a chemical process procedure on an automated device.

33. The method of claim 28, wherein said data object specifies at least one of a property, a behavior, and an attribute of interest of said chemical process.

34. The method of claim 28, further comprising an object specifying an activity sequence to convert a chemical reactant to a chemical product.

35. The method of claim 34, further comprising an object that identifies a chemical procedure operation.

36. The method of claim 28, wherein the chemical process is specified by an object implemented as an XML object.

* * * * *

UNITED STATES PATENT AND TRADEMARK OFFICE
CERTIFICATE OF CORRECTION

PATENT NO.    : 6,618,852 B1
DATED         : September 9, 2003
INVENTOR(S)   : van Eikeren et al.

It is certified that error appears in the above-identified patent and that said Letters Patent is hereby corrected as shown below:

Column 3,
Line 33, delete the "a" before "customers".

Column 6,
Line 4, delete "info" between "certain" and "information".

Column 8,
Line 44, change "attributtes" to -- attributes --.

Column 9,
Line 1, insert a hyphen -- - -- between "Decision" and "Support".

Column 11,
Line 65, delete "the" between "employing" and "an".

Column 12,
Lines 1 and 3, change "accesses" to -- accessed --.

Column 13,
Line 38, delete the space between "frame" and "work" so that it reads "framework".
Line 65, delete the period "." after "is,".

Column 14,
Line 53, change "consists" to -- consist --.

Column 18,
Line 8, change "methods" to -- method --.

Column 20,
Line 3, insert a period -- . -- after "process".
Line 19, change "our" to -- out --.

Column 22,
Line 37, delete "the" (second occurrence).

Column 24,
Line 6, change "analyzes" to -- analyses --.

Column 25,
Line 67, change "HTLM" to -- HTML --.

UNITED STATES PATENT AND TRADEMARK OFFICE
CERTIFICATE OF CORRECTION

PATENT NO. : 6,618,852 B1
DATED : September 9, 2003
INVENTOR(S) : van Eikeren et al.

It is certified that error appears in the above-identified patent and that said Letters Patent is hereby corrected as shown below:

Column 26,
Line 26, change "and" to -- an --.

Column 27,
Line 6, change "inititates" to -- initiates --

Signed and Sealed this

Fourteenth Day of December, 2004

JON W. DUDAS
*Director of the United States Patent and Trademark Office*